(12) United States Patent
Rossato et al.

(10) Patent No.: US 11,394,985 B2
(45) Date of Patent: Jul. 19, 2022

(54) HYBRID BACKWARD-COMPATIBLE SIGNAL ENCODING AND DECODING

(71) Applicant: V-NOVA INTERNATIONAL LIMITED, London (GB)

(72) Inventors: Luca Rossato, Milan (IT); Guido Meardi, Milan (IT)

(73) Assignee: V-NOVA INTERNATIONAL LIMITED

( * ) Notice: Subject to any disclaimer, the term of this patent is extended or adjusted under 35 U.S.C. 154(b) by 0 days.

(21) Appl. No.: 17/136,853

(22) Filed: Dec. 29, 2020

(65) Prior Publication Data

US 2021/0329276 A1    Oct. 21, 2021

Related U.S. Application Data

(60) Continuation of application No. 16/871,714, filed on May 11, 2020, now Pat. No. 10,887,612, which is a continuation of application No. 15/850,675, filed on Dec. 21, 2017, now Pat. No. 10,652,560, which is a division of application No. 14/252,820, filed on Apr. 15, 2014, now Pat. No. 9,912,945.

(Continued)

(51) Int. Cl.
| | | |
|---|---|---|
| H04N 19/31 | (2014.01) | |
| H04N 19/46 | (2014.01) | |
| H04N 19/85 | (2014.01) | |
| H04N 19/88 | (2014.01) | |
| H04N 19/30 | (2014.01) | |

(52) U.S. Cl.
CPC ............. *H04N 19/31* (2014.11); *H04N 19/30* (2014.11); *H04N 19/46* (2014.11); *H04N 19/85* (2014.11); *H04N 19/88* (2014.11)

(58) Field of Classification Search
None
See application file for complete search history.

(56) References Cited

U.S. PATENT DOCUMENTS

| | | |
|---|---|---|
| 9,912,945 B2 | 3/2018 | Rossato et al. |
| 10,887,612 B2 | 1/2021 | Rossato et al. |

(Continued)

FOREIGN PATENT DOCUMENTS

| | | |
|---|---|---|
| WO | 2007107936 | 9/2007 |
| WO | 2012147010 | 11/2012 |
| WO | 2013011492 | 1/2013 |

OTHER PUBLICATIONS

Schierl, Thomas et al., "Scalable Video Coding Over RTP and MPEG-2 Transport Stream in Broadcast and IPTV channels", IEEE Wireless Communications, Oct. 2009, Total pp. 8.

(Continued)

*Primary Examiner* — Lindsay J Uhl
(74) *Attorney, Agent, or Firm* — Workman Nydegger

(57) ABSTRACT

Computer processor hardware: parses a data stream into first portions of encoded data and second portions of encoded data; implements a first decoder to decode the first portions of encoded data into a first rendition of a signal; implements a second decoder to decode the second portions of encoded data into reconstruction data, the reconstruction data specifying how to modify the first rendition of the signal; and applies the reconstruction data to the first rendition of the signal to produce a second rendition of the signal.

17 Claims, 27 Drawing Sheets

Related U.S. Application Data

(60) Provisional application No. 61/812,046, filed on Apr. 15, 2013.

(56) References Cited

U.S. PATENT DOCUMENTS

| | | | |
|---|---|---|---|
| 2006/0083308 A1* | 4/2006 | Schwarz | H04N 19/103 375/240.16 |
| 2006/0109901 A1* | 5/2006 | Ye | H04N 21/234327 375/240.08 |
| 2007/0223582 A1 | 9/2007 | Borer | |
| 2009/0238279 A1 | 9/2009 | Tu et al. | |
| 2009/0268806 A1 | 10/2009 | Kim | |
| 2009/0310680 A1 | 12/2009 | Jeon et al. | |
| 2010/0046622 A1* | 2/2010 | Doser | H04N 19/109 375/240.13 |
| 2010/0088736 A1 | 4/2010 | Besen | |
| 2011/0110434 A1 | 5/2011 | Park et al. | |
| 2012/0177110 A1 | 7/2012 | Kleijn | |
| 2013/0114680 A1 | 5/2013 | Leontaris | |
| 2014/0010294 A1 | 1/2014 | Ye | |
| 2014/0037206 A1 | 2/2014 | Newton | |
| 2014/0064373 A1* | 3/2014 | Le | H04N 19/119 375/240.16 |
| 2015/0296232 A1 | 10/2015 | Hwang | |

OTHER PUBLICATIONS

Schwarz, Heiko et al., "Overview of the Scalable Video Coding Extension of the H264/AVC Standard", IEEE Transactions on Circuits and Systems for Video Technology, Sep. 2007, Total pp. 18.
Singer, David "Updated Part 15 Whitepaper", 107. MPEG Meeting; Jan. 13, 2014-Jan. 17, 2014; San Jose; (Motion Picture Expert Group or ISO/IEC JTC1/SC29NVG11), No. m 32312, Jan. 16, 2014 (Jan. 16, 2014), XP030060764.
International Search Report and Written Opinion, Intellectual Property Office of Singapore, corresponding application PCT/IB2014/060716, dated May 24, 2017 pp. 6.
U.S. Appl. No. 15/850,675, dated Dec. 28, 2018, Office Action.
U.S. Appl. No. 15/850,675, dated Jun. 14, 2019, Final Office Action.
U.S. Appl. No. 15/850,675, dated Jan. 8, 2020, Notice of Allowance.
U.S. Appl. No. 16/871,714, dated Sep. 2, 2020, Notice of Allowance.

* cited by examiner

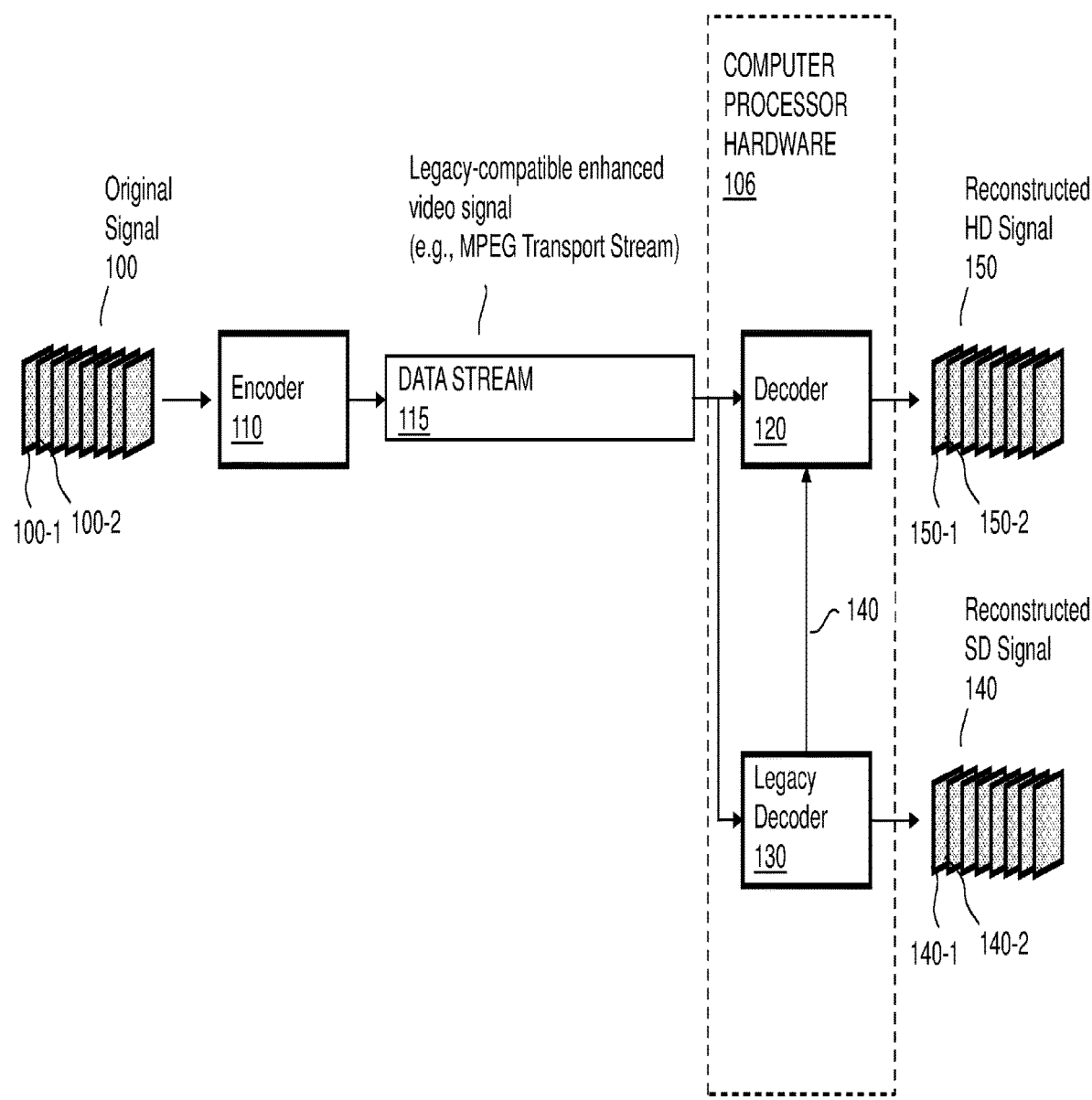

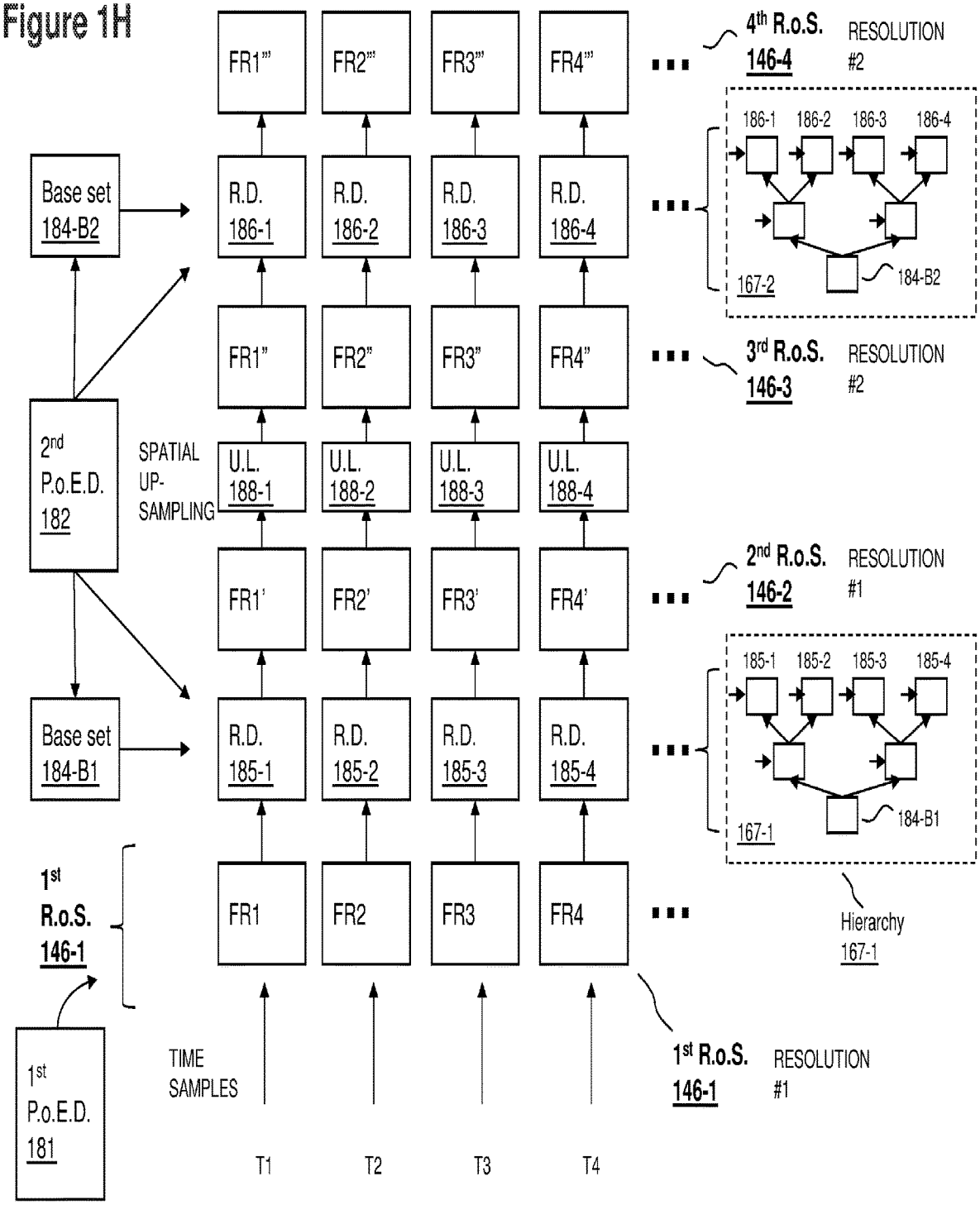

HYBRID BACKWARD-COMPATIBLE SIGNAL ENCODING AND DECODING

RELATED APPLICATIONS

This application is a continuation of U.S. patent application Ser. No. 16/871,714, filed May 11, 2020, which is a continuation of U.S. patent application Ser. No. 15/850,675, filed Dec. 21, 2017, which is a divisional of U.S. patent application Ser. No. 14/252,820, filed Apr. 15, 2014, which claims priority to U.S. Provisional Patent Application No. 61/812,046, filed Apr. 15, 2013, the entire teachings of which are incorporated herein by this reference.

U.S. patent application Ser. No. 14/252,820 is related to and claims the benefit of earlier filed U.S. Provisional Patent Application Ser. No. 61/812,046 entitled "SIGNAL ENCODING AND DECODING IN A TIERED HIERARCHY WITH USE OF DIFFERENT TECHNIQUES FOR DIFFERENT LEVELS OF QUALITY," filed on Apr. 15, 2013, the entire teachings of which are incorporated herein by this reference.

This application is related to U.S. patent application Ser. No. 13/893,665 entitled "ENCODING AND DECODING BASED ON BLENDING OF SEQUENCES OF SAMPLES ALONG TIME", filed on May 14, 2013, the entire teachings of which are incorporated herein by this reference.

This application is related to U.S. patent application Ser. No. 13/893,669 entitled "DECOMPOSITION OF RESIDUAL DATA DURING SIGNAL ENCODING, DECODING AND RECONSTRUCTION IN A TIERED HIERARCHY", filed on May 14, 2013, the entire teachings of which are incorporated herein by this reference.

This application is related to U.S. patent application Ser. No. 13/894,417 entitled "ENCODING AND RECONSTRUCTION OF RESIDUAL DATA BASED ON SUPPORT INFORMATION", filed on May 14, 2013, the entire teachings of which are incorporated herein by this reference.

This application is related to U.S. patent application Ser. No. 13/893,672 entitled "ESTIMATION, ENCODING AND DECODING OF MOTION INFORMATION IN MULTIDIMENSIONAL SIGNALS THROUGH MOTION ZONES, AND AUXILIARY INFORMATION THROUGH AUXILIARY ZONES", filed on May 14, 2013, the entire teachings of which are incorporated herein by this reference.

This application is related to U.S. patent application Ser. No. 13/893,677 entitled "MOTION COMPENSATION AND MOTION ESTIMATION LEVERAGING A CONTINUOUS COORDINATE SYSTEM", filed on May 14, 2013, the entire teachings of which are incorporated herein by this reference.

This application is related to U.S. Provisional Patent Application Ser. No. 61/646,797 entitled "SIGNAL ENCODING, DECODING AND RECONSTRUCTION OF TIME-BASED AND/OR MULTIDIMENSIONAL SIGNALS BASED ON MULTIDIMENSIONAL TIER-BASED INHERITANCE", filed on May 14, 2012, the entire teachings of which are incorporated herein by this reference.

This application is related to U.S. Provisional Patent Application Ser. No. 61/647,426 entitled "ESTIMATION, ENCODING, DECODING AND USAGE OF MOTION INFORMATION IN MULTIDIMENSIONAL SIGNALS THROUGH MOTION ZONES, MOTION MATRIXES, WARP MAPS AND MOTION TRANSFORMS", filed on May 15, 2012, the entire teachings of which are incorporated herein by this reference.

This application is also related to U.S. patent application Ser. No. 13/188,188 entitled "INHERITANCE IN A TIERED SIGNAL QUALITY HIERARCHY," filed on Jul. 21, 2011, the entire teachings of which are incorporated herein by this reference.

This application is related to U.S. patent application Ser. No. 13/188,201 entitled "TIERED SIGNAL DECODING AND SIGNAL RECONSTRUCTION," filed on Jul. 21, 2011, the entire teachings of which are incorporated herein by this reference.

This application is related to U.S. patent application Ser. No. 13/188,207 entitled "SIGNAL PROCESSING AND TIERED SIGNAL ENCODING," filed on Jul. 21, 2011, the entire teachings of which are incorporated herein by this reference.

This application is related to U.S. patent application Ser. No. 13/188,220 entitled "UPSAMPLING IN A TIERED SIGNAL QUALITY HIERARCHY," filed on Jul. 21, 2011, the entire teachings of which are incorporated herein by this reference.

This application is related to U.S. patent application Ser. No. 13/188,226 entitled "SIGNAL PROCESSING AND INHERITANCE IN A TIERED SIGNAL QUALITY HIERARCHY," filed on Jul. 21, 2011, the entire teachings of which are incorporated herein by this reference.

This application is related to U.S. patent application Ser. No. 13/352,944 entitled "SIGNAL ANALYSIS AND GENERATION OF TRANSIENT INFORMATION," filed on Jan. 18, 2012, the entire teachings of which are incorporated herein by this reference.

This application is related to U.S. Provisional Patent Application Ser. No. 61/563,169 entitled "TIER-BASED SYSTEM TO SEPARATE A MULTIDIMENSIONAL SIGNAL INTO STABLE/PREDICTABLE INFORMATION AND TRANSIENT INFORMATION," filed on Nov. 23, 2011, the entire teachings of which are incorporated herein by this reference.

This application is related to U.S. patent application Ser. No. 13/188,237 entitled "TRANSMISSION OF RECONSTRUCTION DATA IN A TIERED SIGNAL HIERARCHY," filed on Jul. 21, 2011, the entire teachings of which are incorporated herein by this reference.

This application is related to U.S. Provisional Patent Application Ser. No. 61/558,302 entitled "UPSAMPLING AND DOWNSAMPLING OF MOTION MAPS AND OTHER AUXILIARY MAPS IN A TIERED SIGNAL QUALITY HIERARCHY," filed on Nov. 10, 2011, the entire teachings of which are incorporated herein by this reference.

This application is related to U.S. patent application Ser. No. 13/303,554 entitled "UPSAMPLING AND DOWNSAMPLING OF MOTION MAPS AND OTHER AUXILIARY MAPS IN A TIERED SIGNAL QUALITY HIERARCHY," filed on Nov. 23, 2011, the entire teachings of which are incorporated herein by this reference.

This application is related to U.S. Provisional Patent Application Ser. No. 61/587,989 entitled "DISTINCT ENCODING/DECODING OF STABLE/PREDICTABLE INFORMATION AND TRANSIENT/STOCHASTIC INFORMATION," filed on Jan. 18, 2012, the entire teachings of which are incorporated herein by this reference.

This application is related to U.S. patent application Ser. No. 13/744,808 entitled "DISTINCT ENCODING AND DECODING OF STABLE INFORMATION AND TRANSIENT/STOCHASTIC INFORMATION", filed on Jan. 18, 2013, the entire teachings of which are incorporated herein by this reference.

BACKGROUND

Many techniques are known in the art to deal with compression and decompression of multidimensional signals or of signals evolving along time. This is the case of audio signals, video signals and other multidimensional signals like volumetric signals used in scientific and medical areas. In order to achieve high compression ratios, those techniques exploit the spatial and time correlation inside the signal. Conventional methods identify a reference and try to determine the difference of the signal between a current location and the given reference. This is done both in the spatial domain, where the reference is a portion (e.g., a block, or "macro-block") of already received and decoded spatial plane, and in the time domain, where a single instance in time of the signal (e.g., a video frame in a sequence of frames) is taken as a reference for a certain duration. This is the case, for example, of MPEG-family compression algorithms, where previously-decoded macro blocks are taken as reference in the spatial domain and I-frames and P-frames are used as reference for subsequent P-frames in the time domain.

Known techniques exploit spatial correlation and time correlation in many ways, adopting several different techniques in order to identify, simplify, encode and transmit differences. In conventional methods, in order to leverage on spatial correlation of residuals within a block a domain transformation is performed (for example into a frequency domain) and then lossy deletion and quantization of transformed information is performed, typically introducing some degree of block artefacts. In the time domain, instead, conventional methods transmit the quantized difference between the current sample and a motion-compensated reference sample. In order to maximize the similarity between samples, encoders try to estimate the modifications along time occurred vs. the reference signal. This is called, in conventional encoding methods (e.g., MPEG family technologies, VP8, VP9, etc.), motion estimation and compensation.

Encoding methods in the known art, aside from few attempts, typically neglect the quality scalability requirement. A scalable encoding method would encode a single version of the compressed signal and enable the delivery to different levels of quality, bandwidth availabilities, and decoder complexity. Scalability has been taken into consideration in known methods like MPEG-SVC and JPEG2000, with relatively poor adoption so far due to computational complexity and, generally speaking, their similarity with non-scalable techniques.

Since MPEG-based technologies (e.g., MPEG2, MPEG4, H.264, H.265) are international standards, several dedicated hardware chips were developed in order to perform signal decoding with dedicated hardware blocks. It is thus difficult for different encoding technologies to gain adoption, due to the lack of a decoding device ecosystem.

In other cases of video transmissions, such as for instance the cable transmission to display devices via transmission methods such as HDMI or DisplayPort, the transmission of video content to decoding/display devices is constrained by the capacity of the transmission cable. This makes it impossible to transmit video content above a given level of quality (either resolution or frame rate) due to the constraints of the transmission cable. Since the amount of data to transmit is becoming larger and larger over time (due to the continuous increase of resolutions and frame rates supported by commercial display devices), the constraints posed by connection cables are becoming relevant issues, often forcing decoding/display devices to perform various kinds of interpolations (e.g., frame rate interpolations from 60 Hz to 240 Hz) in order to make up for the insufficient capacity of the transmission cable in order to cope with the levels of quality that they would be able to display.

In other cases of video transmission, such as for instance video conferencing, a large installed base of decoder devices is only able to decode legacy SD and/or HD video content, while newer and more powerful telepresence systems can decode video content at much higher resolutions at quality. Current methods make it impossible with a single encoded data stream (i.e., without encoding/transcoding into multiple distinct video streams) to serve both legacy decoder devices and newer decoder devices.

In other cases of video distribution, such as for instance Blu-ray discs, a large ecosystem of devices is only able to decode legacy HD video encoding formats, while new decoding devices are able to decode and display UltraHD video. Current methods make it impossible to distribute a single legacy-compatible Blu-ray disc that can be read as HD video by the wide installed base of legacy devices and as UltraHD video by new decoding devices.

BRIEF DESCRIPTION OF EMBODIMENTS

In contrast to conventional techniques, methods and embodiments herein represent an innovative approach to achieve efficient bit streams and scalability while at the same time maintaining backward compatibility with decoding and/or display hardware that was designed for known decoding methods.

Methods and embodiments illustrated herein also include ways to produce a backward compatible stream, generated so as to be decoded up to a first level of quality by legacy decoders and up to one or more different (higher) levels of quality by specifically enabled decoders.

Aside from achieving the goal of scalability with backward compatibility, the use of different encoding/decoding techniques for higher levels of quality can also achieve greater efficiency for the overall bit stream.

Embodiments herein deviate with respect to conventional systems and methods, providing novel methods to decode a signal leveraging a legacy decoding method for decoding up to a given level of quality, and a novel decoding method to reconstruct, based on the decoded signal at the given level of quality, a rendition of the signal at the final (higher) level of quality.

According to its broadest aspect, the invention is a method for using existing decoding hardware up to a given resolution and/or frame rate (first level of quality), and then reconstruct one or more additional levels of quality by means of a computationally simple yet effective method. Legacy decoding devices that are unable to be updated so as to perform decoding of a level of quality higher than the first will just decode the signal at the first level of quality and ignore the additional enhancement data, i.e., will still be able to decode a rendition of the signal.

For simplicity, non-limiting embodiments illustrated herein refer to a signal as a sequence of samples (i.e., two-dimensional images, video frames, video fields, etc.). In the description the terms "image", "picture" or "plane" (intended with the broadest meaning of "hyperplane", i.e., array of elements with any number of dimensions and a given sampling grid) will be often used to identify the digital rendition of a sample of the signal along the sequence of samples, wherein each plane has a given resolution for each of its dimensions (e.g., X and Y), and comprises a set of plane elements (or "element", or "pel", or display element for two-dimensional images often called "pixel", for volumetric images often called "voxel", etc.) characterized by one or more "values" or "settings" (e.g., by ways of non-limiting examples, color settings in a suitable color space, settings indicating density levels, settings indicating temperature levels, settings indicating audio pitch, settings indicating amplitude, etc.). Each plane element is identified by a suitable set of coordinates, indicating the integer positions of said element in the sampling grid of the image. Signal dimensions can include only spatial dimensions (e.g., in the case of an image) or also a time dimension (e.g., in the case of a signal evolving over time).

As non-limiting examples, a signal can be an image, an audio signal, a multi-channel audio signal, a video signal, a multi-view video signal (e.g., 3D video), a volumetric signal (e.g., medical imaging, scientific imaging, holographic imaging, etc.), a volumetric video signal, or even signals with more than four dimensions.

For simplicity, non-limiting embodiments illustrated herein often refer to signals that are displayed as 2D planes of settings (e.g., 2D images in a suitable color space), such as for instance a video signal. The terms "frame" or "field" will be used interchangeably with the term "image", so as to indicate a sample in time of the video signal: any concepts and methods illustrated for video signals made of frames (progressive video signals) can be easily applicable also to video signals made of fields (interlaced video signals), and vice versa. Despite the focus of embodiments illustrated herein on video signals, people skilled in the art can easily understand that the same concepts and methods are also applicable to any other types of multidimensional signal (e.g., volumetric signals, video signals, 3D video signals, plenoptic signals, etc.).

In a non-limiting embodiment described herein, a signal processor is configured to receive a data stream and separate it into two or more sub-streams. A first sub-stream is decoded by means of a first decoding method, producing a rendition of the signal at a first level of quality. A second sub-stream is decoded by means of a second decoding method, producing residuals. Based on the signal at the first level of quality, the signal processor produces a predicted rendition of the signal at a second (higher) level of quality. The signal processor combines the predicted (or "preliminary") rendition of the signal at the second level of quality with residuals, producing a rendition of the signal at a second level of quality.

In other non-limiting embodiments described herein, a signal processor located in another computer device receives the data stream and is not configured to decode the second sub-stream. The signal processor ignores the second sub-stream and just decodes the first sub-stream, producing a rendition of the signal at a first level of quality. In this way, inclusion of the second subscriber-stream of data in the data stream is effectively backward compatible with decoders that were not configured to decode the second sub-stream because legacy decoders just ignore the second subscriber-stream and produce a rendition of the signal at the first level of quality instead of a rendition of the signal at the second level of quality.

In a non-limiting embodiment, the method is implemented on the firmware of hardware designed to decode according to an MPEG-based method, and the first sub-stream is decoded according to said MPEG-based method.

In other non-limiting embodiments described herein, the second sub-stream includes parameters corresponding to operations performed by the signal processor to produce, based on the signal at the first level of quality, a predicted or preliminary rendition of the signal at the second level of quality. In a non-limiting embodiment, said parameters include the coefficients of an upsampling kernel used to upsample the rendition of the signal at the first level of quality.

In other non-limiting embodiments described herein, decoded residuals include a first set of residuals at the first level of quality and a second set of residuals at the second level of quality.

In other non-limiting embodiments described herein, producing a predicted rendition of the signal at the second level of quality includes: combining the rendition of the signal at the first level of quality with a first set of residuals; upsampling the rendition of the signal at the first level of quality by means of upsampling operations corresponding to received parameters.

In other non-limiting embodiments described herein, decoding a set of residuals includes: decoding transformed quantized residuals; summing and subtracting transformed quantized residuals with themselves and/or with suitable parameters, producing quantized residuals; dequantizing quantized residuals, producing residuals.

In a non-limiting embodiment, said suitable parameters include parameters obtained by calculating the difference between the value of an element of a rendition of the signal at the first level of quality and the average of the corresponding elements of the predicted rendition of the signal at the second level of quality.

In other non-limiting embodiments described herein, decoding a set of residuals includes: decoding quantized transformed residuals; dequantizing quantized transformed residuals, producing transformed residuals; summing and subtracting transformed residuals with themselves and/or with suitable parameters, producing residuals.

In one non-limiting embodiment, said suitable parameters include parameters obtained by calculating the difference between the value of an element of a rendition of the signal at the first level of quality and the average of the corresponding elements of the predicted rendition of the signal at the second level of quality.

In a non-limiting embodiment, dequantization operations are performed by identifying a position in each quantization range according to given parameters.

In a non-limiting embodiment, dequantization operations are performed by means of statistical dithering, by calculating a random value comprised in the quantization range according to a given probability distribution.

In other non-limiting embodiments, decoding quantized transformed residuals includes receiving entropy encoded data and decoding it according to a suitable entropy decoding method. In a non-limiting embodiment, said entropy decoding method is a combination of Huffman decoding and Run Length ("RLE") decoding. In other non-limiting embodiments, said entropy decoding method includes a static arithmetic encoder. In other non-limiting embodiments, the entropy decoder receives parameters corresponding to a probability distribution of the symbols to be decoded.

In accordance with further non-limiting embodiments, residuals for subsequent images of a same sequence are decoded from a same common reference (support buffer), so as to effectively leverage correlation among multiple subsequent images.

In accordance with further non-limiting embodiments, one or more residuals for subsequent images of a same sequence are decoded based on the corresponding residuals of the preceding image, so as to effectively leverage correlation among multiple subsequent images.

In other non-limiting embodiment described herein, a signal processor is configured to receive a data stream and separate it into three or more sub-streams. The first sub-stream is decoded by means of a first decoding method, producing a rendition of the signal at a first level of quality. The second sub-stream is decoded by means of a second decoding method, producing enhancement data that allows the decoder to produce, based on the rendition of the signal at the first level of quality, a rendition of the signal at a second (higher) level of quality. The third sub-stream is decoded by means of a third decoding method, producing enhancement data that allows the decoder to produce, based on the rendition of the signal at the second level of quality, a rendition of the signal at a third (higher) level of quality.

In accordance with further non-limiting embodiments, the data stream is organized as an MPEG Transport Stream, and the packets of different sub-streams (corresponding to different levels of quality) have different Packed Identifiers (PIDs), indicating their belonging to different elementary sub-streams. As discussed herein, tagging of data with a first PID indicates portions of data for decoding by a first decoder; tagging of data with a second PID indicates portions of data for decoding by a second decoder; tagging of data with a third PID indicates portions of data for decoding by a third decoder; etc. In one embodiment, PIDs for the enhancement sub-streams (allowing to reconstruct the higher levels of quality) are selected so that they are ignored by legacy decoders.

In accordance with further non-limiting embodiments, the data stream is organized as an HDMI data transmission, wherein the sub-stream corresponding to the first level of quality is uncompressed video (transmitted according to the HDMI format) and the enhancement sub-stream data is transmitted as metadata. In some non-limiting embodiment, the second level of quality has a higher frame rate than the first level of quality. In other non-limiting embodiment, the second level of quality has a higher spatial resolution than the first level of quality. In a non-limiting embodiment, enhancement data is transmitted in blanking periods (maximum data of Island Packets for each horizontal blanking period is 448 bytes, leaving a total of about 480 Mbps for additional data; audio data also uses blanking periods, but a significant portion of them is available for enhancement data). In other non-limiting embodiments, the transmission of enhancement data leverages metadata transmission via Vendor-Specific InfoFrame (VSI).

In accordance with further non-limiting embodiments, the data stream is organized as a DisplayPort transmission, wherein the sub-stream corresponding to the first level of quality is uncompressed video (transmitted according to the DisplayPort format) and the enhancement sub-stream data is transmitted as metadata.

In accordance with further non-limiting embodiments, the data stream is organized as a Blu-ray disc file, wherein the sub-stream corresponding to the first level of quality is encoded as conventional Blu-ray disc video and the enhancement sub-stream data is included in the Blu-ray disc as metadata.

Different Permutations of First Embodiments

In accordance with other embodiments, computer processor hardware receives a data stream. The computer processor hardware parses the received data stream into first portions of encoded data and second portions of encoded data. The computer processor hardware implements a first decoder to decode the first portions of encoded data into a first rendition of a signal. The computer processor hardware implements a second decoder to decode the second portions of encoded data into reconstruction data. The reconstruction data specifies how to modify the first rendition of the signal. The computer processor hardware applies the reconstruction data to the first rendition of the signal to produce a second rendition of the signal.

The above first example embodiment can be implemented along with any of one or more of the following features to produce yet further embodiments below:

For example, in one embodiment, the first portions of encoded data are decoded (via a first decoder of the computer processor hardware) in accordance with an MPEG (Moving Pictures Experts Group) or MPEG-based format, such as by means of non limiting examples MPEG2, h.264, VC1, VP8, VP9, h.265, etc. The reconstruction data, which is derived from the second portions of encoded data, is decoded (via a second decoder of the computer processor hardware) in accordance with a hierarchical encoding format.

In accordance with yet further embodiments, the first portions of encoded data comprise uncompressed video data; the reconstruction data is derived from the second portions of encoded data and is decoded in accordance with a hierarchical encoding format. Note that the second portions of encoded data can be compressed data. Implementing the second decoder can include applying upsampling operations to the compressed data to produce the reconstruction data, the applied upsampling operations converting lower resolution display element settings to higher resolution display element settings.

In still further embodiments, the computer processor hardware is first computer processor hardware. The system can include second computer processor hardware (such as a legacy decoder including a first decoder and not the second decoder). The second computer processor hardware also receives the data stream. The second computer processor hardware initiates decoding of only the first portions of encoded data received in the data stream into a second first rendition of the signal; and initiates display of the second first rendition of the signal on a display screen.

As a further example, the first portions of encoded data can be decoded (using a decoder of a first type) according to a decoding method compatible with legacy decoder computer processor hardware, and the data stream is organized such that the second portions of encoded data are unused (and/or ignored) by the legacy decoder computer processor hardware. The legacy decoder computer processor hardware: i) initiates decoding of only the first portions of encoded data, and ii) initiates display of the first rendition of the signal on a respective display screen.

The data stream received by the computer processor hardware can be an HDMI (High-Definition Multimedia Interface) signal in which the first portions of encoded data (as processed by the first decoder) are uncompressed video data and the second portions of encoded data (as processed by the second decoder) are compressed data.

Alternatively, the data stream received by the computer processor hardware can be received over a DisplayPort interface in which the first portions of encoded data are uncompressed video data and the second portions of encoded data are compressed data.

By further way of a non-limiting example embodiment, the data stream can be an MPEG (Moving Pictures Experts Group) transport stream including the first portions of data (such MPEG encoded data) and the second portions of data, wherein the first portions and the second portions are characterized by different Packet Identifier (PID) numbers.

By further way of a non-limiting example embodiment, the data stream can be a file organized so as to be stored on a Blu-ray disc and to be decoded by Blu-ray disc decoder devices. The first portions of data are included in the Blu-ray format as conventional HD video data and encoded with a first encoding method (e.g., a conventional Blu-ray codec for HD video data, such as h.264 or VC1), while the second portions of data are included in the Blu-ray format as meta-data that is ignored by legacy HD Blu-ray disc decoder devices, and encoded according to a second encoding method.

In one embodiment, the signal (captured by the received portions of encoded data in the data stream) includes multiple display elements; and the second rendition of the signal is of a higher level of quality than the first rendition of the signal.

In yet further embodiments, the second rendition of the signal can be of a same display element resolution as the first rendition of the signal. Implementing the second decoder to decode the second portions of encoded data can include: decoding a first set of residual data at a first level of quality as specified by the second portions of encoded data; utilizing the first set of residual data to modify the first rendition of the signal and produce the second rendition of the signal; producing, based at least in part on the second rendition of the signal, a third rendition of the signal, the third rendition of the signal being of a higher resolution (in some embodiments, spatial resolution; in other embodiments, temporal resolution; in yet other embodiments, both spatial and temporal resolution) than a resolution of the second rendition of the signal; decoding a second set of residual data at a second level of quality as specified by the second portions of encoded data; and utilizing the second set of residual data to modify the third rendition of the signal and produce a fourth rendition of the signal.

Additionally, the computer processor hardware can be configured to perform operations of: producing, based on the fourth rendition of the signal, a fifth rendition of the signal, the fifth rendition of the signal being of a higher resolution (again, either spatial and/or temporal, according to the specific non-limiting embodiment) than a resolution of the fourth rendition of the signal; decoding a third set of residual data at a third level of quality as specified by the second portions of encoded data; and utilizing the third set of residual data to modify the fifth rendition of the signal and produce a sixth rendition of the signal. The first rendition of the signal can be an interlaced video signal; the sixth rendition of the signal can be a progressive video signal.

In other non-limiting embodiments, the received data stream includes more than two distinct portions of encoded data, decoded by more than two decoders according to more than two distinct decoding methods. In a non-limiting embodiment, the received data stream includes three portions of encoded data. The first portions of encoded data are decoded by a first decoder, producing a first rendition of the signal. The second rendition of the signal is of a same display element resolution as the first rendition of the signal. Implementing the second decoder to decode the second portions of encoded data includes: decoding a first set of residual data at a first level of quality as specified by the second portions of encoded data; utilizing the first set of residual data to modify the first rendition of the signal and produce the second rendition of the signal; producing, based at least in part on the second rendition of the signal, a third rendition of the signal, the third rendition of the signal being of a higher resolution than a resolution of the second rendition of the signal; decoding a second set of residual data at a second level of quality as specified by the second portions of encoded data; and utilizing the second set of residual data to modify the third rendition of the signal and produce a fourth rendition of the signal. Additionally, the computer processor hardware is configured to perform operations of: decoding a third set of residual data as specified by the third portion of encoded data; utilizing the third set of residual data to modify the fourth rendition of the signal and produce a fifth rendition of the signal; producing, based on the fifth rendition of the signal, a sixth rendition of the signal, the sixth rendition of the signal being of a higher resolution than a resolution of the fifth rendition of the signal; decoding a fourth set of residual data at a fourth level of quality as specified by the third portions of encoded data; utilizing the fourth set of residual data to modify the sixth rendition of the signal and produce a seventh rendition of the signal; producing, based on the seventh rendition of the signal, an eight rendition of the signal, the eight rendition of the signal being of a higher resolution than a resolution of the seventh rendition of the signal; decoding a fifth set of residual data at a fifth level of quality as specified by the third portions of encoded data; utilizing the fifth set of residual data to modify the eighth rendition of the signal and produce a ninth rendition of the signal. In a non-limiting embodiment, the first rendition of the signal is an interlaced SD video signal; the fourth rendition of the signal is an interlaced HD video signal; the ninth rendition of the signal is a progressive UltraHD video signal.

Implementing the second decoder to decode the second portions of encoded data can further include operations of: identifying upsampling operations as specified by the second portions of encoded data; and applying the upsampling operations to the second rendition of the signal to produce a third rendition of the signal, the third rendition of the signal being of a substantially higher display element resolution than a display element resolution of the second rendition of the signal. In some non-limiting embodiments the higher display element resolution is a higher spatial resolution (vertical, horizontal or both vertical and horizontal) for each field or frame of the video signal; in other non-limiting embodiments the higher display element resolution is a higher temporal resolution (i.e., a video signal at a higher frame rate); in yet other non-limiting embodiments the higher display element resolution is both a higher spatial and a higher temporal resolution in the signal.

In accordance with further embodiments, identifying upsampling operations as specified by the second portions of encoded data comprises: decoding parameters corresponding to specific coefficients of an upsampling kernel; based at least in part on the decoded parameters, producing an upsampling kernel corresponding to a portion of the third rendition of the signal; and applying the upsampling kernel to a portion of the second rendition of the signal in order to produce the portion of the third rendition of the signal. In one embodiment, the third rendition of the signal is a preliminary (or predicted) rendition of the signal at the substantially higher display element resolution. Implementing the second decoder can further comprise: utilizing the reconstruction data to modify the preliminary rendition of the signal at the substantially higher display element resolution, the modified preliminary rendition of the signal being of a same resolution but higher level of quality than the preliminary rendition of the signal. Thus, received encoded data as specified by the first portions of encoded data can be decoded in accordance with a legacy decoding method (such as MPEG-2, MPEG-4, DivX, AVC/h.264, SVC, HEVC/h.265, VC1, VP8, VP9, etc., for simplicity "MPEG data"), or in other non-limiting embodiments it can even be decoded as uncompressed video data (e.g., in accordance with an HDMI, DisplayPort or DVI transmission format). The enhancement data in the data stream (such as the second portions of encoded data) can be decoded and used to convert a rendition of the signal derived from the MPEG data into a higher level of quality playback signal. As discussed herein, the enhancement data is encoded in accordance with a non-MPEG encoding format.

In accordance with still further embodiments, from the second portions of encoded data in the received data stream, the second decoder produces reconstruction data encoded in accordance with a hierarchical format. The reconstruction data obtained or derived from the second portions of encoded data can include residual data. For example, in one embodiment, the reconstruction data includes at least a first set of residual data and a second set of residual data; the first set of residual data specifying how to modify a rendition of the signal at a first display element resolution, the second set of residual data specifying how to modify a rendition of the signal at a second display element resolution. The second display element resolution is greater than the first display element resolution. In a non-limiting embodiment, the second set of residual data is decoded based at least in part on the first set of residual data.

The computer processor hardware can be configured to perform further operations of: utilizing the first set of residual data to modify the first rendition of the signal and produce the second rendition of the signal; producing, based on the second rendition of the signal, a third rendition of the signal, the third rendition of the signal being a preliminary rendition of the signal at the second display element resolution; utilizing the second set of residual data to modify the third rendition of the signal and produce a fourth rendition of the signal at the second display element resolution.

The computer processor hardware can be configured to produce the second set of residual data from transformed residual data. In one embodiment, the computer processor hardware further performs operations of: decoding the second portions of encoded data into quantized transformed residual data; dequantizing the quantized residual data to produce transformed residual data; processing the transformed residual data, the second rendition of the signal, and the third rendition of the signal to reproduce the second set of residual data; and applying the reproduced second set of residual data to the third rendition of the signal to produce the fourth rendition of the signal.

In some non-limiting embodiments, quantized transformed residual data are decoded from the second portions of encoded data according to a static range entropy decoding method, according to a symbol probability distribution specified by the second portions of encoded data. In other non-limiting embodiments, quantized transformed residual data decoded according to a static range entropy decoding method are combined with symbols that are inherited from the lower level of quality of the signal as specified by the first set of residual data. In yet other non-limiting embodiments, quantized transformed residual data are decoded from the second portions of encoded data according to a Huffman entropy decoding method combined with a Run-Length (RLE) decoding method.

In further embodiments, the signal reproduced by the computer processor hardware and respective decoding is a video signal. A set of residual data can be produced according to temporal inheritance across multiple images (fields or frames) of the signal, i.e., one or more residuals for a given image can be decoded as specified by the residual data decoded for a different image. In such an instance, the computer processor hardware further performs operations of: decoding residual data for a field/frame based at least in part on residual data decoded for a different field/frame.

The first portions of encoded data can be interleaved amongst the second portions of encoded data in the data stream. Parsing the data stream into first portions of encoded data and second portions of encoded data can include: utilizing tags (such as one or more PIDs or Packet Identifiers) in the data stream to identify the first portions of data and the second portions of data. The data stream can be organized as an MPEG transport stream in which the first portions of encoded data (such as data encoded with an MPEG codec decodable by a legacy decoder device) are assigned a first Packet Identifier (PID) and the second portions of encoded data (such as encoded data encoded with a tier-based hierarchical method) are assigned a second Packet Identifier (PID). As previously discussed, the computer processor hardware implements a first decoder to decode the first portions of encoded data into a first rendition of the signal. The computer processor hardware implements a second decoder to decode the second portions of encoded data into reconstruction data.

The first portions of encoded data can be encoded in any suitable format, i.e., with any suitable codec. By way of non-limiting example embodiment, the first portions of encoded data can be encoded in accordance with an MPEG (Moving Pictures Experts Group) h.264 encoding format; the first portions of encoded data can be encoded according to an MPEG2 (Moving Pictures Experts Group 2) encoding format; and so on.

In accordance with some non-limiting embodiments, the encoded and reproduced signal is a video signal including multiple frames (or fields, for interlaced video signals) of display elements. For simplicity, the terms "frame" and "field" will be used interchangeably to indicate time samples of a video signal.

In accordance with some non-limiting embodiments, to render the signal, the computer processor hardware can be configured to further performs operations of: identifying timing associations between the first portions of encoded data and the second portions of encoded data, the timing associations indicating to which of the multiple frames of display elements in the first rendition of the signal the reconstruction data pertains. Applying the reconstruction data to the first rendition of the signal to produce a second rendition of the signal can include: in accordance with the timing associations, utilizing the reconstruction data to temporally upsample the first rendition of the signal into the second rendition of the signal, the second rendition of the signal including a greater number of frames of display elements than the first rendition of the signal. Thus, the timing associations enable the computer processor hardware to identify a relationship between the first portions of encoded data and the second portions of encoded data, further enabling the data stream to convert a rendition of the signal derived from the first portions of encoded data into a higher level of quality signal using the second portions of encoded data in the data stream.

In accordance with yet further embodiments, the signal is a video signal in which the first rendition of the signal is of a first frame rate; the second rendition of the signal is of a second frame rate, the second frame rate greater than the first frame rate. The computer processor hardware further performs operations of: producing, based on the first rendition of the signal at the first frame rate and as specified by the reconstruction data, a preliminary rendition of the signal at the second frame rate; producing a set of residual data as specified by the reconstruction data; and applying the set of residual data to the preliminary rendition of the signal at the second frame rate to produce the second rendition of the signal.

In further embodiments, applying the reconstruction data includes: as specified by the reconstruction data, spatially upsampling the second rendition of the signal into a third rendition of the signal, the third rendition of the signal having a higher display element resolution than the second rendition of the signal.

In yet further embodiments, the reconstruction data includes a hierarchy of residual data encoded in accordance with multiple display element resolutions. The second decoder applies upsampling operations to the second portions of encoded data to reproduce the hierarchy of residual data. The hierarchy of residual data is a unique way of compressing data that is used to derive higher levels of quality of the signal.

As previously discussed, the signal can be a video signal. The hierarchy of residual data can be produced according to temporal inheritance of residuals across multiple frames of display elements in the signal. The computer processor hardware, at a given level of the hierarchy of residual data, decodes the residual data for a first frame/field based at least in part on residual data decoded for a second frame/field. The second frame/field corresponds to a point in time different than a point in time to which the first frame/field pertains.

In further non-limiting embodiments, the hierarchy of residual data is produced according to spatial inheritance of residuals within a given frame/field of display elements in the signal. The computer processor hardware, at a given level of quality in the hierarchy of residual data, decodes residual data for a portion of the given frame/field based only on reconstruction data decoded for a lower level of quality in the hierarchy of residual data.

In further non-limiting embodiments, the hierarchy of residual data is produced according to both spatial inheritance of residuals within a given frame/field of display elements in the signal and temporal inheritance of residual data across different frames/fields. The computer processor hardware, at a given level of quality in the hierarchy of residual data, decodes residual data for a portion of the given frame/field based only on reconstruction data decoded for a lower level of quality in the hierarchy of residual data and on a reference set of residual data.

In still further embodiments, the computer processor hardware further performs operations of: deriving a first set of residual data from a base set of residual data; deriving a second set of residual data from the base set of residual data, the first set of residual data different than the second set of residual data; applying the first set of residual data to a first time sample of the first rendition of the signal to produce a corresponding first time sample in the second rendition of the signal; and applying the second set of residual data to a second time sample of the first rendition of the signal to produce a corresponding second time sample in the second rendition of the signal. Based on the second rendition of the signal, the computer processor hardware produces a third rendition of the signal, the third rendition of the signal being a preliminary rendition of the signal at a substantially higher display element resolution. The computer processor hardware further: decodes a second base set of residual data; derives a third set of residual data from the second base set of residual data; derives a fourth set of residual data from the second base set of residual data, the third set of residual data different from the fourth set of residual data; applies the third set of residual data to a first time sample of the third rendition of the signal to produce a corresponding first time sample in a fourth rendition of the signal; and applies the fourth set of residual data to a second time sample of the third rendition of the signal to produce a corresponding second time sample in the fourth rendition of the signal.

In accordance with yet additional embodiments, the computer processor hardware: decodes the second portions of encoded data into transformed residual data; processes the transformed residual data to produce quantized residual data; dequantizes the quantized residual data to reproduce residual data; and applies the reproduced residual data to the first rendition of the signal to produce the second rendition of the signal.

By further way of non-limiting example, the computer processor hardware can be configured to: decode the second portions of encoded data into residual data at a first level of quality; produce, based on the residual data at the first level of quality, a preliminary rendition of residual data at a second level of quality, the second level of quality higher than the first level of quality; decode the second portions of encoded data into quantized transformed residual data; dequantize the quantized transformed residual data to produce transformed residual data; process a combination of the transformed residual data, the residual data at the first level of quality, and the preliminary rendition of residual data at the second level of quality to reproduce residual data at the second level of quality; and apply the reproduced residual data at the second level of quality to the first rendition of the signal to produce the second rendition of the signal.

Additionally, the computer processor hardware can be configured to: produce, based on the second rendition of the signal, a third rendition of the signal, the third rendition of the signal being a preliminary rendition of the signal at a substantially higher display element resolution; decode the second portions of encoded data into a new set of transformed residual data; process a combination of the new set of transformed residual data, the second rendition of the signal, and the third rendition of the signal to produce a new set of residual data; and apply the new set of residual data to the third rendition of the signal to produce the fourth rendition of the signal.

In further embodiments, the computer processor hardware can be configured to: apply an upsampling operation to the second rendition of the signal to produce a third rendition of the signal, the third rendition of the signal being of a substantially higher display element resolution than the second rendition of the signal. Application of the upsampling operation can include deriving settings for a display element in the third rendition of the signal is based on settings for multiple display elements in the second rendition of the signal.

In one embodiment, as previously discussed, the reconstruction data includes residual data. The computer processor hardware applies the residual data to multiple display elements in the third rendition of the signal to produce a fourth rendition of the signal. The applied residual data modifies the settings of the multiple display elements in the third rendition of the signal to produce settings for the corresponding display elements in a fourth rendition of the signal. Additionally, when implementing the second decoder to decode the second portions of encoded data into residual data, the second decoder decodes at least one residual in the residual data by combining a result with a substantially random number generated according to a given probability distribution.

In accordance with still further embodiments, the computer processor hardware decodes at least some of the second portions of encoded data via Huffman entropy decoding and/or Run Length (RLE) decoding methods.

In yet further embodiments, the computer processor hardware decodes encoded data via a static range entropy decoder in accordance with a symbol probability distribution specified in the reconstruction data. In accordance with another embodiment, the computer processor hardware decodes encoded data via a static arithmetic entropy decoder in accordance with a symbol probability distribution specified in the reconstruction data.

Different Permutations of Second Embodiments

In accordance with further embodiments, computer processor hardware receives a data stream. The computer processor hardware parses the data stream into first portions of encoded data, second portions of encoded data, and third portions of encoded data. The computer processor hardware implements a first decoder to decode the first portions of encoded data into a first rendition of a signal at a first level of quality. The computer processor hardware implements a second decoder to decode the second portions of encoded data into first reconstruction data, the first reconstruction data specifying how to modify the first rendition of the signal into a second rendition of the signal at a second level of quality, the second level of quality greater than the first level of quality. The computer processor hardware processes the first reconstruction data and the first rendition of the signal to produce a second rendition of the signal at the second level of quality. The computer processor hardware implements a third decoder to decode the third portions of encoded data into second reconstruction data. The second reconstruction data specifies how to modify the second rendition of the signal into a third rendition of the signal at a third level of quality. The third level of quality is greater than the second level of quality. The computer processor hardware processes the second reconstruction data and the second rendition of the signal to produce a third rendition of the signal at the third level of quality.

This second example embodiment can be implemented along with any of one or more of the following features to produce yet further embodiments below or other embodiments as described herein.

For example, in one non-limiting embodiment, the first portions of encoded data can be decoded in accordance with an MPEG (Moving Pictures Experts Group) format, such as MPEG2, h.264, VC1, h.265, etc. The computer processor hardware derives the first reconstruction data from the second portions of encoded data. The computer processor hardware derives the second reconstruction data from the third portions of encoded data. Both the second portions of encoded data and third portions of encoded data can be compressed video data encoded in accordance with one or more hierarchical encoding formats.

Different Permutations of Third Embodiments

In accordance with further embodiments, computer processor hardware receives a data stream. The computer processor hardware parses the received data stream into portions of already decoded data and not-yet decoded encoded data. The decoded data specifies settings associated with a first rendition of a signal. In one embodiment, the computer processor hardware utilizes the decoded data (such as uncompressed data) to produce a first rendition of the signal. The computer processor hardware implements a decoder to decode the encoded data (such as compressed data) into reconstruction data. The reconstruction data specifies how to modify the first rendition of the signal. The computer processor hardware applies the reconstruction data to the first rendition of the signal to produce a second rendition of the signal.

This example embodiment can be implemented along with any of one or more of the following features to produce yet further non-limiting embodiments below.

For example, in accordance with other embodiments, the encoded data in the data stream can be encoded in accordance with a hierarchical encoding format in which data is encoded in accordance with different resolutions in a respective compression hierarchy. The computer processor hardware applies upsampling operations to produce residual data at higher levels in the hierarchy. In one embodiment, the upsampling operations convert lower resolution display element settings to higher resolution display element settings that are subsequently used to modify a preliminary rendition of the signal. In one embodiment, upsampled element settings (i.e., a preliminary set of residual data at a higher level of quality) are combined with relative residual data decoded from reconstruction data in order to produce the higher resolution residual data that are subsequently used to modify a preliminary rendition of the signal.

In accordance with further embodiments: the signal is a video signal specifying settings for multiple display elements; the second rendition of the signal is of a higher level of quality than the first rendition of the signal; and the second rendition of the signal is of a same display element resolution as the first rendition of the signal.

Implementing the decoder to decode the encoded data can include: identifying upsampling operations as specified by the encoded data; and applying the upsampling operations to the second rendition of the signal to produce a third rendition of the signal, the third rendition of the signal being of a substantially higher display element resolution (temporal and/or spatial) than the second rendition of the signal. In some non-limiting embodiments the third rendition of the signal is of a same temporal display element resolution and of a substantially higher spatial display element resolution than the second rendition of the signal. In other non-limiting embodiments the third rendition of the signal is of a substantially higher temporal display element resolution (i.e., of a higher frame rate) and of a same spatial display element resolution than the second rendition of the signal. In yet other non-limiting embodiments the third rendition of the signal is of a substantially higher temporal and spatial display element resolution than the second rendition of the signal.

In accordance with still further embodiments, the third rendition of the signal can be a preliminary rendition of the signal at the substantially higher display element resolution. Implementing the decoder can further comprise: utilizing the reconstruction data to modify the preliminary rendition of the signal at the substantially higher display element resolution, the modified preliminary rendition of the signal being of a higher level of quality than the preliminary rendition of the signal.

Different Permutations of Fourth Embodiments

Embodiments herein include computer processor hardware that: receives a signal; implements a first encoder to produce first portions of encoded data to reproduce a first rendition of the signal; implements a second encoder (generator of reconstruction data) to produce second portions of encoded data, the second portions of encoded data indicating how to modify the first rendition of the signal and produce a second rendition of the signal, the second rendition of the signal being of a higher level of quality than the first rendition of the signal. The computer processor hardware (such as combiner of encoder) produces the data stream to include the first portions of encoded data and the second portions of encoded data. The computer processor hardware transmits the data stream to at least one destination (such as first remote playback resource, a second remote playback resource, etc.).

In one embodiment, the computer processor hardware initiates transmission of the data stream over an MPEG transport stream. In accordance with further embodiments, the computer processor hardware can be configured to produce the first portions of encoded data in accordance with an MPEG compression protocol. The computer processor hardware can be configured to produce the second portions of encoded data according to a hierarchical encoding compression protocol. The second portions of encoded data can include compressed residual data as well as specify upsample operations to be applied to modify the first rendition of the signal into the second rendition of the signal.

In accordance with further embodiments, the encoder tags the first portions of encoded data with a first unique tag indicating that the first portions of encoded data are to be decoded by a first decoder. The encoder tags the second portions of encoded data with a second unique tag indicating that the second portions of encoded data are to be decoded by a second decoder.

In yet further embodiments, the computer processor hardware transmits the data stream to a first destination that decodes only the first portions of encoded data to reproduce and play back the first rendition of the signal. The computer processor hardware transmits the data stream to a second destination that decodes the first portions of encoded data and the second portions of encoded data. The second destination reproduces the first rendition of the signal based on the decoded first portions of encoded data; the second destination further applies the decoded second portions of encoded data to the first rendition of the signal to produce and play back the second rendition of the signal.

Different Permutations of Fifth Embodiments

Another embodiments herein includes a computer processor hardware system comprising: parser logic to parse a data stream into first portions of encoded data and second portions of encoded data; a first decoder to decode the first portions of encoded data into a first rendition of a signal; a second decoder to decode the second portions of encoded data into reconstruction data, the reconstruction data specifying how to modify the first rendition of the signal; and the second decoder applying the reconstruction data to the first rendition of the signal to produce a second rendition of the signal.

In accordance with yet additional embodiments, the first decoder of the computer processor hardware system decodes the first portions of encoded data in accordance with an MPEG (Moving Pictures Experts Group) format. The second decoder decodes the reconstruction data derived from the second portions of encoded data in accordance with a hierarchical decoding format.

In yet further embodiments, the first portions of encoded data comprise uncompressed video data; and the reconstruction data is derived from the second portions of encoded data are decoded in accordance with a hierarchical encoding format. The second portions of encoded data are compressed data, and the second decoder applies upsampling operations to the compressed data to produce the reconstruction data, the applied upsampling operations converting lower resolution display element settings to higher resolution display element settings.

Note that embodiments herein may be implemented in software or hardware, or may be implemented using a combination of software and hardware, and can include a configuration of one or more computerized devices, routers, network, workstations, handheld or laptop computers, tablets, mobile phones, game consoles, set-top boxes, video conference equipment, video players, etc., to carry out and/or support any or all of the method operations disclosed herein. In other words, one or more computerized devices or processors can be programmed and/or configured to operate as explained herein to carry out different embodiments.

In addition to the techniques as discussed above, yet other embodiments herein include software programs to perform the steps and operations summarized above and disclosed in detail below. One such embodiment comprises a computer-readable, hardware storage resource (i.e., a non-transitory computer readable media) including computer program logic, instructions, etc., encoded thereon that, when performed in a computerized device having a processor and corresponding memory, programs and/or causes the processor to perform any of the operations disclosed herein. Such arrangements can be provided as software, code, and/or other data (e.g., data structures) arranged or encoded on a computer readable medium such as an optical medium (e.g., CD-ROM, DVD-ROM or BLU-RAY), flash memory card, floppy or hard disk or any other medium capable of storing computer readable instructions such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes a computer-readable hardware storage medium having instructions stored thereon for supporting signal processing operations. The instructions, when executed by computer processor hardware, cause the computer processor hardware of the system to: parse a data stream into first portions of encoded data and second portions of encoded data; implement a first decoder to decode the first portions of encoded data into a first rendition of a signal; implement a second decoder to decode the second portions of encoded data into reconstruction data, the reconstruction data specifying how to modify the first rendition of the signal; and apply the reconstruction data to the first rendition of the signal to produce a second rendition of the signal.

Another embodiment of the present disclosure is directed to a computer program product that includes a computer-readable hardware storage medium having instructions stored thereon for supporting signal processing operations. The instructions, when executed by computer processor hardware, cause the computer processor hardware of the system to: parse a data stream into first portions of encoded data, second portions of encoded data, and third portions of encoded data; implement a first decoder to decode the first portions of encoded data into a first rendition of a signal at a first level of quality; implement a second decoder to decode the second portions of encoded data into first reconstruction data, the first reconstruction data specifying how to modify the first rendition of the signal into a second rendition of the signal at a second level of quality, the second level of quality greater than the first level of quality; process the first reconstruction data and the first rendition of the signal to produce a second rendition of the signal at the second level of quality; implement a third decoder to decode the third portions of encoded data into second reconstruction data, the second reconstruction data specifying how to modify the second rendition of the signal into a third rendition of the signal at a third level of quality, the third level of quality greater than the second level of quality; and process the second reconstruction data and the second rendition of the signal to produce a third rendition of the signal at the third level of quality.

Another embodiment of the present disclosure is directed to a computer program product that includes a computer-readable hardware storage medium having instructions stored thereon for supporting signal processing operations. The instructions, when executed by computer processor hardware, cause the computer processor hardware of the system to: parse a received data stream into decoded data and encoded data, the decoded data specifying settings associated with a first rendition of a signal; utilize the decoded data to produce the first rendition of the signal; implement a decoder to decode the encoded data into reconstruction data, the reconstruction data specifying how to modify the first rendition of the signal; and apply the reconstruction data to the first rendition of the signal to produce a second rendition of the signal.

Another embodiment of the present disclosure is directed to a computer program product that includes a computer-readable hardware storage medium having instructions stored thereon for supporting signal processing operations. The instructions, when executed by computer processor hardware, cause the computer processor hardware of the system to: receive a signal; implement a first encoder to produce first portions of encoded data to reproduce a first rendition of the signal; implement a second encoder to produce second portions of encoded data, the second portions of encoded data indicating how to modify the first rendition of the signal and produce a second rendition of the signal, the second rendition of the signal being of a higher level of quality than the first rendition of the signal; produce a data stream to include the first portions of encoded data and the second portions of encoded data; and transmit the data stream to at least one destination.

The ordering of the steps has been added for clarity sake. These steps can be performed in any suitable order.

Other embodiments of the present disclosure include software programs, firmware, and/or respective hardware to perform any of the method embodiment steps and operations summarized above and disclosed in detail below.

Also, it is to be understood that the system, method, apparatus, instructions on computer readable storage media, etc., as discussed herein can be embodied strictly as a software program, as a hybrid of software, firmware, and/or hardware, or as hardware alone such as within a processor, or within an operating system or within a software application, etc.

As discussed above, techniques herein are well suited for use in software, firmware, and/or hardware applications that process signals and produce bitstreams of encoded data, or that process bitstreams of encoded data and produce renditions of signals. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended that each of the concepts can be executed independently of each other or in combination with each other. Accordingly, the one or more present inventions, embodiments, etc., as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIGS. 1A, 1B, 1C, 1D, 1G, and 1H are example diagrams illustrating decoding systems and methods to according to embodiments herein.

DETAILED DESCRIPTION OF EMBODIMENTS

Methods illustrated herein are suitable for any type of multi-dimensional signals, including without limitation sound signals, multichannel sound signals, pictures, two-dimensional images, video signals, multi-view video signals, 3D video signals, volumetric signals, volumetric video signals, medical imaging signals, signals with more than four dimensions, etc.

For simplicity, along the description the illustrated embodiments usually adopt the use case of encoding and decoding of video sequences, i.e., time-based signals consisting of a sequence of 2D images (commonly called "frames", or "fields" in the case of interlaced video signals, terms used substantially interchangeably within this application), with each element (in such non-limiting example case typically referred to as "pixel") being characterized by a set of color settings in a suitable color space (e.g., YUV, RGB, HSV, etc.). Different color planes (e.g., the luminance-Y plane and the two chrominance—U and V—planes) are often encoded separately, and often with different resolutions (due to the lower sensitivity of the human eye to chrominance information), although the U and V planes typically leverage motion compensation information calculated for the Y plane.

Methods and embodiments illustrated herein can be used in conjunction with one another and/or with other methods. Many of the preferred embodiments illustrated herein describe techniques and algorithms with the goal of achieving multiscale decoding (e.g., by way of non-limiting example, inclusion of an SD (Standard Definition) and an HD (High Definition) version of a same TV (television) channel in a single data stream) and efficient compression (i.e., encoding a suitable rendition of the signal with a minimum quantity of bits). This also is a non-limiting example: other non-limiting embodiments achieve different purposes, such as reduction of processing power consumption, energy efficiency, CPU heat reduction, use of parallel processing architectures, etc.

Figure 1A:
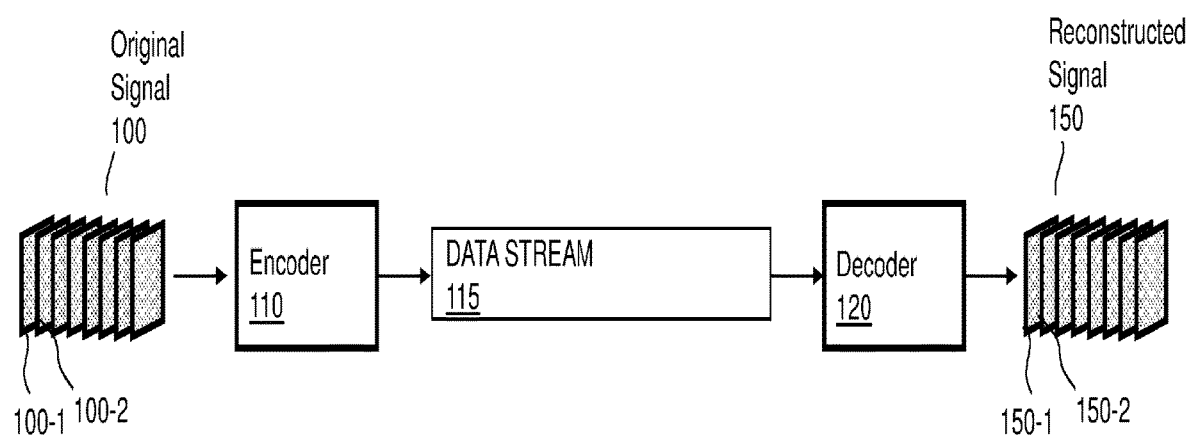

FIG. 1A is a non-limiting example diagram illustrating an encoding and decoding system according to embodiments herein.

Encoder 110 receives signal 100 and encodes it into data stream 115. Decoder 120 receives data stream 115 and produces reconstructed signal 150. In a non-limiting embodiment, signal 100 and signal 150 are video signals, each comprising a respective sequence of images 100-1, 100-2, ..., 100-n and 150-1, 150-2, ..., 150-n. Each image 150-i of signal 150 is a reconstructed rendition of a respective original image 100-i of signal 100. For example, image 150-1 is a reconstruction of image 100-1; image 150-2 is a reconstruction of original image 100-2; and so on.

FIG. 1B is a non-limiting example diagram illustrating multiscale encoding and decoding systems according to embodiments herein.

In this example embodiment, computer processor hardware 106 includes decoder 120 and legacy decoder 130.

Encoder 110 receives signal 100 and encodes it into a hybrid multiscale data stream 115. legacy decoder 130 receives data stream 115 and produces reconstructed SD signal 140 at a first level of quality. Decoder 120 receives data stream 115 and produces reconstructed HD signal 150 at a second level of quality, the second level of quality being higher than the first.

In a non-limiting embodiment, the second level of quality signal 150 has a higher resolution (spatial and/or temporal) than the first level of quality. In another non-limiting embodiment, legacy decoder 130 leverages MPEG-based decoding techniques (e.g., MPEG2, h.264, etc.) in order to decode a portion of data stream 115. In another non-limiting embodiment, decoder 120 produces reconstructed SD signal 140 as a baseline to produce reconstructed HD signal 150. In other words, the computer processor hardware 106 can be configured to use the reconstructed SD signal 140 as a baseline to produce reconstructed HD signal 150.

In one embodiment, data stream 115 comprises information that is ignored by legacy decoder 130 and that is decoded by decoder 120, allowing decoder 120 to produce, based on reconstructed SD signal 140, reconstructed HD Signal 150. In a non-limiting embodiment, the second level of quality of signal 150 has a resolution obtained by upsampling with given scale factors one or more spatial dimensions of the signal 140 at the first level of quality.

In a non-limiting example embodiment, a decoding signal processor of a TV set top box is programmed so as to implement a method as illustrated in FIG. 1B, wherein the data stream 115 corresponds to a received broadcast signal in the form of an MPEG Transport Stream. As previously discussed, and as further discussed below, the data stream 115 includes first portions of encoded data for decoding by legacy decoder 130 to produce reconstructed SD signal 140 and second portions of encoded data (enhancement data) for decoding by decoder 120. In one embodiment, enhancement data corresponds to information used by decoder 120 to produce, based on reconstructed SD signal 140, reconstructed HD signal 150. In one embodiment, the data in data stream 115 used to produce reconstructed SD signal 150 is characterized by a Transport Stream Packet Identifier (PID) that is different from the PID of the main elementary stream that corresponds to reconstructed SD signal 140. In other words, in one embodiment, first portions of encoded data that are decoded by legacy decoder 130 to reproduce signal 140 are tagged with a first unique identifier value (such as a first PID); second portions of encoded data that are to be decoded by decoder 120 and produce signal 150 are tagged with a second unique identifier value (such as a second PID).

Multiple different types of decoder devices (e.g., by way of non-limiting example, set-top boxes or similar resources) can be configured to receive the data stream 115. A first set of one or more of the decoder devices in a network environment may include only a legacy decoder 130. In such an instance, the decoder devices receiving data stream 115 are able to decode only first portions of encoded data to produce the reconstructed SD signal 140 for display on a respective display screen. The corresponding computer processor hardware initiates decoding of only the first portions of encoded data received in the data stream into the first rendition of the signal. In other words, the second portions of encoded data are unused by the legacy decoder 130. The computer processor hardware (e.g., in a set top box or similar resource) then initiates display of the first rendition of the signal on a display screen. Thus, legacy decoders are able to receive the data stream 115 and still display a rendition of the signal, albeit at a lower level of quality such as SD rather than a higher level of quality HD.

Upgraded decoder devices including decoder 120 have the ability to decode the first portions of encoded data as well as the second portions of encoded data in data stream 115 to reproduce the reconstructed HD signal 150. In this way, legacy set top boxes and respective decoders receive the same data stream 115, but just ignore the enhancement data (second portions of encoded data) and decode the signal up to the first level of quality (such as reconstructed SD signal 140). In accordance with other non-limiting embodiments, a hybrid multiscale data stream comprising first portions of encoded data and second portions of encoded data is stored on a Blu-ray disc or other suitable storage resource according to a suitable Blu-ray video format or other suitable format, wherein second portions of encoded data (enhancement data) are included as meta-data. Legacy Blu-ray decoders ignore the enhancement data, decoding the first portions of encoded data into a video signal at a first level of quality (such as full HD). Upgraded UltraHD Blu-ray decoders decode both the first portions of encoded data and the second portions of encoded data, using the video signal at the first level of quality as a baseline to decode a video signal at a second (higher) level of quality (such as UltraHD).

Figure 1C:
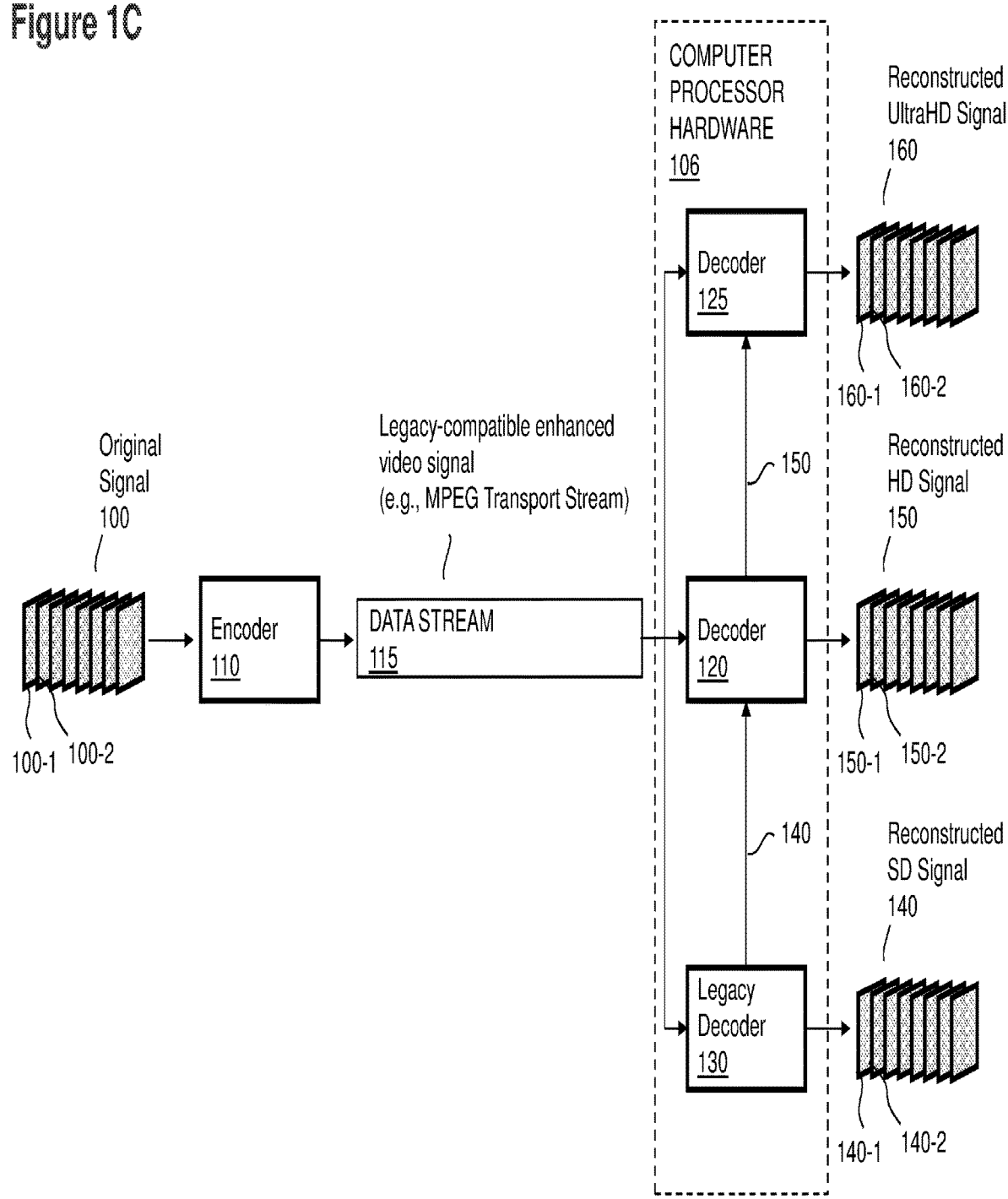

FIG. 1C is a non-limiting example diagram illustrating multiscale encoding and decoding systems with multiple enhancement layers according to embodiments herein.

As shown, this example implementation of computer processor hardware 106 includes decoder 130, decoder 120, and decoder 125.

In this non-limiting example embodiment, encoder 110 receives original signal 100 at the highest level of quality (such as UltraHDp60) and encodes it into a multiscale data stream 115. Legacy decoder 130 receives data stream 115 and produces reconstructed SD signal 140 at a first level of quality (such as interlaced SD 576i60). Decoder 120 receives data stream 115 and produces reconstructed HD signal 150 at a second level of quality (such as interlaced full HD 1080i60), the second level of quality being higher than the first. Decoder 125 receives data stream 115 and produces reconstructed UltraHD signal 160 at a third level of quality (such as progressive UltraHDp60), the third level of quality being higher than the second.

In a further non-limiting embodiment, legacy decoder 130 leverages MPEG-based decoding techniques (e.g., MPEG2, h.264, etc.) in order to decode data stream 115. In another non-limiting embodiment, decoder 130 produces reconstructed SD signal 140, decoder 120 uses signal 140 as a baseline to produce reconstructed HD signal 150; decoder 125 then uses reconstructed HD signal 150 as a baseline to produce reconstructed UltraHD signal 160.

Data stream 115 comprises information that is ignored by legacy decoder 130 and that is decoded by decoder 120, allowing decoder 120 to produce, based on reconstructed SD signal 140, reconstructed HD signal 150. Data stream 115 also comprises information that is ignored by decoder 120 and that is decoded by decoder 125, allowing decoder 125 to produce, based on reconstructed HD Signal 150, reconstructed UltraHD signal 160.

In this manner, different portions of encoded data in the received data stream 115 are used to convert a reconstructed lower level of quality signal into a reconstructed higher level of quality signal.

More specifically, the computer processor hardware 106 utilizes the first portions of encoded data in data stream 115 to produce reconstructed SD signal 140. Decoder 120 decodes second portions of encoded data in data stream 115. The computer processor hardware 106 utilizes the decoded second portions of encoded data to convert the reconstructed SD signal 140 into reconstructed HD signal 150. Yet further, decoder 125 decodes third portions of encoded data in data stream 115. The computer processor hardware 106 utilizes the decoded third portions of encoded data to convert the reconstructed HD signal 150 into a reconstructed ultra HD signal 160.

According to some non-limiting embodiments, second portions of encoded data in data stream 115 are decoded by computer processor hardware 106 based at least in part on reconstructed SD signal 140, and third portions of encoded data in data stream 115 are decoded by computer processor hardware 106 based at least in part on reconstructed HD signal 150.

In a non-limiting embodiment, decoder 125 produces the third level of quality by first combining reconstructed HD signal 150 with a first set of residuals, then by upsampling the signal by a vertical factor of two or other suitable value (turning interlaced HD into progressive HD), then by combining the generated signal with a second set of residuals, then by upsampling with a scale factor of two for both spatial dimensions (producing a predicted—or preliminary—rendition of the signal at the third level of quality), and finally by combining the predicted rendition of the signal at the third level of quality with a third set of residuals.

In a non-limiting example embodiment, a decoding signal processor of a TV set top box is programmed so as to implement a method of decoding as illustrated in FIG. 1C, wherein the data stream 115 corresponds to the received broadcast signal in the form of an MPEG Transport Stream according to a standard such as ISO/IEC 13818-1 and ETSI EN 50083-9. Enhancement data (such as second portions of encoded data and third portions of encoded data, etc.) corresponding to information used by decoder 120 and by decoder 125 to produce, based on reconstructed SD signal 140, reconstructed HD signal 150 and reconstructed UltraHD 160 are characterized, respectively, by unique transport stream Packet Identifiers (PIDs) that are different from the PID of the main elementary stream (first portions of encoded data, such as MPEG encoded data) that are used to produce reconstructed SD signal 140. In this way, legacy set top box decoders (that include only a legacy decoder 130 to decode data encoded with a legacy MPEG format) receive the same data stream 115, but just ignore the enhancement data and decode the signal up to the first level of quality (SD level of quality).

In accordance with yet additional embodiments in FIG. 1C, via tags, the computer processor hardware 106 parses the data stream 115 into first portions of encoded data (data tagged with a first tag value), second portions of encoded data (data tagged with a second tag value), and third portions of encoded data (data tagged with a third tag value).

The computer processor hardware 106 implements a first decoder 130 to decode the first portions of encoded data into a first rendition of a signal (such as reconstructed SD signal 140) at a first level of quality. The computer processor hardware 106 implements a second decoder 120 to decode the second portions of encoded data into first reconstruction data. The first reconstruction data specifies how to modify the first rendition of the signal 140 into a second rendition of the signal 150 at a second level of quality. The second level of quality is greater than the first level of quality. In other words, the second level of quality signal is nearer to an original signal from which the renditions of the signal are derived. The computer processor hardware 106 processes the first reconstruction data and the first rendition of the signal 140 to produce a second rendition of the signal 150 at the second (higher) level of quality.

In one embodiment, the computer processor hardware 106 implements a third decoder 125 to decode the third portions of encoded data in the data stream 115 into second reconstruction data. The second reconstruction data specifies how to modify the second rendition of the signal 150 into a third rendition of the signal 160 at a third level of quality. The third level of quality is greater than the second level of quality. The computer processor hardware 106 processes the second reconstruction data and the second rendition of the signal 150 to produce a third rendition of the signal 160 at the third level of quality.

By way of further non-limiting example, the first portions of encoded data can be decoded in accordance with an MPEG (Moving Pictures Experts Group) format. The first reconstruction data can be derived from the second portions of encoded data in the data stream 115. The second reconstruction data can be derived from the third portions of encoded data in the data stream 115. Both the second portions of encoded data and the third portions of encoded data in the data stream can be decoded into respective reconstruction data in accordance with different encoding formats, such as by way of non-limiting example hierarchical, compressed data encoding formats.

Figure 1D:
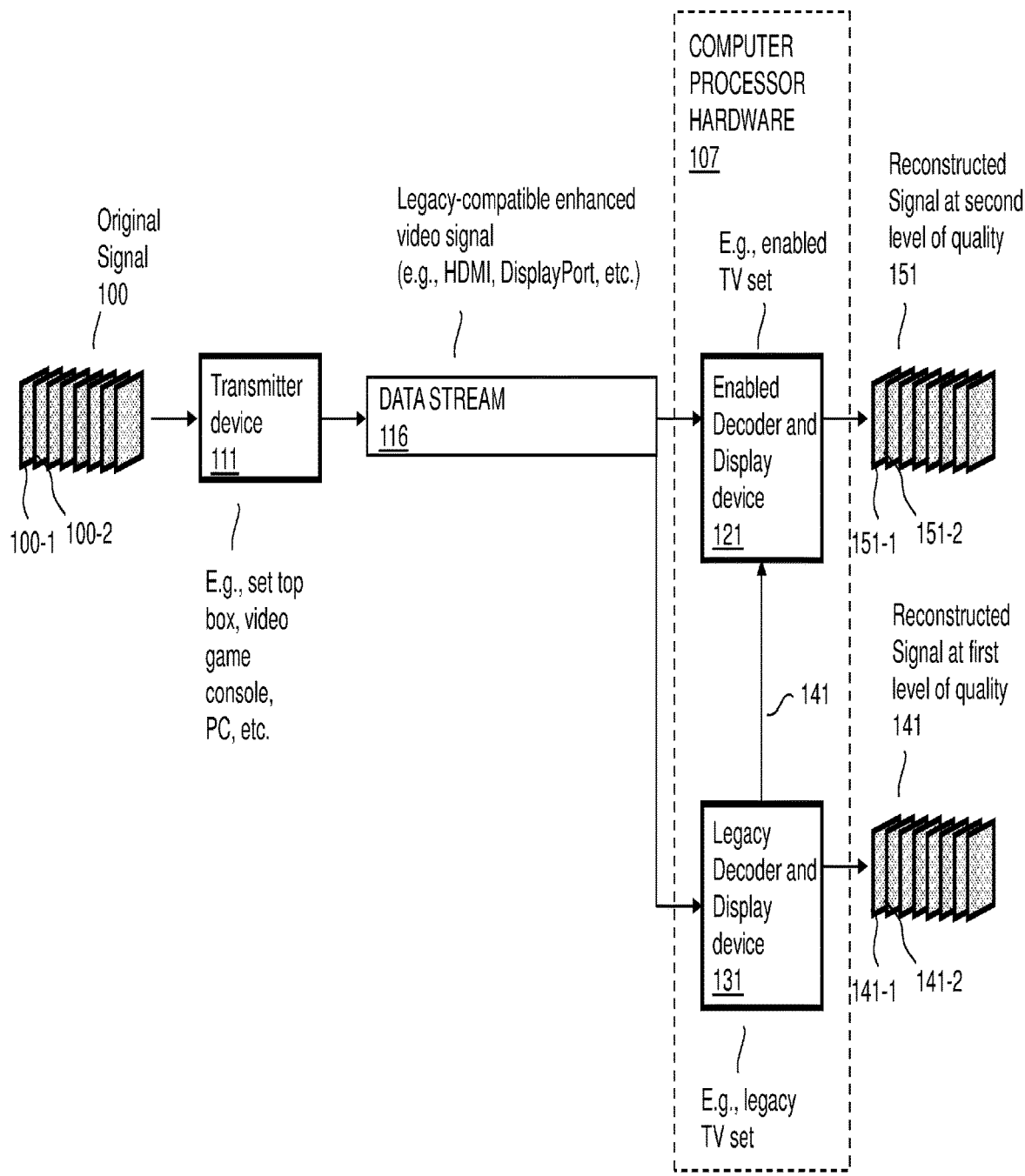

FIG. 1D is a non-limiting example diagram illustrating multiscale backward-compatible transmission to a display device with enhancement metadata according to embodiments herein.

In this example embodiment, computer processor hardware 106 includes enabled decoder and display device 121 and legacy decoder and display device 131.

Transmitter device 111 receives original signal 100 at the highest level of quality (such as UltraHDp120) and produces a multiscale data stream 115, according to a given transmission format (such as, by way of non-limiting example, an HDMI format for transmission over a link such as an HDMI cable). Legacy decoder and display device 131 receives data stream 115 and produces reconstructed signal 141 at a first level of quality (such as UltraHDp60). Enabled decoder and display device 121 receives data stream 115 and produces reconstructed signal 151 at a second level of quality (such as UltraHDp120), the second level of quality being higher than the first.

In a non-limiting embodiment, the first level of quality of data (such as uncompressed data) is transmitted in data stream 116 as uncompressed video data, according to a standard transmission format that is compatible with legacy devices (such as HDMI, DisplayPort or DVI). The enhancement data, such as compressed data transmitted in data stream 116, is transmitted as encoded meta-data, and is decoded by enabled decoder and display device 121 in order to produce, based on reconstructed signal 141 at the first level of quality, reconstructed signal 151 at the second level of quality.

In a non-limiting example embodiment, a decoding signal processor of a TV set is programmed so as to implement a method as illustrated in FIG. 1D, wherein datastream 116 corresponds to the received HDMI signal. Enhancement data data in stream 116 such as compressed data is information used by decoder 121 to produce, using reconstructed signal 141 as a baseline, reconstructed signal 151. In one non-limiting embodiment, the enhancement data is transmitted as Island Packets in horizontal blanking periods of the HDMI transmission (audio data also uses blanking periods, but a significant portion of blanking periods is available for enhancement data). In other non-limiting embodiments, the transmission of enhancement data (additional compressed data in data stream 116 to convert the reconstructed signal 141 into reconstructed signal 151) leverages HDMI metadata transmission via Vendor-Specific InfoFrame (VSI). In other non-limiting embodiments, the transmission leverages a DisplayPort cable, and enhancement data is transmitted as meta-data within the DisplayPort format.

By transmitting enhancement data (such as hierarchical, compressed enhancement data) as encoded meta-data, legacy display devices that are not able to interpret the meta-data receive the same data stream 116, but just ignore the enhancement data and display the signal 141 at the first level of quality. In this way, for instance, a game console adopting the method can transmit via HDMI (or DisplayPort) a video signal at higher resolution and/or higher frame rate than what would be feasible by just adopting the conventional (uncompressed) transmission format needed to reproduce the signal 141 (including image 141-1, image 141-2, . . . ). The receiving non-enabled display devices just decode and display the signal 141 at the first level of quality, while enabled display devices and decoders are able to also decode the additional enhancement data (compressed data), reconstructing a rendition of the signal at one or more higher levels of quality.

Figure 1E:
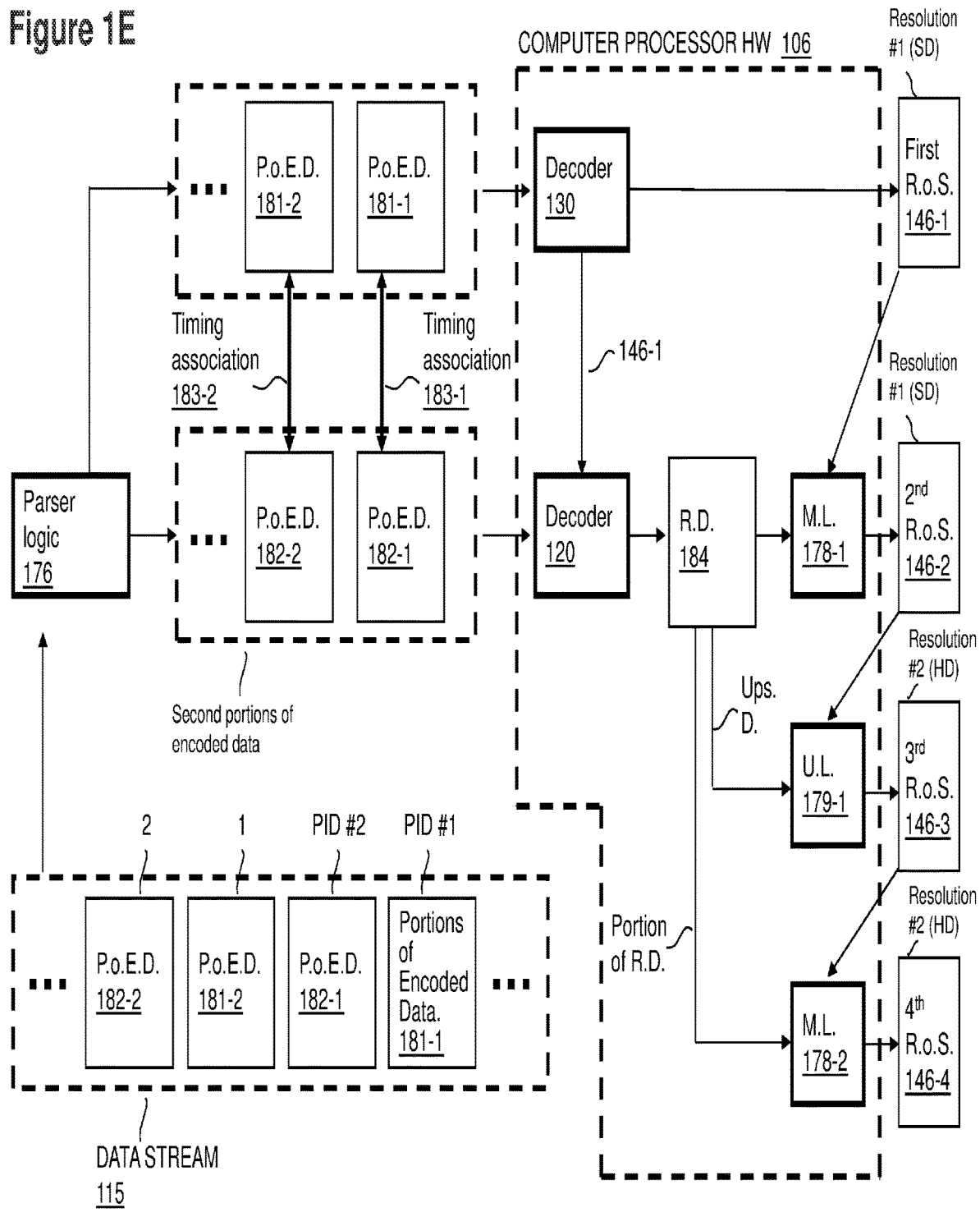
FIG. 1E is an example diagram illustrating computer processor hardware processing a respective data stream according to embodiments herein.

FIG. 1E is an example diagram illustrating computer processor hardware processing a respective data stream according to embodiments herein.

As shown, data stream 115 includes first portions of encoded data 181 (first compressed data) and second portions of encoded data 182 (second compressed data). In one embodiment, the data stream 115 is received as an MPEG (Moving Pictures Experts Group) transport stream including the first portions of data 181 tagged with a first packet identifier (PID #1) and the second portions of data 182 tagged with a second packet identifier (PID #2).

As shown, the first portions of encoded data 181 are interleaved amongst the second portions of encoded data 182 in the data stream 115.

First portions of encoded data 181 includes first portion of encoded data 181-1, first portion of encoded data 181-2, and so on. As previously discussed, each of the first portions of encoded data 181 is tagged with a corresponding first unique tagged value (such as a PID number in the transport stream) indicating that such data is to be decoded by decoder 130.

Second portions of encoded data 182 includes second portion of encoded data 182-1, second portion of encoded data 182-2, and so on. Each of the second portions of encoded data 182 is tagged with a corresponding second unique tagged value indicating that such data is to be decoded by decoder 120.

Computer processor hardware 106 includes parser logic 176. As its name suggests, parser logic 176 parses the received data stream 115 into portions of data (such as compressed MPEG data) to be decoded by decoder 130 and portions of data (such as compressed hierarchical encoded data) to be decoded by decoder 120. In one embodiment, the parser logic 176 utilizes tags in the data stream 115 to identify the first portions of data 181 and the second portions of data 182.

In accordance with further embodiments, the data stream 115 includes timing information indicating the corresponding playback timing associations between the first portions of encoded data and second portions of encoded data. In this example embodiment, timing information in the data stream 115 indicates a timing association 183-1 between portion of encoded data 181-1 and portion of encoded data 182-1; timing information in the data stream 115 indicates a timing association 183-2 between portion of encoded data 181-2 and portion of encoded data 182-2; and so on.

In accordance with further non-limiting example embodiment, the computer processor hardware 106 identifies timing associations between the first portions of encoded data 181 and the second portions of encoded data 182. The timing associations and information indicates to which of multiple frames or images of display elements in the first rendition of the signal 146-1 the reconstruction data 184 (such as residual data) pertains.

Computer processing hardware 106 implements a first decoder 130 to decode the first portions of encoded data 181 into a first rendition of a signal 146-1.

As further shown, computer processor hardware 106 implements a second decoder 120 to decode the second portions of encoded data 182 into respective reconstruction data 184. According to a non-limiting embodiment, a portion of reconstruction data 184 is decoded from encoded data 192 also based at least in part on the first rendition of the signal 146-1. Computer processor hardware 106 further includes modification logic 178-1, upsample logic 179-1, modification logic 178-2, etc., to perform further decoding operations with respect to second portions of encoded data 182. Thus, modification logic 178-1, upsample logic 179-1, modification logic 178-2, etc., can be considered to be part of the second decoder 120. The functions performed by the modification logic 178-1, upsample logic 179-1, modification logic 170-2, etc., are further discussed below.

In general, the reconstruction data 184 specifies how to modify the first rendition of the signal 146-1 (such as a video signal including multiple frames or fields) to a higher level of quality signal (of the same or of a different resolution).

In one embodiment, the decoder 130 decodes the first portions of encoded data 181 in accordance with an MPEG (Moving Pictures Experts Group) decoding method. The decoder 120 decodes (uncompresses) the second portions of encoded data 182 in accordance with a hierarchical encoding format to produce reconstruction data 184.

By further way of non-limiting example, the rendition of signal 146-1 can be a standard definition SD signal derived from first portions of encoded data 181. As described herein, the computer processor hardware 106 applies the reconstruction data 184 to the first rendition of the signal 146-1 to produce a second rendition of the signal (higher level of quality of either the same or different resolution). As previously discussed, the reconstructed signals can include multiple images or frames of video, each of which includes multiple display elements.

The computer processor hardware 106 implements modification logic 178-1 to convert rendition of signal 146-1 into rendition of signal 146-2 (having a higher level of quality). In one embodiment, the modification logic 178-1 utilizes a portion of reconstruction data 184 to produce rendition of signal 146-2 at the higher level of quality. The reconstruction data 184 (such as residual data) indicates modifications (such as corrections) that are to be made to one or more display elements or images in the rendition of signal 146-1 in order to produce the rendition of signal 146-2. As mentioned, the second rendition of the signal 146-2 can be of a same display element resolution (such as same spatial resolution and same frame rate) as the first rendition of the signal 146-1.

By further way of non-limiting example embodiment, application of the reconstruction data to the first rendition of the signal 146-1 (such as a preliminary rendition of the signal) to produce the second rendition of the signal 146-2 can include: in accordance with the identified timing associations as discussed above, utilizing the reconstruction data 184 to temporally upsample the first rendition of the signal into the second rendition of the signal 146-2, the second rendition of the signal including a greater number of frames of display elements than the first rendition of the signal.

As a further example, the first rendition of the signal 146-1 may include 60 frames per second of samples, the second rendition of the signal 146-2 may include 120 frames per second; the first rendition of the signal 146-1 may include 120 frames per second, the second rendition of the signal 146-2 may include 240 frames per second; and so on. In such an embodiment, to achieve temporal upsampling, the computer processor hardware can be configured to: produce, based on the first rendition of the signal 146-1 (such as at a first frame rate) and as specified by the reconstruction data 184, a preliminary rendition of the signal at a second frame rate; produce a set of residual data as specified by the reconstruction data 184; and apply the set of residual data to the preliminary rendition of the signal at the second frame rate to produce the second rendition of the signal 146-2. Thus, modification logic 178-1 can be configured to perform corrections using residual data as well as temporal upsampling operations (to increase a signal to a higher frame rate) as specified by the reconstruction data 184.

In accordance with further embodiments, note that the rendition of the signal 146-2 may have a same number of frames per second as a number of frames per second in the rendition of the signal 146-1. For example, the first rendition of the signal 146-1 may include 60 frames per second, the second rendition of the signal 146-2 produced by modification logic 178-1 may be of higher level of quality and include 60 frames per second as well; the first rendition of the signal 146-1 may include 120 frames per second, the second rendition of the signal 146-2 may be of higher level of quality and include 120 frames per second; and so on.

Computer processing hardware 106 further includes upsample logic 179-1. In accordance with settings as specified by reconstruction data 184, the upsample logic 179-1 performs upsampling of signal 146-2 into rendition of signal 146-3. In one embodiment, up sampling operations performed by the upsample logic 179-1 includes conversion of the rendition of signal 146-2 to a higher resolution rendition of signal 146-3. In other words, the rendition of signal 146-2 can be an SD signal. The upsampling operations applied by the upsample logic 179-1 can be configured to convert lower resolution display element settings in signal 146-2 to corresponding higher resolution display element settings in signal 146-3. This is discussed in more detail below as well as in related applications incorporated herein by reference.

In accordance with further embodiments, implementing the second decoder 120 and related logic to decode the second portions of encoded data 182 can include utilizing the reconstruction data 184 to identify upsampling operations; and via upsample logic 179-1, applying the identified upsampling operations to the second rendition of the signal 146-2 to produce the third rendition of the signal 146-3, the third rendition of the signal 146-3 being of a substantially higher display element resolution than a display element resolution of the second rendition of the signal 146-2. Identification of the upsampling operations as specified by the second portions of encoded data 182 (used to produce reconstruction data 184) can include decoding parameters corresponding to specific coefficients of an upsampling kernel; based at least in part on the decoded parameters, producing an upsampling kernel corresponding to a portion of the third rendition of the signal 146-3; and applying the upsampling kernel to a portion of the second rendition of the signal 146-2 in order to produce the portion of the third rendition of the signal 146-3.

The rendition of signal 146-3 may be a preliminary HD signal needing correction. Computer processor hardware 106 further includes modification logic 178-2. In one embodiment, the modification logic 178-2 utilizes a portion of reconstruction data 184 to produce rendition of signal 146-4. For example, the reconstruction data 184 indicates modifications (such as corrections) that are to be made to one or more display elements in the rendition of signal 146-3 in order to produce the rendition of signal 146-4. The modification logic 178-2 applies the reconstruction data 184 to signal 146-3 to correct appropriate display element settings. In a similar manner as previously discussed, the modification logic 178 can also be configured to perform temporal up sampling. Thus the signal 146-4 can include a higher number of play back frames images per unit time than the signal 146-3.

This process of up sampling (spatially and/or temporally) and then modifying can be repeated at any number of levels. Accordingly, the rendition of signal 140 for such as an HD signal can be up sampled and corrected into a corresponding ultra HD signal for playback on a respective display screen.

In accordance with still further embodiments, the computer processor hardware 106 implements the second decoder 120 and related components to decode the second portions of encoded data 182. This can include: decoding a first set of residual data at a first level of quality as specified by the second portions of encoded data 182; utilizing the first set of residual data (part of reconstruction data 184) to modify the first rendition of the signal 146-1 and produce the second rendition of the signal 146-2; producing, based at least in part on the second rendition of the signal 146-2, a third rendition of the signal 146-3, the third rendition of the signal 146-3 being of a higher resolution (such as HD resolution) than a resolution (SD resolution) of the second rendition of the signal 146-2; decoding a second set of residual data (reconstruction data 184) at a second level of quality as specified by the second portions of encoded data 182; utilizing the second set of residual data to modify the third rendition of the signal 146-3 and produce a fourth rendition of the signal 146-4. If further desired, the computer processor hardware can be configured to produce, based on the fourth rendition of the signal 146-4, a fifth rendition of the signal, the fifth rendition of the signal being of a higher resolution (such as progressive full HD resolution, Ultra HD resolution, etc.) than a resolution of the fourth rendition of the signal 146-4; decoding a third set of residual data (reconstruction data 184) at a third level of quality as specified by the second portions of encoded data 182; and utilize the third set of residual data to modify the fifth rendition of the signal and produce a sixth rendition of the signal (such as corrected Ultra HD resolution signal). In one embodiment, the first rendition of the signal is an interlaced video signal, and the sixth rendition of the signal is a progressive video signal. As already mentioned, the process of modifying into a higher level of quality, upsampling into a preliminary upsampled rendition of the signal and then modifying into a rendition of the signal at a next higher level of quality can be repeated any number of times to produce a final rendition for display on a respective display screen, based on the specific non-limiting embodiment.

Figure 1F:
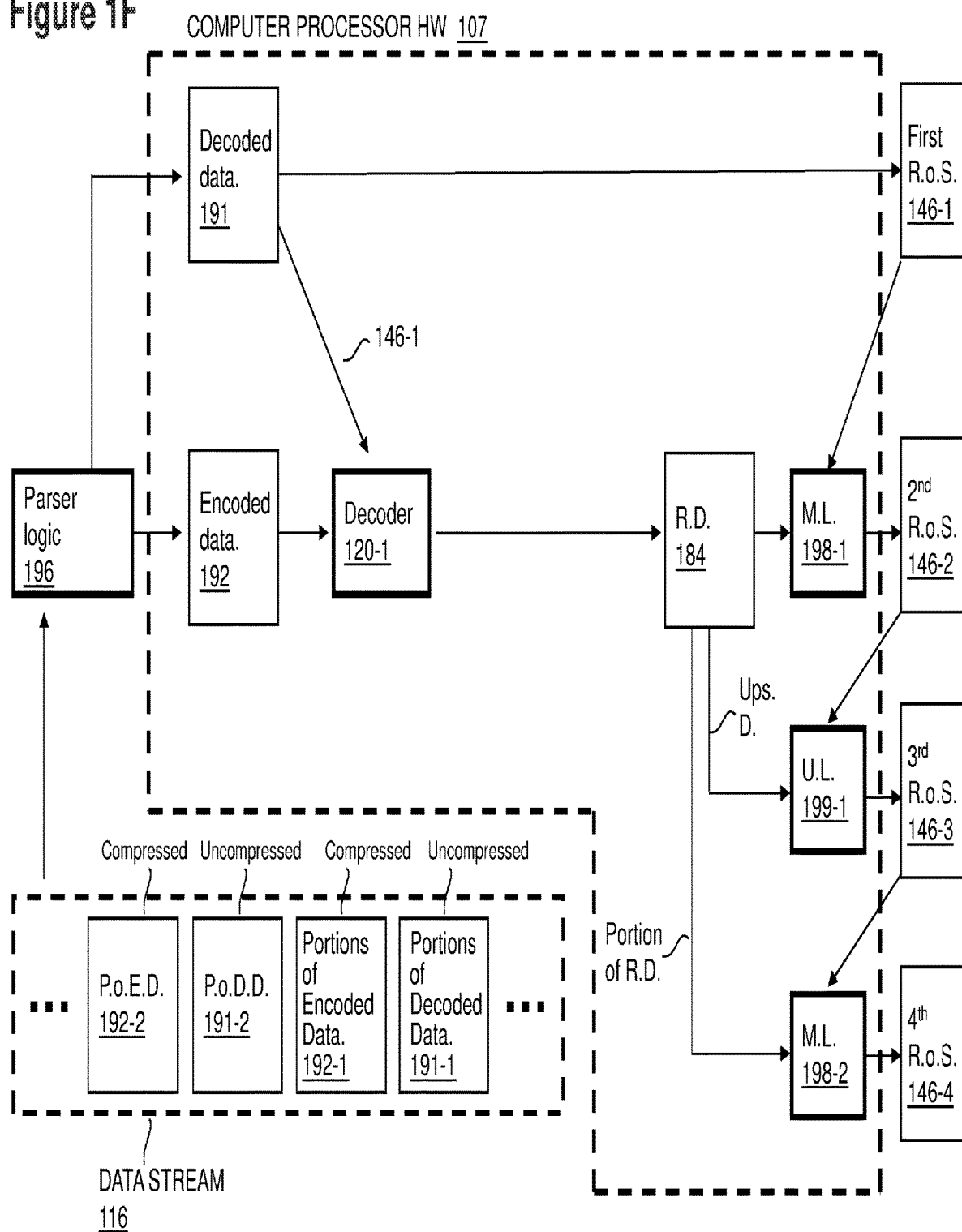
FIG. 1F is an alternative example diagram illustrating computer processor hardware processing a respective data stream according to embodiments herein.

As previously discussed with respect to FIG. 1D, a transmitter device 111 can be configured to transmit a respective data stream 116 to corresponding computer processor hardware 107. FIG. 1F is an example diagram illustrating computer processor hardware 107 processing a respective data stream 116 according to embodiments herein.

As shown, data stream 116 includes multiple segments of decoded data 191 (decoded data 191-1, decoded data 191-2, . . . ). Data stream 116 also includes multiple segments of encoded data 192 (encoded data 192-1, encoded data 192-2, . . . ).

In one non-limiting embodiment, the decoded data 191 is uncompressed data. The encoded data 192 is compressed data (such as data compressed in accordance with a hierarchical encoding format). The data stream 116 can be an HDMI signal in which the encoded data 192 is compressed video data; the decoded data is uncompressed video data. In accordance with another embodiment, the data stream 116 is a DisplayPort interface in which the encoded data 192 is compressed video data; the decoded data is uncompressed video data.

As further shown, computer processing hardware 107 includes parser logic 196. As its name suggests, parser logic 196 parses the received data in data stream 160 into decoded data 191 and encoded data 192. The decoded data (such as data formatted according to HDMI transmission format) specifies settings to reconstruct a first rendition of a signal 146-1. Via the decoded data 191, the computer processor hardware 107 produces a first rendition of the signal 146-1. In one embodiment, the signal is a video signal specifying settings for multiple display elements.

Computer processor hardware 107 includes decoder 120. Computer processor hardware 107 includes additional logic such as modification logic 198-1, upsample logic 199-1, modification logic 198-2, etc., all of which can be considered part of or associated with the decoder 120.

Computer processor hardware 107 implements decoder 120-1 to decode the encoded data 192 into respective reconstruction data 184. According to a non-limiting embodiment, a portion of reconstruction data 184 is decoded from encoded data 192 also based at least in part on the first rendition of the signal 146-1. The reconstruction data 184 specifies how to modify the first rendition of the signal 146-1. In one embodiment, the computer processor hardware 107 decodes the encoded data 192 into reconstruction data 184 via decoding in accordance with a hierarchical encoding format. As further described herein, the encoded data 192 can be encoded in accordance with a hierarchical encoding format in which data is encoded in accordance with different resolutions (spatial and/or temporal) in a hierarchy. Embodiments herein can further include applying one or more upsampling operations to produce residual data in reconstruction data 184. The upsampling operations converting lower resolution display element settings to higher resolution display element settings.

Via modification logic 198-1, the computer processor hardware 107 applies a portion of the reconstruction data 184 (such as a portion of residual data) to the first rendition of the signal 146-1 to produce a second rendition of the signal 146-2. The second rendition of the signal 146-2 is of a higher level of quality than the first rendition of the signal 146-1. In one embodiment, the second rendition of the signal 146-2 is of a same display element resolution (such as SD) as the first rendition of the signal 146-1. By further way of non-limiting example, using the reconstruction data 184, the modification logic 198-1 corrects certain settings of display elements in the rendition of the signal 146-1 to produce the rendition of the signal 146-2.

As previously discussed, the computer processor hardware 107 further includes upsampling logic 199-1. The computer processor hardware 107 identifies one or more upsampling operations as specified by the reconstruction data 184 (derived from encoded data 192). The upsampling logic 199-1 applies the identified upsampling operations to the second rendition of the signal 146-2 to produce a third rendition of the signal 146-3. In one embodiment, the third rendition of the signal 146-3 is of a substantially higher display element resolution than the second rendition of the signal 146-2. As an example, the second rendition of the signal 146-2 may be an SD resolution video signal; the third rendition of the signal 146-3 may be a preliminary HD resolution video signal.

In accordance with further embodiments, the third rendition of the signal 146-3 is a preliminary rendition of the signal at the substantially higher display element resolution than rendition of the signal 146-2. The computer processor hardware further includes modification logic 198-2. As shown, modification logic 198-2 utilizes a portion of the reconstruction data 184 (such as residual data) to modify the preliminary rendition of the signal 146-3 into rendition of the signal 146-4. The rendition of the signal 146-4 (modified preliminary rendition of the signal 146-3) is of a higher level of quality than the preliminary rendition of the signal 146-3 at the HD resolution. In a similar manner as previously discussed, the computer processor hardware 107 can repeat a process of upsampling and modifying to any desirable level of resolution (spatial and/or temporal).

According to other non-limiting embodiments, the fourth rendition of the signal is of a higher frame rate than the first rendition of the signal, and upsampling operations comprise suitable temporal upsampling operations.

Figure 1G:
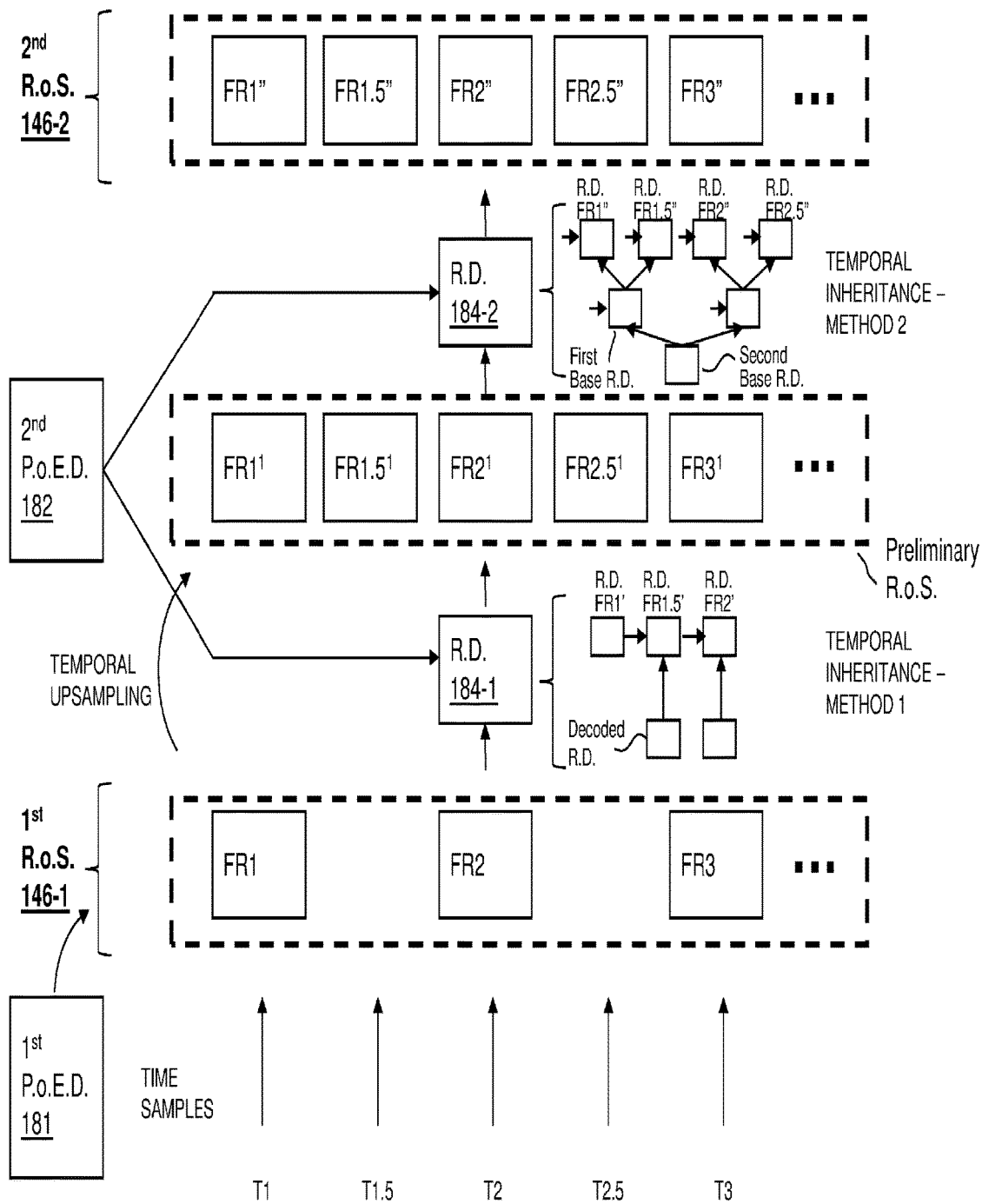

FIG. 1G is an example diagram illustrating processing according to embodiments herein.

As shown, computer processor hardware 106 utilizes first portions of encoded data 181 to produce rendition of signal 146-1 including images or frames FR1, FR2, FR3, etc. Computer processor hardware 106 implements decoder 120 to produce residual data 184-1, 184-2, and so on, from the second portions of encoded data 182.

Via the application of residual data 184-1 to frames FR1, FR2, FR3, etc., in the first rendition of the signal 146-1, the computer processor hardware 106 produces a preliminary rendition of signal (at a second frame rate) including images or frames FR1', FR1.5', FR2', FR2.5', FR3', etc. As shown, this preliminary rendition of signal includes more frames than does rendition of signal 146-1. In other non-limiting embodiments, the preliminary rendition includes the same number of frames as does rendition of signal 146-1.

The computer processor hardware 106 further uses residual data 184-2 to modify the preliminary rendition of signal including frames FR1', FR1.5', FR2', FR2.5', FR3', etc., into rendition of signal 146-2 including frames FR1", FR1.5", FR2", FR2.5", FR3", etc. The rendition of signal 146-2 is of a higher level of quality than the preliminary rendition of the signal including frames FR1', FR1.5', FR2', FR2.5', FR3', etc.

In one embodiment, a respective set of residual data is produced according to temporal inheritance across multiple frames of the signal. For example, the computer processor hardware can be configured to decode the residual data for a given frame of the signal (such as residual data for producing frame FR2' from frame FR2) based at least in part on residual data decoded for a different frame (such as residual data used to convert frame FR1 into frame FR1'). According to some non-limiting embodiments, temporal inheritance is implemented by decoding residual data for a given frame as follows ("method 1" of temporal inheritance in FIG. 1F): decoding preliminary residual data for the given frame; for a portion of the residual data (as indicated by reconstruction data 184), combining preliminary residual data for the given frame with residual data of a reference frame, producing residual data for the given frame. According to other non-limiting embodiments, temporal inheritance is implemented by decoding residual data for a given frame as follows ("method 2" of temporal inheritance in FIG. 1F): decoding first base residual data for a sequence of frames; combining the first base residual data with relative residual data, producing residual data for the given frame. In some embodiments, first base residual data is also produced by combining relative residual data with second base residual data at a higher level of aggregation.

FIG. 1H is an example diagram illustrating processing according to embodiments herein.

As shown, computer processor hardware 106 utilizes first portions of encoded data 181 to produce rendition of signal 146-1 including images or frames FR1, FR2, FR3, FR4, etc. Computer processor hardware 106 implements decoder 120 to produce first set of base residual data 184-B1, 184-B2, and so on, from the second portions of encoded data 182.

In one embodiment, the reconstruction data 184 includes a hierarchy of residual data encoded in accordance with multiple display element resolutions. The second decoder 120 (or other suitable resource) applies upsampling operations to the second portions of encoded data (or reconstruction data 184) to reproduce the hierarchy 167-1 of residual data derived form base residual data 184-B1 (root data to reproduce residual data for application at multiple time samples). In other words, reconstruction data 184 can be or include a hierarchy 167-1 of residual data encoded in accordance with multiple element resolutions (lower levels in the hierarchy 167-1 are lower in spatial and/or temporal resolution, higher levels in the hierarchy 167-1 are of higher spatial and/or temporal resolution). In one embodiment, the second decoder 120 applies upsampling operations to the second portions of encoded data 182 to reproduce the hierarchy 167-1 of residual data.

In accordance with further embodiments, the computer processor hardware produces the hierarchy 167-1 according to temporal inheritance of residuals across multiple frames of display elements in the signal. As shown, at a given higher level of the hierarchy of residual data, the computer processor hardware decodes residual data for a first frame (such as residual data 185-1) based at least in part on a base set of residual data (such as residual data lower in the hierarchy 167-1), the base set of residual data serving as a baseline to reproduce residual data for multiple time samples of the signal. The base set of residual data is temporally upsampled and then combined with relative residual data (reproduced as specified by reconstruction data 184) in order to produce residual data at a higher temporal resolution. When temporal inheritance is specified (such as with a suitable temporal inheritance symbol) for a given portion of the base residual data, the corresponding portion of the base set of residual data is expanded into residual data for multiple time samples of the signal without combining it with any additional residual data (i.e., without decoding any additional information from reconstruction data 184). In other words, a portion of the base reconstruction data 184-B1 is expanded across time to produce a portion of respective residual data 185-1, 185-2, etc., for multiple time samples (such as images or frames) of the signal.

In addition to or as an alternative to temporal inheritance, the hierarchy of residual data 185 can be produced according to spatial inheritance of residuals within a given frame of display elements in the signal. In such an instance, residual data for a given image or frame is encoded as a hierarchy of residual data at different spatial resolutions, with a sequence of operations as follows: decoding residual data at a given level of quality in the hierarchy, upsampling residual data producing preliminary residual data at a next higher resolution, decoding relative residual data for said next higher resolution, applying relative residual data to preliminary residual data, producing residual data at the next higher level of quality in the hierarchy. Relative residual data can be decoded independently for each time sample of the signal or according to a temporal hierarchy of levels of aggregation. At a given level of quality in the hierarchy of residual data, the computer processor hardware decodes residual data for a portion of the given frame based only on reconstruction data decoded for a lower level of quality in the hierarchy of residual data. In other words, for a portion of residual data reconstruction data 184 specifies information at a low (spatial) level of quality along with a spatial inheritance symbol, and the decoder is able to reconstruct the corresponding portion of residual data at a higher level of quality without any additional information from the reconstruction data. According to other non-limiting embodiments, for a portion of residual data reconstruction data 184 specifies information at a low (spatial) level of quality along with a temporal inheritance symbol, and the decoder reconstructs the corresponding portion of residual data at a higher level of quality using a reference set of residual data as a baseline.

The computer processor hardware 106 utilizes the first set of base residual data 184-B1 to hierarchically reproduce residual data 185-1 (for time sample #1), residual data 185-2 (for time sample #2), residual data 185-3 (for time sample #3), etc.

As further shown, the computer processor hardware utilizes the first set of residual data 185-1 to modify and convert frame FR1 into frame FR1'; the computer processor hardware utilizes the second set of residual data 185-2 to modify and convert frame FR2 into frame FR2'; the computer processor hardware utilizes the third set of residual data 185-3 to modify and convert frame FR3 into frame FR3'; and so on. Rendition of signal 146-2 (resolution #1) in this example embodiment includes frames FR1', FR2', FR3', FR4', etc., derived from frames in rendition of signal 146-1 (resolution #1).

Computer processor hardware 106 executes upsample operations as specified by the reconstruction data 184 to upsample the rendition of signal 146-2 to rendition of signal 146-3. For example, upsample logic 188-1 spatially upsamples display elements in the frame FR1' to frame FR1"; upsample logic 188-2 spatially upsamples display elements in the frame FR2' to frame FR2"; upsample logic 188-3 spatially upsamples display elements in the frame FR3' to frame FR3"; and so on. Upsampling can include converting a lower resolution rendition of the signal 146-2 into a higher resolution rendition of the signal 146-3.

Thus, embodiments herein include applying residual data 186 to multiple display elements in the third rendition of the signal 146-3 to produce a fourth rendition of the signal 146-4, the applied residual data 186 modifies the settings of the multiple display elements in the third rendition of the signal 146-3 to produce settings for the corresponding display elements in a fourth rendition of the signal 146-4. Rendition of signal 146-3 (resolution #2) in this example embodiment includes frames FR1", FR2", FR3", FR4", etc.

As further shown, computer processor hardware 106 implements decoder 120 or related logic to produce second set of base residual data 184-B2 from the second portions of encoded data 182. In a similar manner that computer processor hardware 106 derives sets of residual data 185 from base residual data 184-B1 via upsampling in hierarchy 167-2, the computer processor hardware 106 utilizes the second set of base residual data 184-B2 to hierarchically reproduce residual data 186-1 (for time sample #1), residual data 186-2 (for time sample #2), residual data 186-3 (for time sample #3), etc. As shown, the computer processor hardware utilizes the first set of hierarchically derived residual data 186-1 to convert frame FR1" into frame FR1'"; the computer processor hardware utilizes the second set of residual data 186-2 to convert frame FR2" into frame FR2'"; the computer processor hardware utilizes the third set of residual data 186-3 to convert frame FR3" into frame FR3'"; and so on. Rendition of signal 146-4 (resolution #2) in this example embodiment includes frames FR1'", FR2'", FR3'", FR4'", etc., derived from rendition of signal 146-3 (resolution #2).

Figure 2:
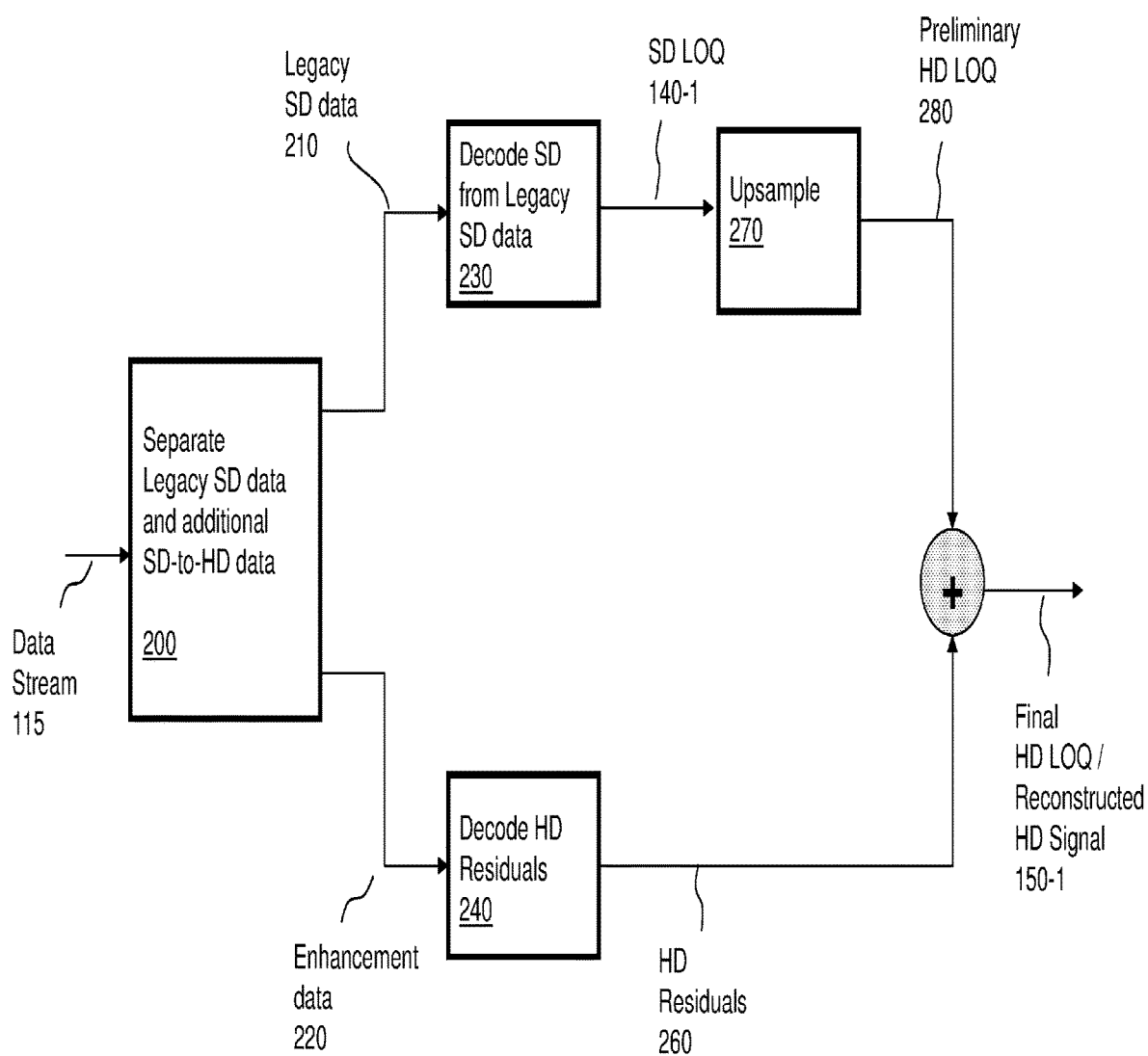
FIG. 2 is an example diagram illustrating a decoding system and corresponding methods according to embodiments herein.

FIG. 2 is a non-limiting example diagram illustrating a decoding system according to embodiments herein.

Data stream 115 is received by block 200 and separated, producing legacy SD data 210 and additional data 220. Legacy SD data is decoded by block 230 decode SD from Legacy SD data, producing SD LOQ (Level of Quality) 140-1, a rendition of the signal at a first level of quality (SD Level of Quality). SD LOQ 140-1 is upsampled by block 270, producing preliminary HD LOQ 280, a predicted rendition of the signal at a second (higher) level of quality (HD Level Of Quality).

Enhancement data 220 is decoded by block 240 decode HD residuals, producing HD residuals 260.

Preliminary HD LOQ 280 and HD residuals 260 are combined, producing the final HD LOQ, i.e., reconstructed HD signal 150-1.

In a non-limiting embodiment, SD LOQ 140-1 is a bidimensional plane of elements at a first level of quality, while preliminary HD LOQ 280, HD residuals 260 and reconstructed HD signal 150-1 are bidimensional planes of elements at a second (higher) level of quality.

In a non-limiting embodiment, block 230 leverages a temporal decoding method (e.g., MPEG2, H.264, VP8, etc.), so that SD LOQ 140-2 (produced by block 230, not shown in FIG. 2 for simplicity of visual representation) depends at least in part on previously decoded signal 140-1. In other non-limiting embodiments, also block 240 implements a temporal decoding method: in a non-limiting embodiment, HD residuals decoded by block 240 to produce signal 150-2 are based at least in part on HD residuals decoded to produce signal 150-1; in another non-limiting embodiment, HD residuals decoded to produce signal 150-2 are based at least in part on a common support plane that is also used by block 240 to decode HD residuals applied to produce signal 150-1.

In a non-limiting embodiment, Enhancement Data 220 includes information that is processed by block 270 to amend and upsample SD LOQ 140-1.

In a non-limiting embodiment, data stream 115 includes enhancement data 220 by leveraging Packet Identifiers that are ignored by certain legacy decoders, so that said decoders can receive and decode data stream 115 and produce SD LOQ 140-1, by just ignoring enhancement data 220 and decoding legacy data 210.

In a non-limiting embodiment, decoder 120 implements dithering as specified by the second portions of encoded data. In an embodiment, this is implemented by decoding at least one residual in the residual data 260 by applying a substantially random number generated according to a given probability distribution.

Figure 3A:
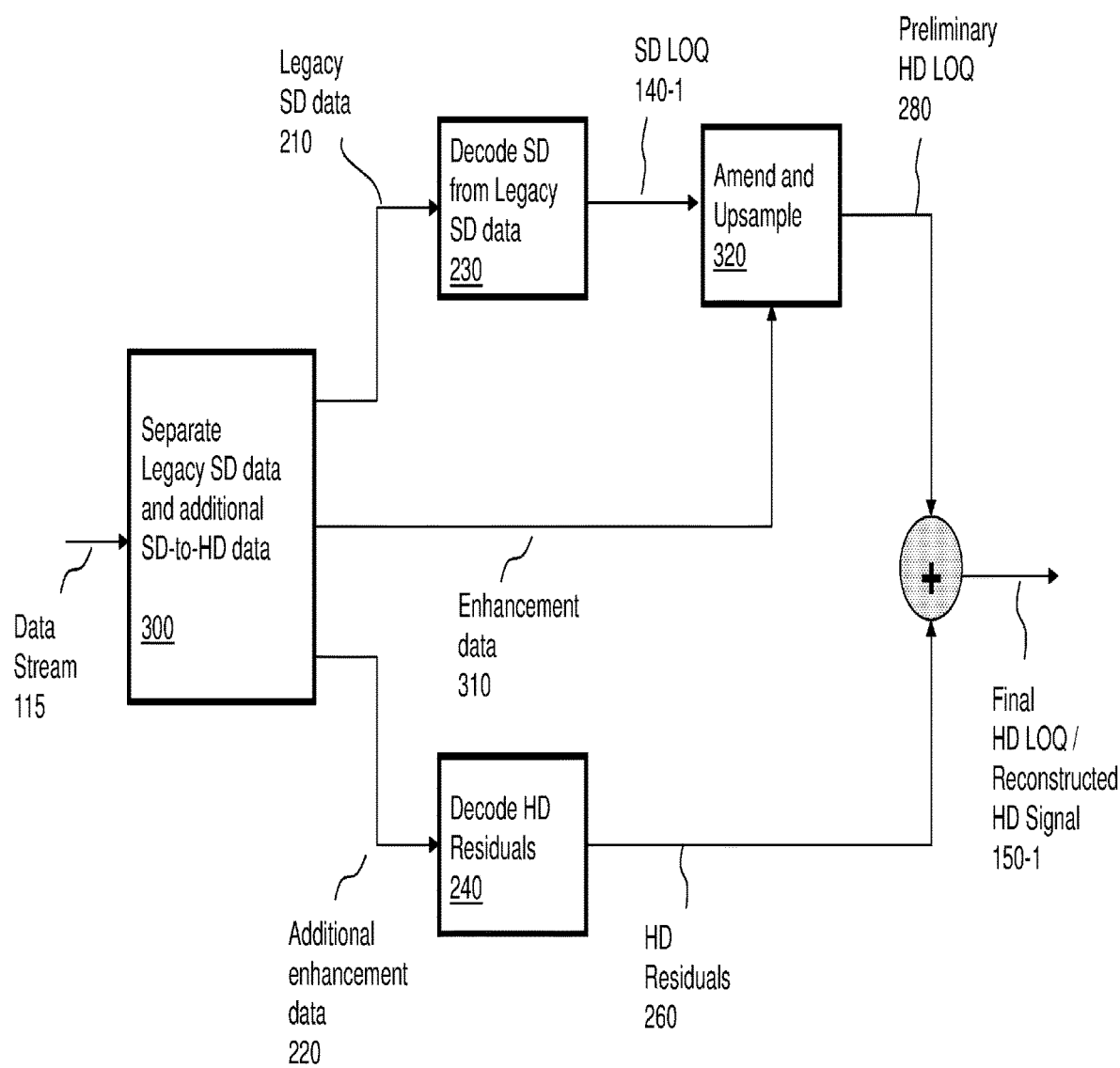
FIGS. 3A, 3B and 3C are example diagrams illustrating decoding systems and methods according to embodiments herein.

FIG. 3A is a non-limiting example diagram describing a decoding system akin to the one described in FIG. 2, wherein data stream 115 comprises information corresponding to enhancement data 310. Block 320 combines SD LOQ 140-1 with an amendment layer (SD residual data) and then upsamples it, producing predicted HD LOQ 280.

In a non-limiting embodiment, the amendment layer is decoded according to a tier-based hierarchical decoding method.

In a non-limiting embodiment, upsampling and image processing operations used to produce predicted HD LOQ 280 are implemented as indicated by Enhancement Data 310.

In other non-limiting embodiments, enhancement data 310 comprises kernel coefficients for upsampling operations used by block 320. In a non limiting embodiment, upsampling operations use a 4×4 kernel (weighted average of 16 elements at the lower level of quality—by means of 16 coefficients—in order to produce each picture element of the higher level of quality, or 64 coefficients for each 2×2 picture element block at the higher level of quality in the non-limiting case of a factor of two upsampling for both spatial dimensions), indicated by enhancement data 310. In a non-limiting embodiment, enhancement data 310 comprises information corresponding to a plane of kernel coefficients used by block 320 to upsample SD LOQ 140-1 into predicted HD LOQ 280. In a non-limiting embodiment, upsampling and image processing operations used by block 320 include non-linear operations. In a non-limiting embodiment, upsampling of chroma components (e.g., U and V in a YUV color space) are performed after producing final HD LOQ 150-1 for the luminance (Y) component, and are based at least in part on the reconstructed Y plane of final HD LOQ 150-1 (in a non-limiting embodiment, by means of a bilateral filtering method).

In a non-limiting embodiment, operations performed by block 320 include image processing operations (e.g., unsharp masking, edge reconstruction filters, dithering, etc.).

In another non-limiting embodiment, operations performed by block 240 include combining decoded residuals with random values calculated according to a given probability distribution.

Figure 3B:
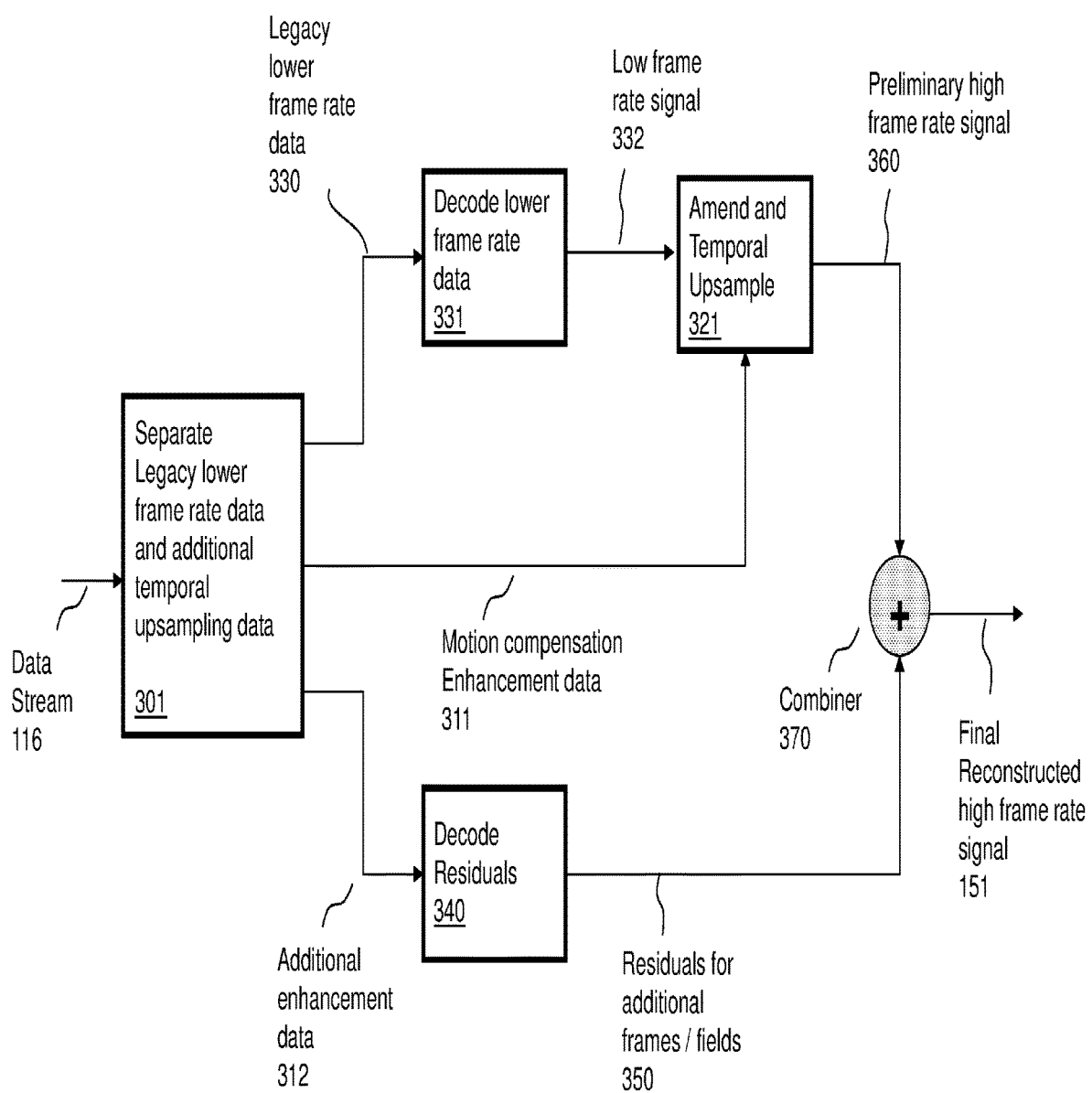

FIG. 3B is a non-limiting example diagram describing a decoding system akin to the ones described in FIG. 2 and FIG. 3A, wherein data stream 116 comprises information corresponding to legacy lower frame rate data 330, motion compensation enhancement data 311 and Additional Enhancement Data 312. Block 321 produces, based on Low Frame Rate Signal 332, a Predicted High Frame Rate Signal 360. In a non-limiting embodiment, operations performed to produce the additional frames/fields of signal 360 vs. signal 332 comprise temporal upsampling operations and/or motion compensation operations.

Block 340 processes Additional Enhancement Data 312 and decodes Residuals 350 for additional frames/fields. Residuals 350 are then combined with the newly created frames/fields of signal 360, producing Final Reconstructed High Frame Rate Signal 151-1.

In a non-limiting embodiment, data stream 116 is transmitted via an HDMI cable according to HDMI standard transmission guidelines, and Legacy Lower Frame Rate Data 330 contains uncompressed video data according to HDMI standard transmission guidelines; enhancement data 311 and 312 are transmitted as meta-data that are ignored by legacy HDMI devices (which just decode and display signal 332), while they are processed and decoded by suitably enabled devices (which decode and display signal 151).

Figure 3C:
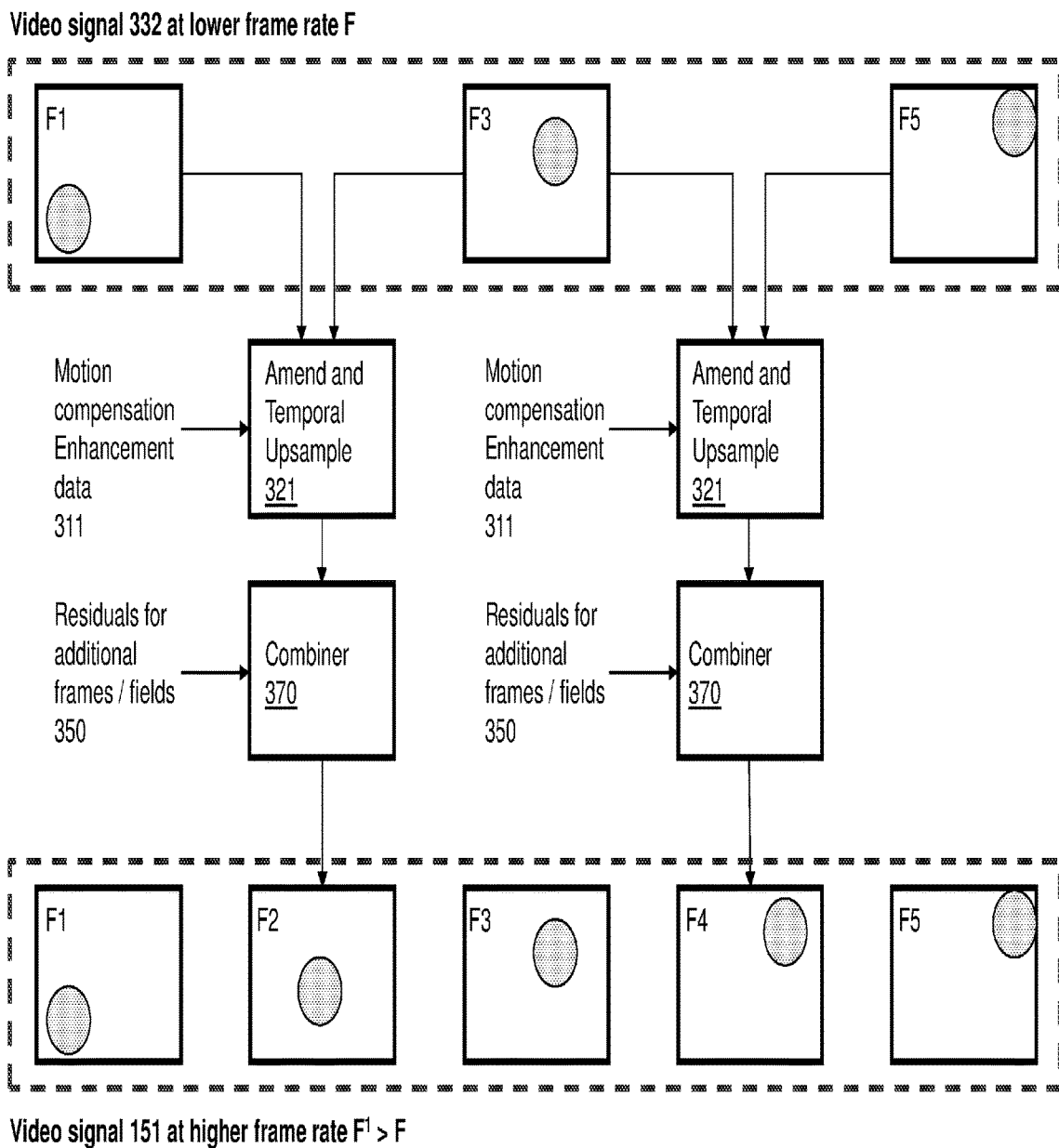

FIG. 3C is a non-limiting example diagram further illustrating a decoding system akin to the ones described in FIG. 3B, describing the process of generating additional frames in order to produce, based on a video signal at a lower frame rate (i.e., lower level of quality in terms of temporal resolution) and on enhancement information, a video signal at a higher frame rate (i.e., higher level of quality in terms of temporal resolution).

Other non-limiting embodiments process enhancement data so as to produce, based on a signal at a lower level of quality, a video signal that is characterized by both higher spatial resolution and higher frame rate.

Figure 4:
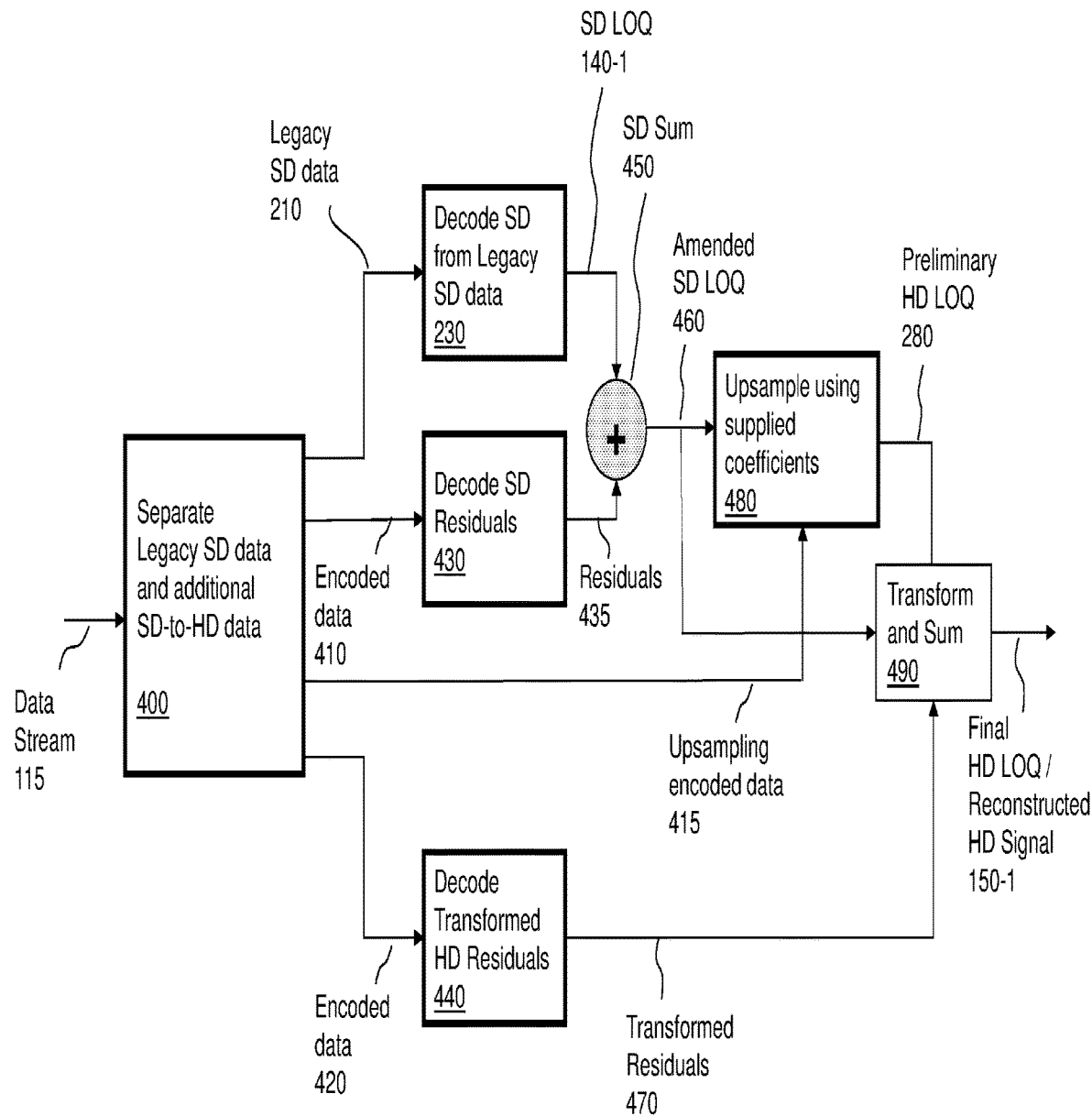
FIG. 4 is an example diagram illustrating a decoding systems and methods according to embodiments herein.

FIG. 4 is a non-limiting example diagram illustrating, according to embodiments herein, a decoding system akin to the systems described in FIG. 2 and FIG. 3, wherein Data Stream 115 comprises information corresponding to Legacy SD data 210, Encoded data 410, Upsampling Encoded Data 415 and Encoded data 420. Encoded data 410 is processed by block 430 Decode SD Residuals, producing a plane of Residuals 435 at the first level of quality (in a non-limiting embodiment, SD resolution). In a non-limiting embodiment, operations performed by block 430 comprise entropy decoding Encoded data 410 and dequantizing the symbols produced by entropy decoding, generating Residuals 435. In another non-limiting embodiment, operations performed by block 430 comprise entropy decoding Encoded data 410, transforming the symbols produced by entropy decoding and dequantizing the transformed symbols, producing Residuals 435. In another non-limiting embodiment, operations performed by block 430 comprise entropy decoding Encoded data 410, dequantizing the symbols produced by entropy decoding, transforming dequantized symbols into Residuals 435. In a non-limiting embodiment, dequantization operations receive a quantized symbol and generate a value comprised in a corresponding quantization interval, according to a given probability distribution. In other non-limiting embodiments, operations performed by block 430 comprise decoding a plane of residuals based on a tier-based hierarchical decoding method according to methods described in related U.S. patent application Ser. Nos. 13/188,188, 13/188,201, 13/188,226 and 13/893,669, the entire teachings of which are incorporated herein by this reference. In one embodiment, the method comprising: decoding a plane of residuals at a first (lower) level of quality; producing, based on the plane of residuals at the first level of quality, a predicted plane of residuals at a second (higher) level of quality; combining the predicted plane of residuals at the second level of quality with decoded data, producing a plane of residuals at the second level of quality.

Residuals 435 are combined with SD LOQ 140-1, generating Amended SD LOQ 460. Amended SD LOQ 460 is upsampled by block 480, by leveraging upsampling operations that correspond to Upsampling Encoded Data 415, producing Predicted HD LOQ 280.

Encoded Data 420 is decoded by block 440, generating Transformed Residuals 470. Transformed Residuals 470, Amended SD LOQ 460 and Predicted HD LOQ 280 are processed by block 490 Transform and Sum, producing Reconstructed HD Signal 150-1.

In a non-limiting embodiment, Reconstructed HD Signal 150-1 is an individual image (e.g., frame or field) of a video sequence. In a non-limiting embodiment, Encoded Data 410, Upsampling Encoded Data 415 and/or Encoded Data 420 comprise information that is used to produce both enhancement data (e.g., SD residuals, upsampling information and/or HD transformed residuals) for image 150-1 and enhancement data for other images (e.g., frames or fields) in the video sequence. In a non-limiting embodiment, said information comprises a "support buffer" plane of residuals that are used to reconstruct both Transformed Residuals 470 (e.g., by ways of non-limiting example, by summing relative residuals corresponding to image 150-1, decoded from Encoded Data 420) and Transformed Residuals for other images in the video sequence (e.g., by summing relative residuals corresponding to other images in the video sequence). In another non-limiting embodiment, a portion of enhancement data for an image in the sequence is decoded based at least in part on a corresponding portion of enhancement data for another image in the sequence.

Figure 5A:
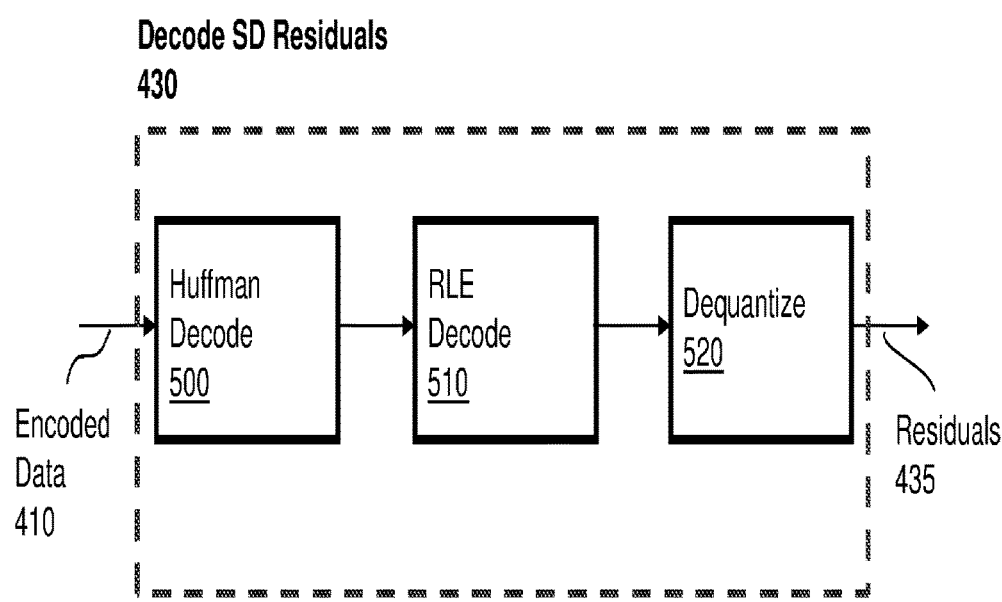
FIGS. 5A 5B, and 5C are example diagrams illustrating residual decoding systems and methods according to embodiments herein.

FIG. 5A is a non-limiting example diagram describing residual decoding according to embodiments herein.

Encoded Data 410 is processed by Huffman Decode 500 (implementing a Huffman entropy decoding method), then by RLE Decode 510 (implementing a Run Length Encoding decoding method) and then by Dequantize 520 (implementing a suitable dequantization method), producing Residuals 435.

In other non-limiting embodiments, the input of block 520 is transformed (i.e., processed) before being dequantized. In a non-limiting embodiment, block 520 first dequantizes the received symbols and then transforms the results into Residuals 435, according to a suitable transform method (e.g., DCT, Hadamard, Directional Decomposition Transform, etc.).

In one embodiment, via decoder 430 or other suitable resource, the computer processor hardware 106 (of computer processor hardware 107) decodes the second portions of encoded data 182 (such as encoded data 410 in FIG. 5A) into transformed residual data; processes the transformed residual data to produce quantized residual data; dequantizes the quantized residual data to reproduce residual data; and applies the reproduced residual data to the first rendition of the signal to produce the second rendition of the signal. Note that processing can occur in any suitable manner. In accordance with another embodiment, any of one or more sets of residual data can be produced from transformed residual data. For example, the computer processor hardware can be configured to: decode second portions of encoded data 182 into quantized transformed residual data; dequantize the quantized residual data to produce transformed residual data; process the transformed residual data, a respective one or more renditions of a signal (FIG. 7A) to reproduce residual data; and apply the reproduced residual data to a rendition of the signal.

Figure 5B:
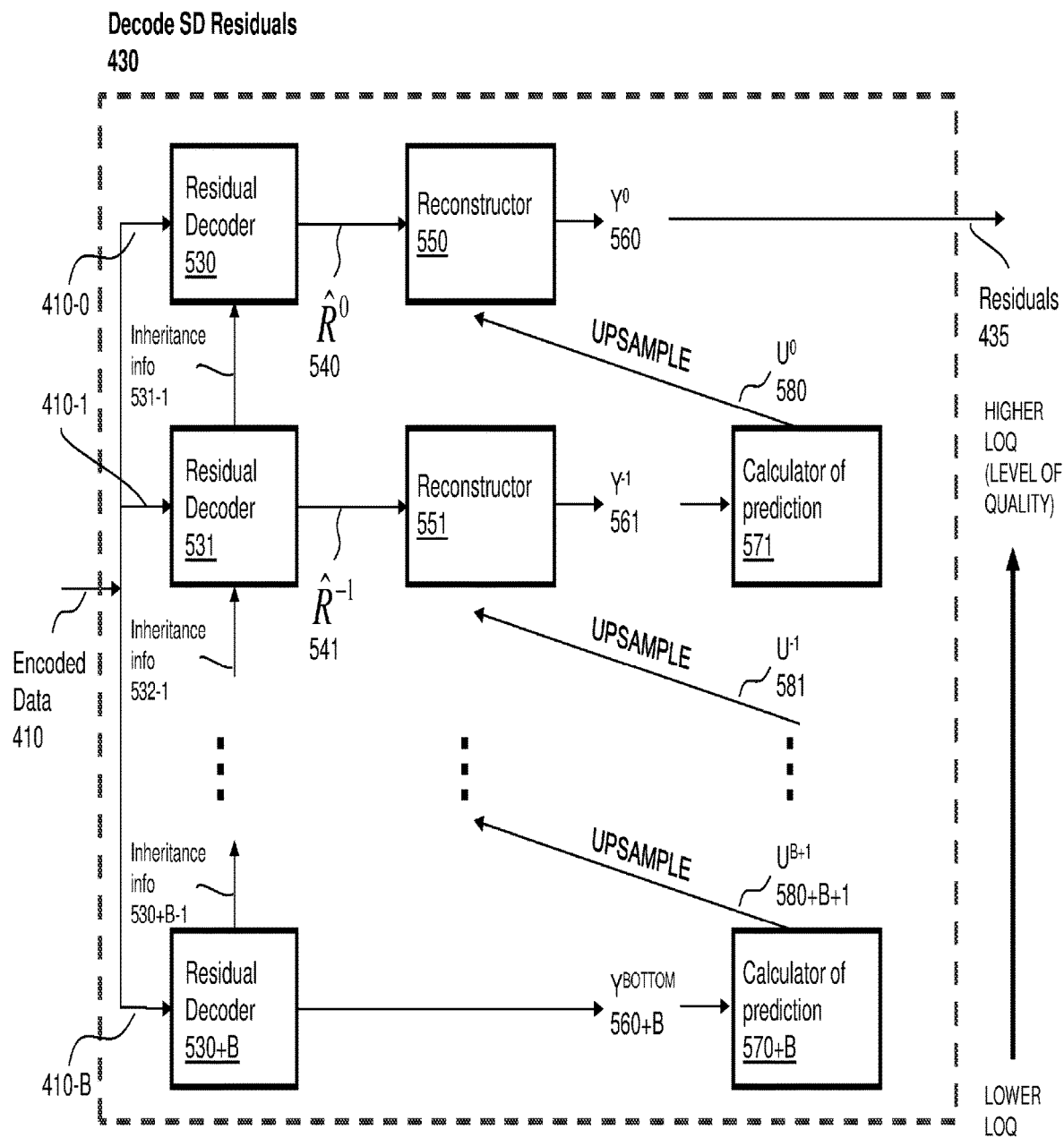

FIG. 5B is a non-limiting example diagram describing residual decoding according to a tiered-based hierarchical decoding method according to embodiments herein.

Encoded data 410 is split into a plurality of subsets of encoded data, each corresponding to a given level of quality of plane of residuals 435.

Encoded data subset 410-B, corresponding to the lowest (bottom) level of quality for residual data, is processed by Residual Decoder 530+B, producing the residual plane $Y^{BOTTOM}$ 560+B. Plane 560+B is processed by Calculator of Prediction 570+B, producing the predicted rendition $U^{B+1}$ 580+B+1. In a non-limiting embodiment, operations performed to produce the predicted rendition $U^{B+1}$ include an upsampling operation.

Block 430 continues by decoding encoded data subsets for subsequent (progressively higher) levels of quality and by combining residual data decoded from said subset with a corresponding predicted rendition U based on the previous (lower) level of quality.

For instance, Encoded data subset 410-1 is processed by Residual Decoder 531 based at least in part on Inheritance Information 532-1, producing intermediate data 541. In a non-limiting embodiment, Inheritance Information 532-1 specifies the parts of intermediate data 541 that are directly inherited from the lower level of quality, without need for subset 410-1 to specify any information about them. Intermediate data 541 and predicted rendition $U^{-1}$ 581 are processed and combined by Reconstructor 551, producing the plane of residuals $Y^{-1}$ 561, Plane 561 is processed by Calculator of Prediction 571, producing predicted rendition $U^{0}$ 580.

Encoded data subset 410-0 is processed by Residual Decoder 530 based at least in part on Inheritance Information 532-0, producing intermediate data 540. Intermediate data 540 and predicted rendition $U^{0}$ 580 are processed and combined by Reconstructor 550, producing the plane of residuals $Y^{0}$ 560, which corresponds to Residuals 435.

In a non-limiting embodiment, Calculators of Prediction 570, 571, . . . , 570+B implement upsampling operations and/or image processing operations according to parameters specified in corresponding subsets of encoded data received by block 430.

In other non-limiting embodiments, Residual Decoders 530, 531, . . . , 530+B produce intermediate data also based on reference data, in order to efficiently account for temporal correlation across multiple images in a video sequence. In some non-limiting embodiments, reference data are one or more support planes that are combined with the data specified in corresponding encoded data subsets of multiple images in the video sequence. In other non-limiting embodiments, reference data are the corresponding residual data for a reference image in the video sequence; in some of said embodiments, Inheritance Information 532-0, . . . , 532-B comprises information indicating that an element of intermediate data 540+N is to be calculated by combining decoded data with a corresponding element of $Y^{-N}$ for the reference image in the video sequence (i.e., information on what elements of plane Y must be based on a reference image is inherited along the tiered hierarchy, allowing to efficiently discriminate—e.g., specifying and "finalizing" inheritance at a low level of quality for a large portion of the image—the elements that can benefit from temporal correlation); in some non-limiting embodiments, the corresponding element of $Y^{-N}$ is calculated according to a motion compensation method, by processing suitable information on motion that is received by block 430.

Figure 5C:
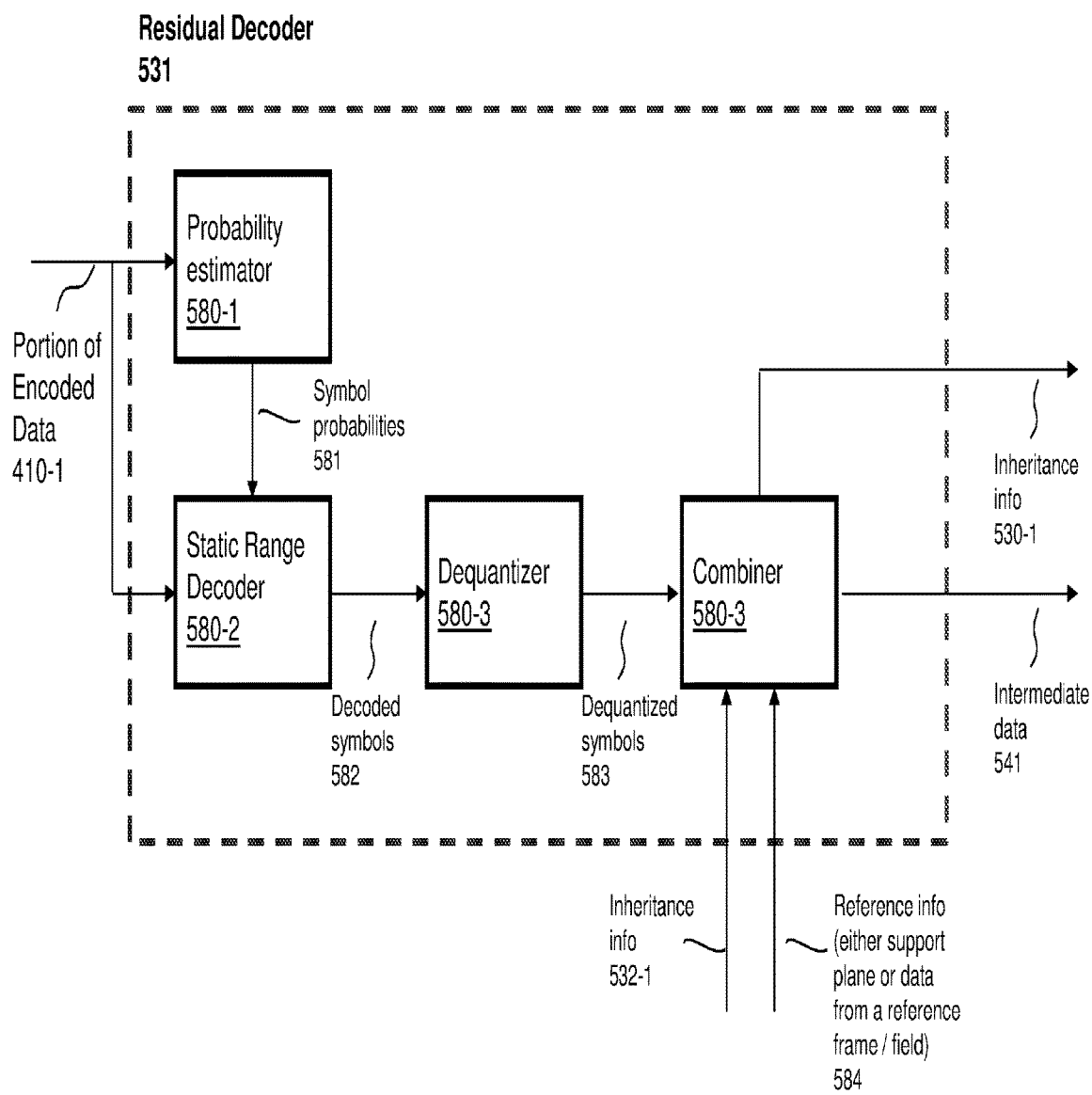

FIG. 5C is a non-limiting example diagram illustrating an implementation of Residual Decoder 531 of FIG. 5B according to embodiments herein.

Encoded data subset 410-1 is processed by Probability Estimator 580-1 in order to produce Symbol Probabilities 581. In a non-limiting embodiment, Probability Estimator 580-1 reconstructs, based at least in part on parameters specified in Encoded data subset 410-1, a probability distribution for the symbols that were entropy encoded into Encoded data subset 410-1, so as to allow for efficient static entropy decoding.

Encoded data subset 410-1 and Symbol Probabilities 581 are then processed by Static Range Decoder 580-2, producing Decoded Symbols 582. In some non-limiting embodiments, block 580-1 produces multiple sets of Symbol Probabilities 581 (one per each contiguous tile of symbols to decode), so as to allow block 580-2 to implement parallel entropy decoding of Decoded Symbols 582. In other non-limiting embodiment, block 580-2 implements different static entropy decoding methods, such as arithmetic decoding.

Decoded Symbols 582 are processed by Dequantizer 580-3, producing Dequantized Symbols 583.

Dequantized Symbols 583, Inheritance Information 532-1 and Reference Information 584 are processed by Combiner 580-3, producing both Intermediate Data 541 and Inheritance Information 530-1. In a non-limiting embodiment, Inheritance Information 532-1 specifies the parts of Intermediate Data 541 that are directly inherited from the lower level of quality, without need for encoded data subset 410-1 to specify any information about them. This allows greater efficiency in the transmission of data, since encoded data doesn't need to specify any information about elements that can be effectively predicted by the decoder by means of information that the decoder already possesses. In a non-limiting embodiment, Inheritance Information 530-1 also specifies what part of Intermediate Data 541 must be produced based at least in part on Reference Information 584.

Thus, encoded data can be decoded via a static range entropy decoder in accordance with a symbol probability distribution specified in the reconstruction data. In accordance with yet further embodiments, encoded data can be decoded via a static arithmetic entropy decoder in accordance with a symbol probability distribution specified in the reconstruction data.

Figure 6A:
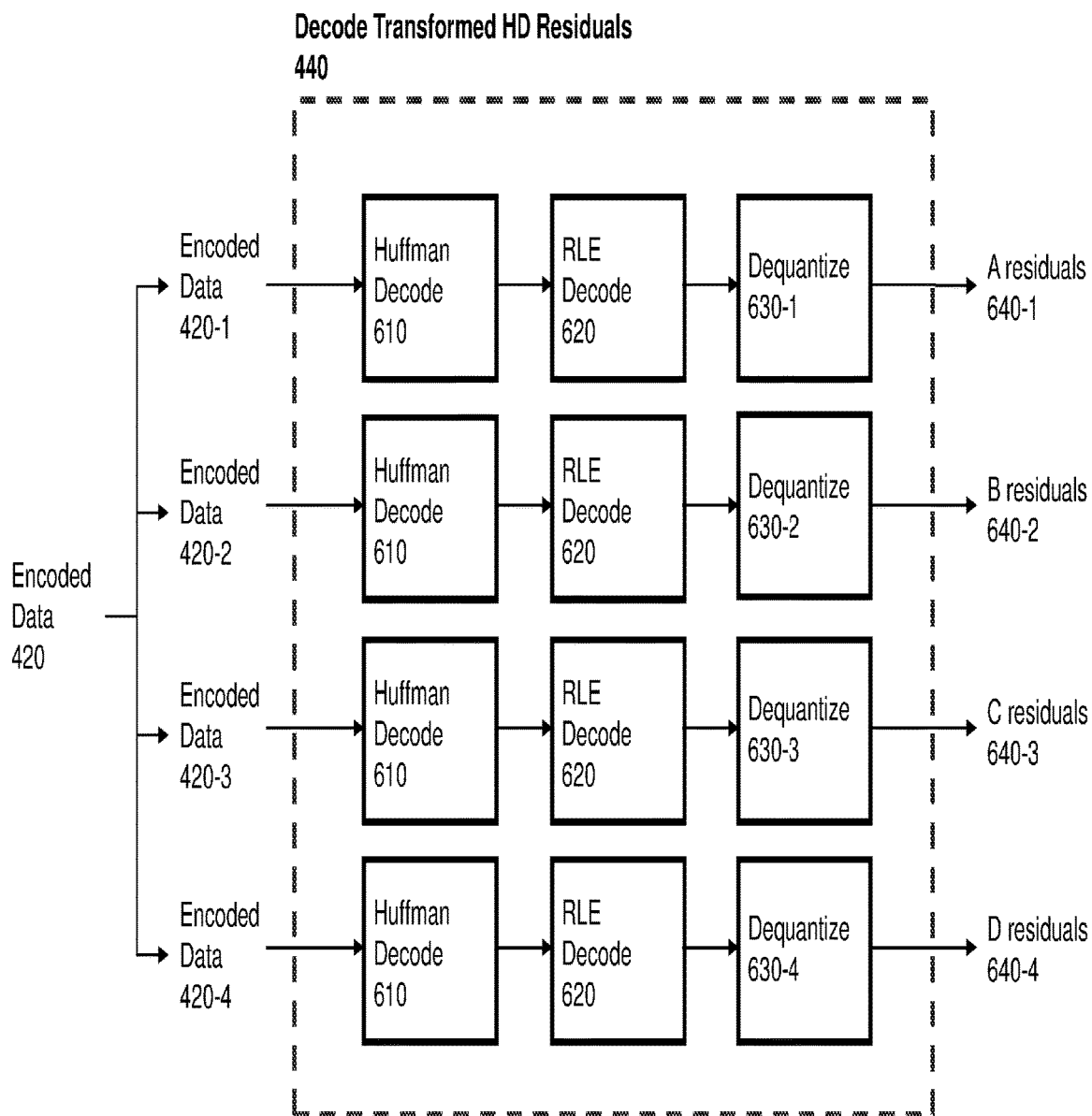
FIGS. 6A and 6B are example diagrams illustrating transformed residual decoding systems and methods according to embodiments herein.
Figure 6B:
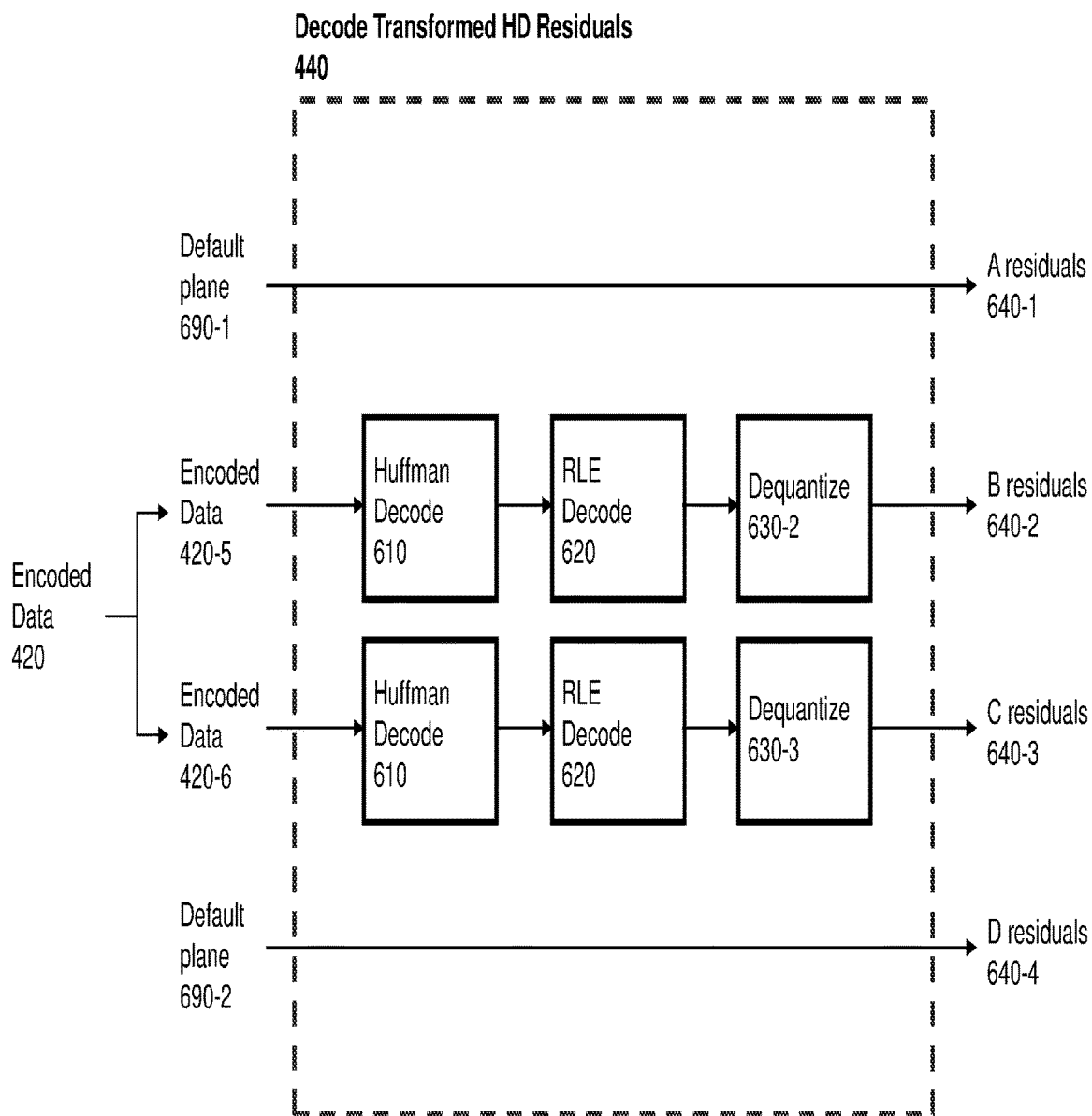

FIGS. 6A and 6B are non-limiting example diagrams illustrating transformed residual decoding according to embodiments herein.

FIG. 6A describes the sequence of operations used in a non-limiting embodiment in order to produce four SD planes of transformed residuals (i.e., four planes at SD resolution): A transformed residuals 640-1, B transformed residuals 640-2, C transformed residuals 640-3, D transformed residuals 640-4. As shown, different portions of encoded data 420 are decoded according to a combination of Huffman entropy decoding (Huffman decoder 610) and Run Length (RLE) decoding methods (RLE decoder 620). In a non-limiting embodiment, dequantization blocks 630-1, 630-2, 630-3, 630-4 leverage different dequantization methods and/or parameters (corresponding to the fact that different sets of transformed residuals were quantized by the encoder according to different quantization parameters).

FIG. 6B describes a non-limiting embodiment wherein A residuals 640-1 and D residuals 640-4 are reconstructed according to default planes known at the decoder side (e.g., in a non-limiting embodiment, planes of elements initialized to zero) rather than by means of decoding information comprised in Encoded Data 420.

Other non-limiting embodiments (not shown in FIGS. 6A and 6B) decode encoded data sets 420-1, . . . , 420-4 according to a static entropy decoding method akin to the method illustrated in FIG. 5C, wherein the entropy decoder implements a static entropy decoding method according to a symbol probability distribution extrapolated from one or more parameters indicated within the encoded data.

Figure 7A:
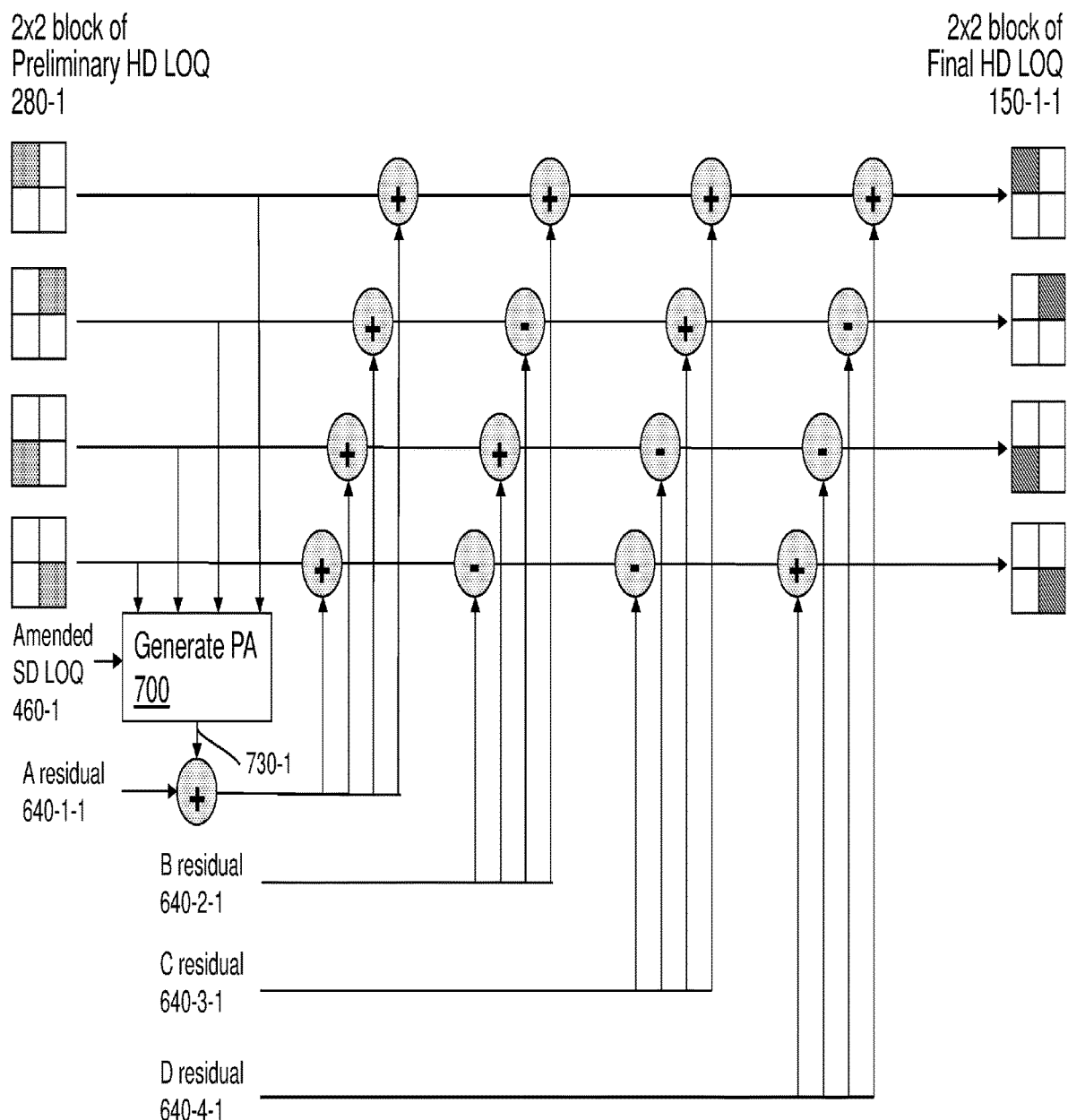
FIGS. 7A, 7B and 7C are example diagrams illustrating use of transformed residual data according to embodiments herein.
Figure 7B:
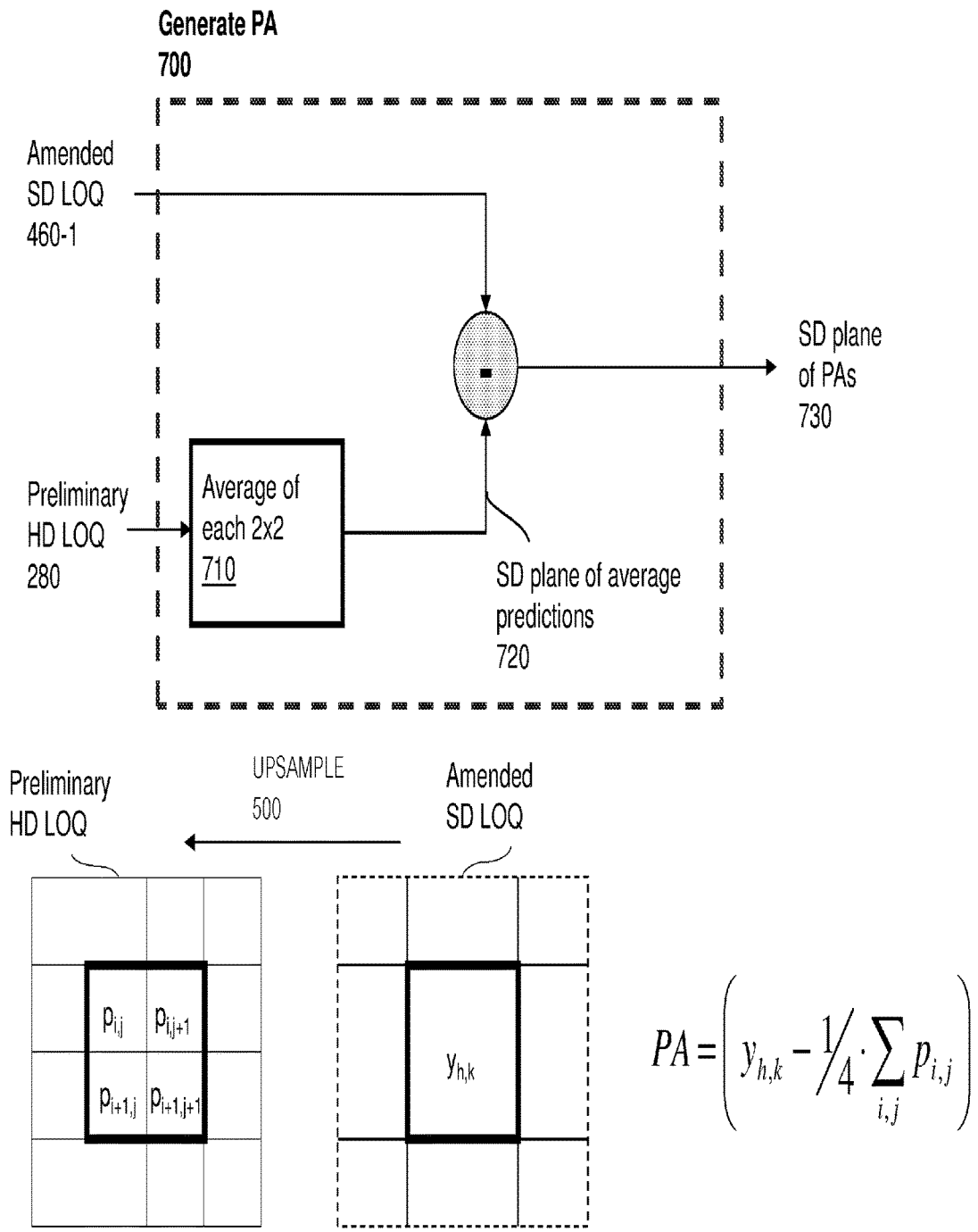
Figure 7C:
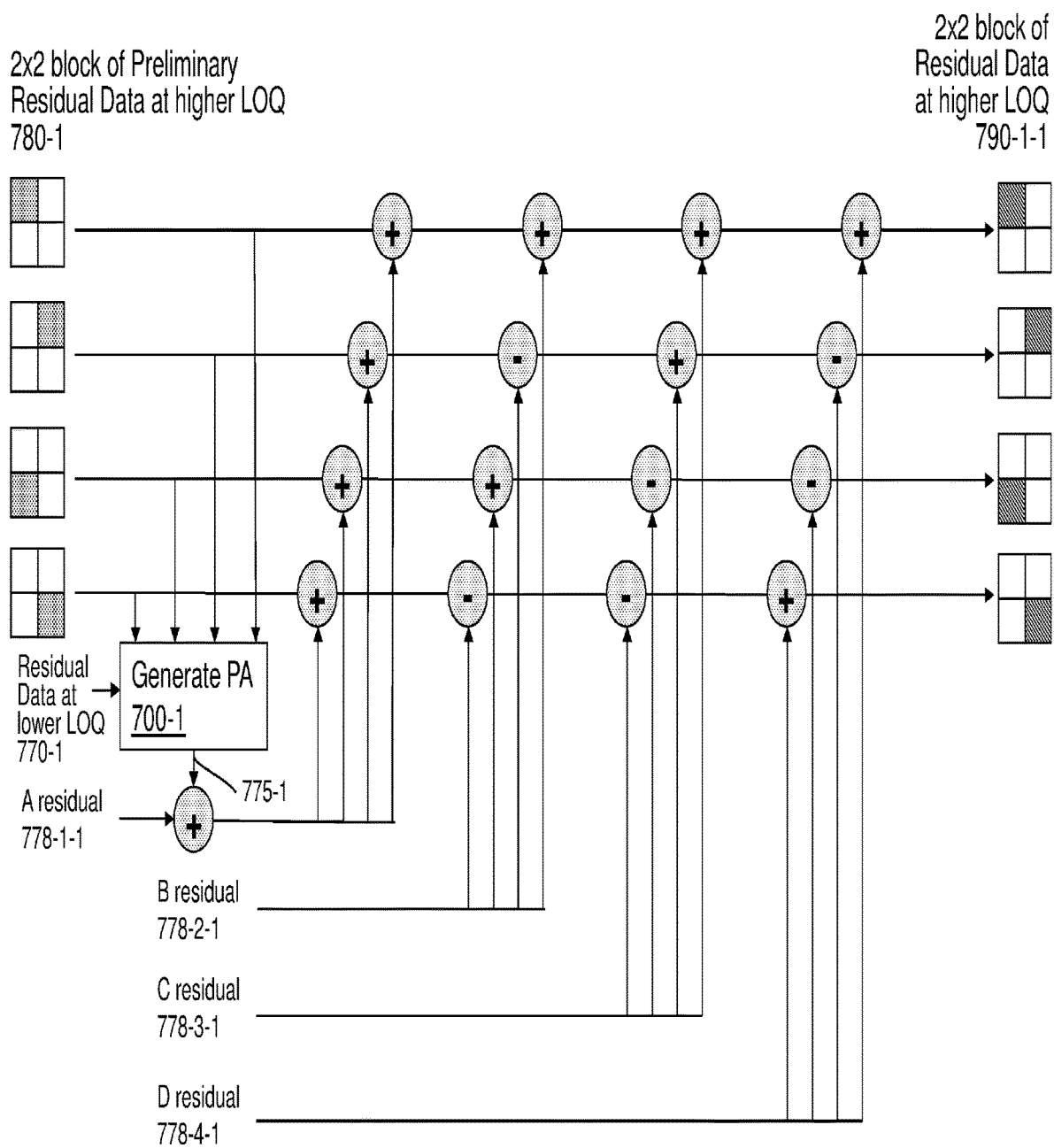

FIGS. 7A, 7B and 7C are non-limiting example diagrams illustrating use of transformed residuals, illustrating operations performed by a non-limiting embodiment of block 490.

FIG. 7A illustrates how block 490 reconstructs, based on Preliminary HD LOQ 280, Amended SD LOQ 460 and Transformed Residuals 640, Final HD LOQ 150-1 according to embodiments herein.

Each 2×2 block of elements 150-1-$i$ of Final HD LOQ 150-1 (FIG. 7A illustrates 150-1-1, but similar operations are implemented for the other 2×2 blocks of the image) is generated by processing a corresponding block 280-$i$ of Preliminary HD LOQ 280, a corresponding element 460-$i$ of Amended SD LOQ 460 (e.g., in a non-limiting embodiment, the element co-located with 280-$i$ and 150-1-$i$ within the image, also defined as "parent element" of 280-$i$ and 150-1-$i$) and the four corresponding transformed residuals 640-1-$i$, 640-2-$i$, 640-3-$i$ and 640-4-$i$.

More specifically, for the illustrated case of 2×2 block of elements 150-1-1, the four elements 280-1 are processed by block Generate PA 700 along with their corresponding parent element 460-1 of the Amended SD LOQ 460, generating the value PA 730-1.

B residual 640-2-1 is either added or subtracted to each of the values of block 280-1, e.g., in a non-limiting embodiment added to the elements on the left of the 2×2 block and subtracted to the elements on the right of the 2×2 block.

C residual 640-3-1 is either added or subtracted to each of the values of block 280-1, e.g., in a non-limiting embodiment added to the elements on the upper part of the 2×2 block and subtracted to the elements on the lower part of the 2×2 block.

D residual 640-3-1 is either added or subtracted to each of the values of block 280-1, e.g., in a non-limiting embodiment added to the elements on the top left and on the lower right of the 2×2 block and subtracted to the elements on the top right and on the lower left of the 2×2 block.

The result of all these combinations is 2×2 block of elements 150-1-1 of Final HD LOQ 150-1.

The procedure is then repeated for all of the 2×2 blocks of Final HD LOQ 150-1. In a non-limiting embodiment, if one of the dimensions of Final HD LOQ 150-1 has an odd number of elements, the decoder first reconstructs an image with an additional line or column, and then discards such additional line or column.

In other words, the described non-limiting embodiment reconstructs Final HD LOQ 150-1 as follows: the computer processor hardware produces, based on the second rendition of the signal (Amended SD LOQ 460), a third rendition of the signal (Preliminary HD LOQ 280), the third rendition of the signal being a preliminary rendition of the signal at a substantially higher display element resolution; decoding the second portions of encoded data into a set of transformed residual data (A residuals, B residuals, C residuals and D residuals 640); the computer processor hardware processes a combination of the set of transformed residual data, the second rendition of the signal (Amended SD LOQ 460), and the third rendition of the signal (Preliminary HD LOQ 280) to produce a new set of residual data (not shown in the figure because directly applied to Preliminary HD LOQ 280); and the computer processor hardware applies the new set of residual data to the third rendition of the signal to produce the fourth rendition of the signal.

FIG. 7B illustrates a non-limiting embodiment of block 700, wherein each value 730-$i$ of SD plane of PAs 730 is generated by calculating the difference between element 460-$i$ (e.g., $y_{h,k}$) and the average of the values of the corresponding four elements of 2×2 block 280-$i$ (e.g., $p_{i,j}$, $p_{i,j+1}$, $p_{i+1,j}$, $p_{i+1,j+1}$). Value 730-1 is combined with A residual 640-1-1, and the resulting value is added to each of the four elements of block 280-1.

FIG. 7C illustrate a non-limiting embodiment using transformed residuals within the reconstruction of residual data (such as residual data to be applied in order to modify the first rendition of the signal into the second rendition of the signal) according to a hierarchical method.

According to the embodiment, residual data is reconstructed at progressively higher levels of quality, according to a sequence of: reconstruction of residual data at a lower level of quality; the computer processor hardware produces (such as via upsampling operations) a preliminary rendition of residual data at the next higher level of quality; decodes transformed residuals; producing relative residual data at the next higher level of quality as specified by transformed residuals; modification of the preliminary rendition of residual data at the next higher level of quality by applying relative residual data can include producing residual data at the next higher level of quality. Residual data at the highest level of quality in the hierarchy of residual data is then applied to the first rendition of the signal, in order to produce the second rendition of the signal.

In other words, in one embodiment, the computer processor hardware processes encoded data as follows: the computer processor hardware decodes the second portions of encoded data into residual data at a first level of quality; produces, based on the residual data at the first level of quality, a preliminary rendition of residual data at a second level of quality, the second level of quality higher than the first level of quality; decodes the second portions of encoded data into quantized transformed residual data; dequantizes the quantized transformed residual data to produce transformed residual data; processes a combination of the transformed residual data, the residual data at the first level of quality, and the preliminary rendition of residual data at the second level of quality to reproduce residual data at the second level of quality (such as by combining the preliminary rendition of residual data at the second level of quality with a set of relative residual data, as described in FIG. 7C); and applies the reproduced residual data at the second level of quality to the first rendition of the signal to produce the second rendition of the signal.

In accordance with further non-limiting embodiments, the computer processor hardware further performs operations of: producing, based on the second rendition of the signal, a third rendition of the signal, the third rendition of the signal being a preliminary rendition of the signal at a substantially higher display element resolution; decoding the second portions of encoded data into a new set of transformed residual data; processing a combination of the new set of transformed residual data, the second rendition of the signal, and the third rendition of the signal to produce a new set of residual data; and applying the new set of residual data to the third rendition of the signal to produce the fourth rendition of the signal.

Figure 8:
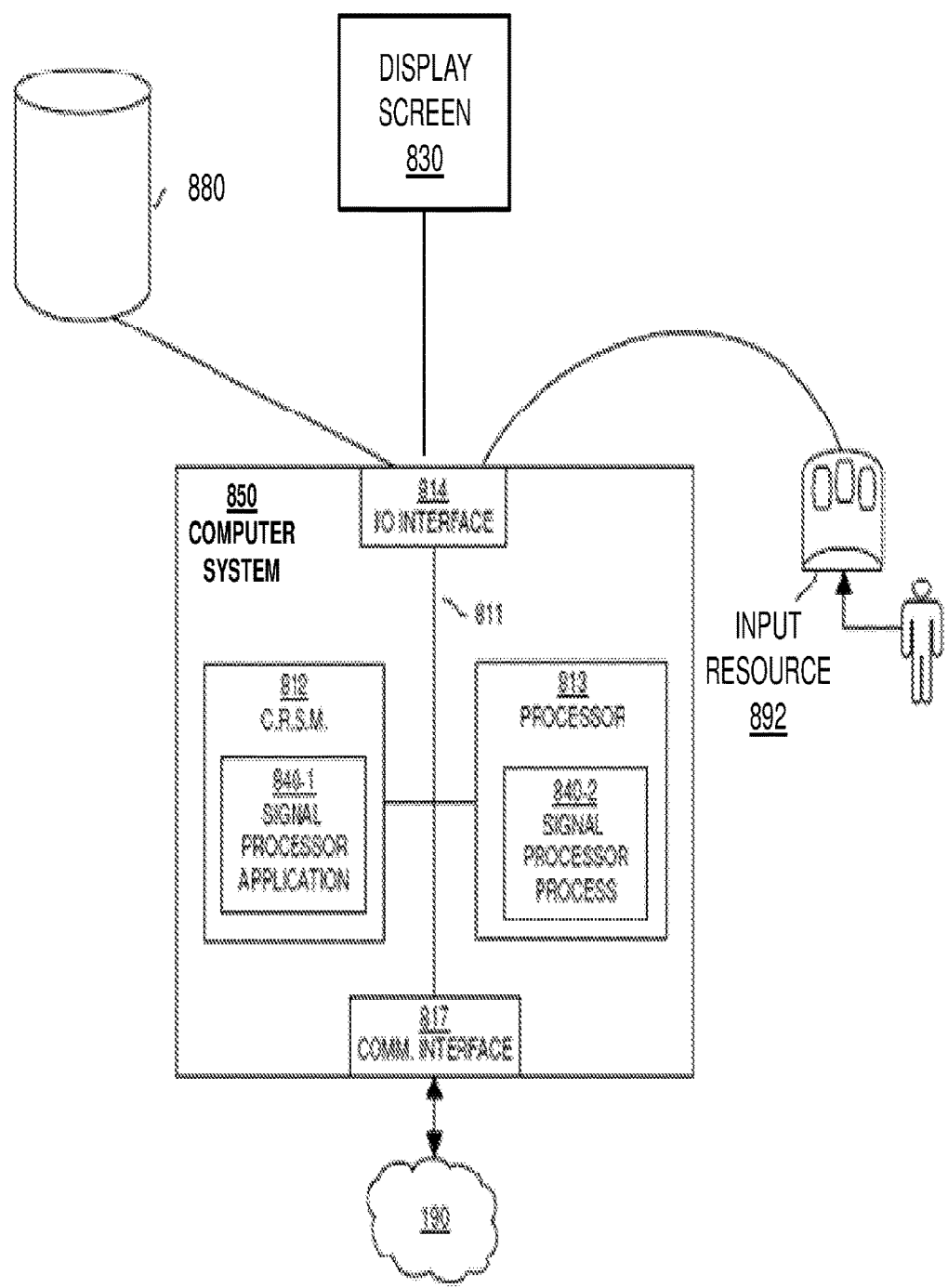
FIG. 8 is an example block diagram illustrating a computer system supporting data processing according to embodiments herein.

FIG. 8 is a diagram illustrating an example computer architecture in which to execute any of the functionality according to embodiments herein. Any of the one or more different processing techniques can be implemented via execution of software code on computer processor hardware.

In a non-limiting embodiment, computer system 850 is located in a set top box or other suitable resource. Embodiments herein enable the computer system 850 to decode encoded data and reconstruct a signal at any of one or more different higher levels of quality as described herein. By way of non-limiting example, the computer processor hardware in computer system 850 can be configured to produce a second level of quality (e.g., an HD video) by processing the same data stream that other legacy set top boxes decode only at a first level of quality (e.g., producing an SD video).

For example, as more particularly shown, computer system 850 (e.g., computer processor hardware) of the present example can include an interconnect 811 that couples computer readable storage media 812 such as a non-transitory type of media (i.e., any type of hardware storage medium) in which digital information can be stored and retrieved. The computer system 850 can further include processor 813 (i.e., computer processor hardware 106, 107, etc., such as one or more processor co-located or disparately located processor devices), I/O interface 814, communications interface 817, etc.

Computer processor hardware (i.e., processor 813) can be located in a single location or can be distributed amongst multiple locations.

As its name suggests, I/O interface 814 provides connectivity to resources such as repository 880, control devices (such as controller 892), one or more display screens, etc.

Computer readable storage medium 812 can be any hardware storage device to store data such as memory, optical storage, hard drive, floppy disk, etc. In one embodiment, the computer readable storage medium 812 stores instructions and/or data.

Communications interface 817 enables the computer system 850 and processor resource 813 to communicate over a resource such as any of networks 190. I/O interface 814 enables processor resource 813 to access data from a local or remote location, control a respective display screen, receive input, etc.

As shown, computer readable storage media 812 can be encoded with decoder application 840-1 (e.g., software, firmware, etc.) executed by processor 813. Decoder application 840-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in decoder application 840-1 stored on computer readable storage medium 812.

Execution of the decoder application 840-1 produces processing functionality such as decoder process 840-2 in processor resource 813. In other words, the decoder process 840-2 associated with processor resource 813 represents one or more aspects of executing decoder application 840-1 within or upon the processor resource 813 in the computer system 850.

Those skilled in the art will understand that the computer system 850 can include other processes and/or software and hardware components, such as an operating system that controls allocation and use of hardware resources to execute decoder application 840-1.

In accordance with different embodiments, note that computer system may be any of various types of devices, including, but not limited to, a set-top box, access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, etc., or in general any type of computing or electronic device.

The computer system 850 may reside at any location or multiple locations in a network environment. The computer system 850 can be included in any suitable resource in a network environment to implement functionality as discussed herein.

Functionality supported by the different resources will now be discussed via flowcharts in FIGS. 9, 10, and 11. Note that the steps in the flowcharts below can be executed in any suitable order.

Figure 9:
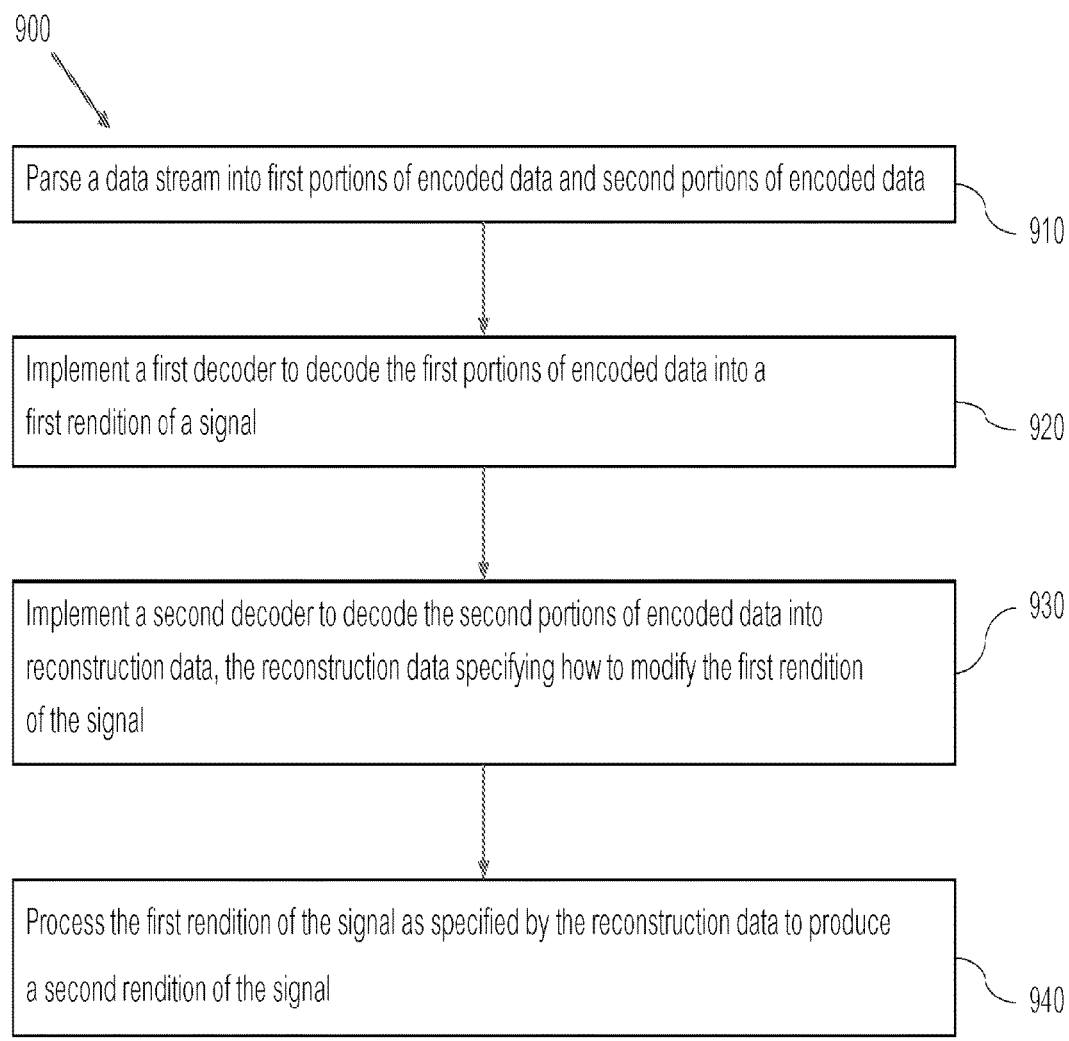
FIGS. 9, 10 and 11 are example flow graphs illustrating decoding according to embodiments herein.

FIG. 9 is a flowchart 900 illustrating an example method according to embodiments. Note that there will be some overlap with respect to concepts as discussed above.

In processing block 910, the computer processor hardware parses a data stream into first portions of encoded data 181 and second portions of encoded data 182.

In processing block 920, the computer processor hardware implements a first decoder 130 to decode the first portions of encoded data 181 into a first rendition of a signal.

In processing block 930, the computer processor hardware implements a second decoder 120 to decode the second portions of encoded data 182 into reconstruction data 184, the reconstruction data 184 specifying how to modify the first rendition of the signal.

In processing block 940, the computer processor hardware applies the reconstruction data 184 to the first rendition of the signal to produce a second rendition of the signal.

Figure 10:
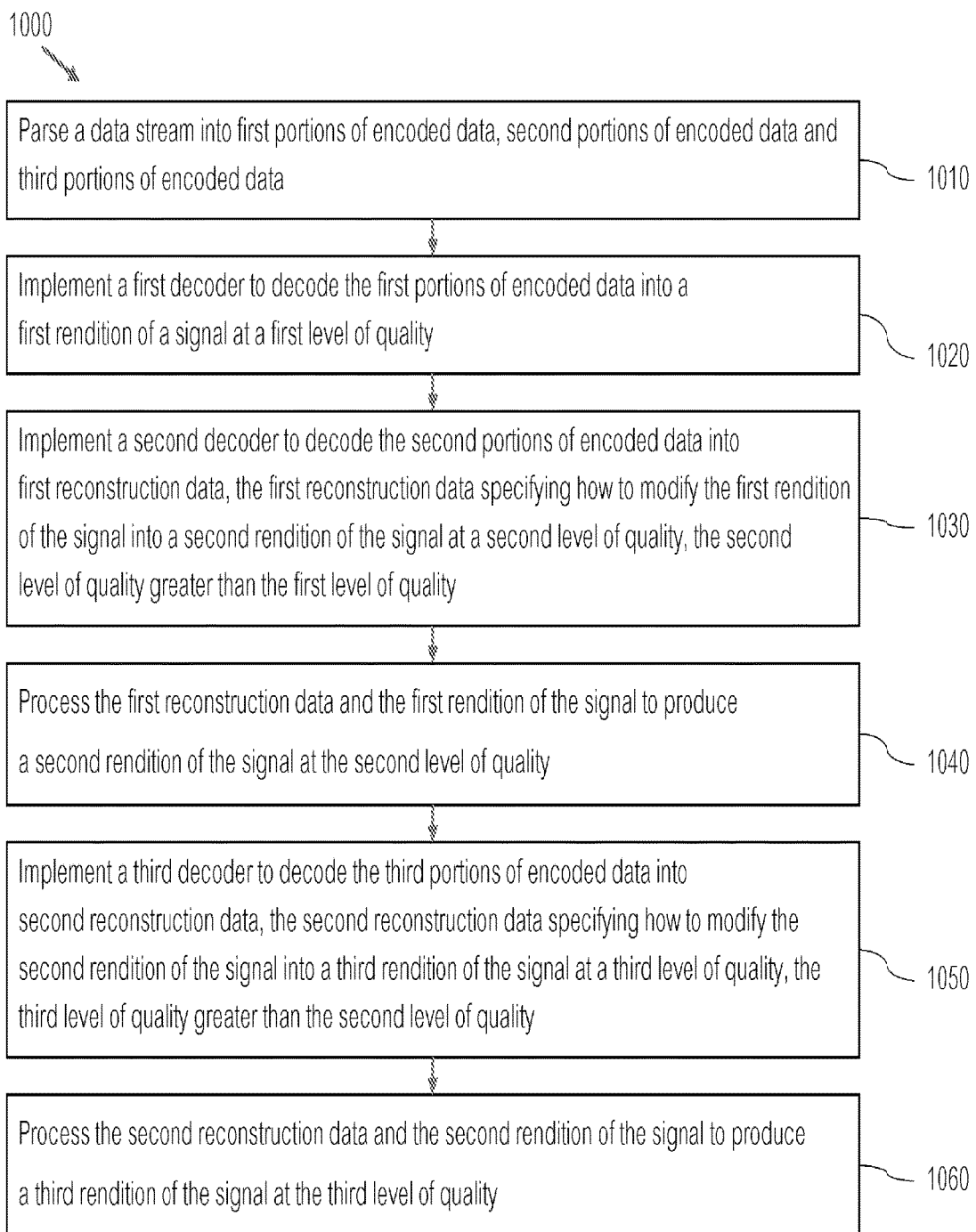

FIG. 10 is a flowchart 1000 illustrating an example method according to embodiments. Note that there will be some overlap with respect to concepts as discussed above.

In processing block 1010, the computer processor hardware parses a data stream into first portions of encoded data, second portions of encoded data, and third portions of encoded data.

In processing block 1020, the computer processor hardware implements a first decoder to decode the first portions of encoded data into a first rendition of a signal at a first level of quality.

In processing block 1030, the computer processor hardware implements a second decoder to decode the second portions of encoded data into first reconstruction data, the first reconstruction data specifying how to modify the first rendition of the signal into a second rendition of the signal at a second level of quality, the second level of quality greater than the first level of quality.

In processing block 1040, the computer processor hardware processes the first reconstruction data and the first rendition of the signal to produce a second rendition of the signal at the second level of quality.

In processing block 1050, the computer processor hardware implements a third decoder to decode the third portions of encoded data into second reconstruction data, the second reconstruction data specifying how to modify the second rendition of the signal into a third rendition of the signal at a third level of quality, the third level of quality greater than the second level of quality.

In processing block 106, the computer processor hardware processes the second reconstruction data and the second rendition of the signal to produce a third rendition of the signal at the third level of quality.

Figure 11:
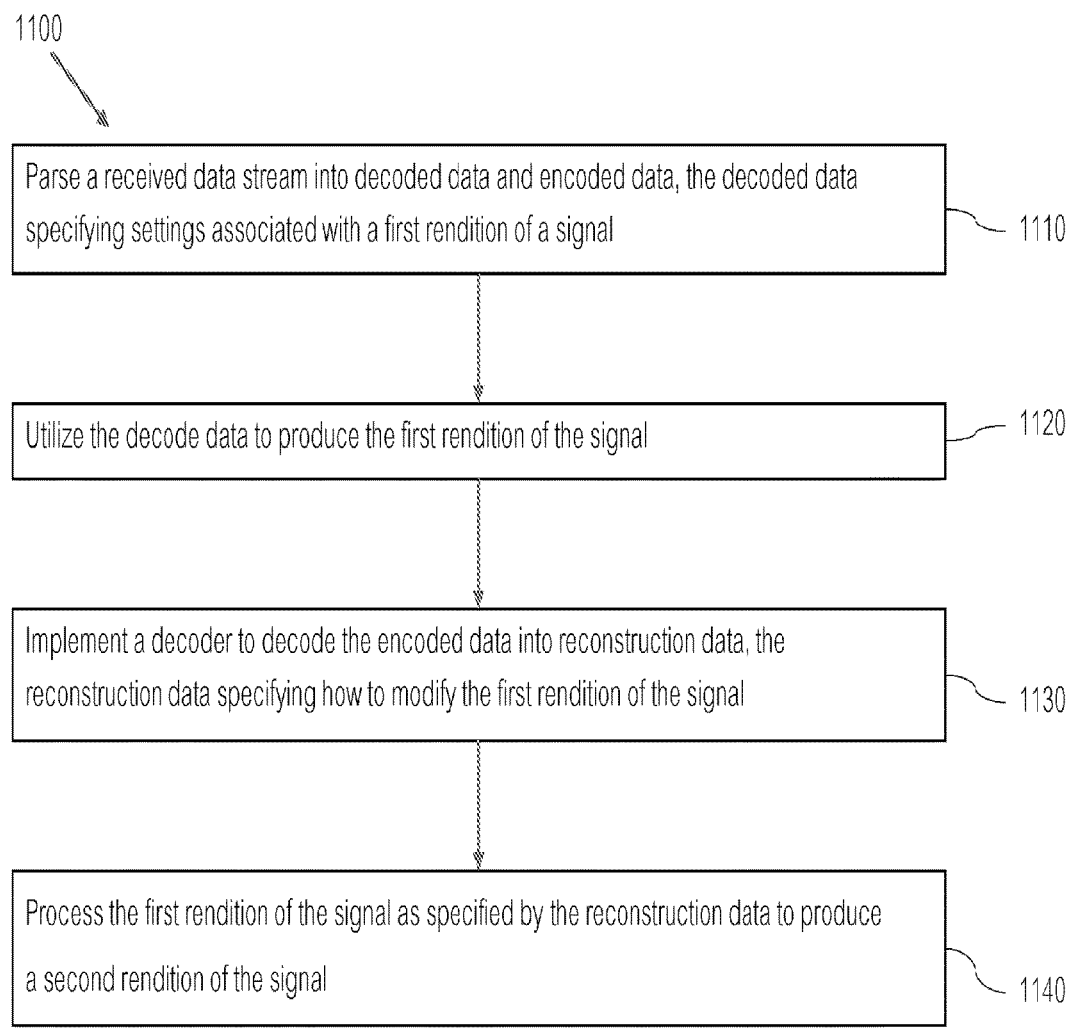

FIG. 11 is a flowchart 1100 illustrating an example method according to embodiments. Note that there will be some overlap with respect to concepts as discussed above.

In processing block 1110, the computer processor hardware parses a received data stream into decoded data and encoded data, the decoded data specifying settings associated with a first rendition of a signal.

In processing block 1120, the computer processor hardware utilizes the decoded data to produce the first rendition of the signal.

In processing block 1130, the computer processor hardware implements a decoder to decode the encoded data into reconstruction data, the reconstruction data specifying how to modify the first rendition of the signal.

In processing block 1140, the computer processor hardware applies the reconstruction data to the first rendition of the signal to produce a second rendition of the signal.

Figure 12A:
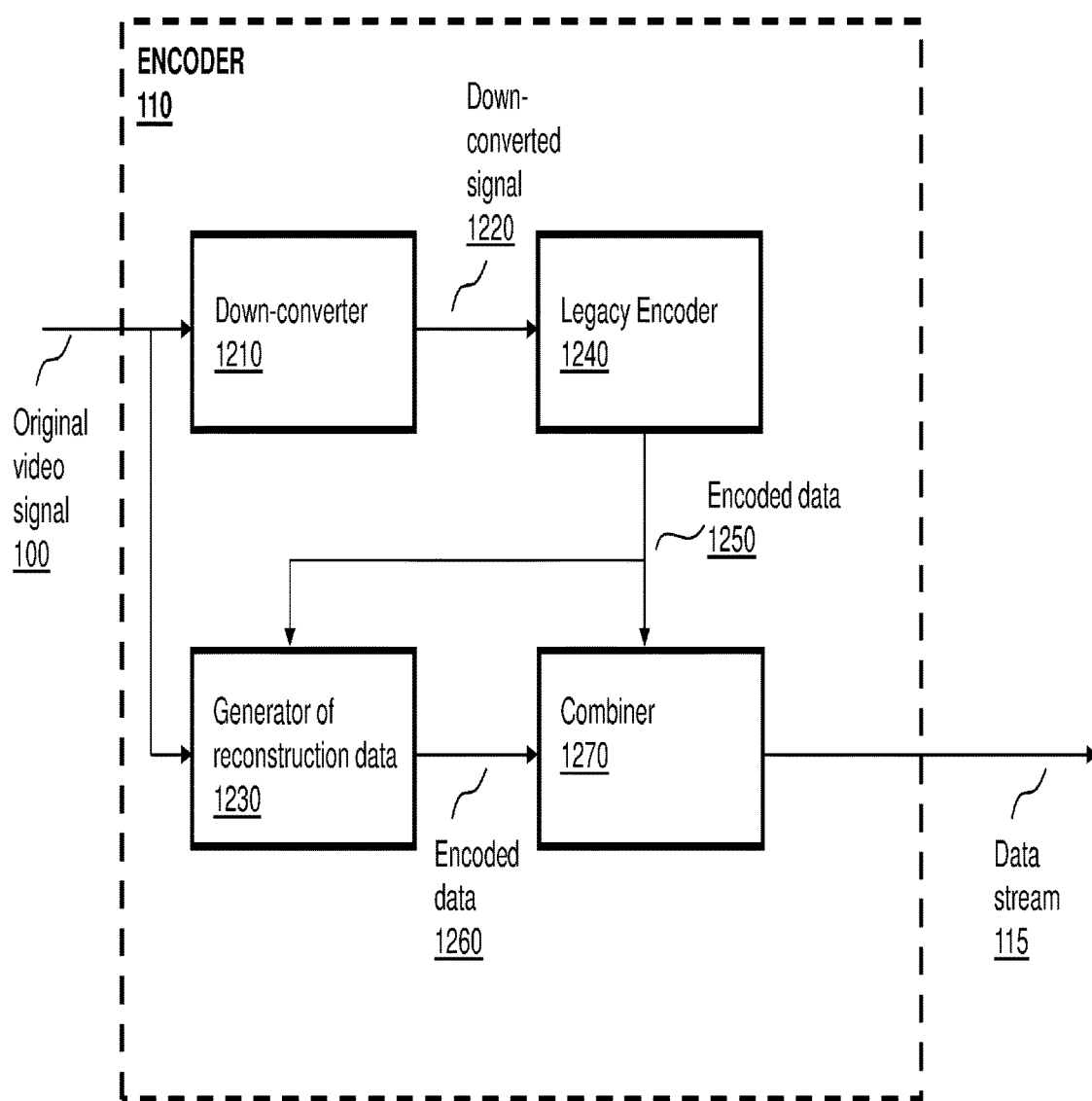
FIGS. 12A and 12B are example block diagrams illustrating encoding according to embodiments herein.

FIG. 12A illustrates a non-limiting example encoding method according to embodiments herein.

Original video signal 100 is processed by down-converter 1210, producing down-converted signal 1220. In a non-limiting embodiment, down-converted signal 1220 is a signal at a lower display element resolution.

Legacy Encoder 1240 processes down-converted signal 1220, producing encoded data 1250. In a non-limiting embodiment, legacy encoder 1240 encodes the down-converted signal according to an MPEG (Motion Picture Expert Group) encoding method.

Generator of reconstruction data 1230 processes the original signal 100 and a reconstructed rendition of the signal encoded by legacy encoder 1240 (obtained either by receiving the reconstructed rendition from legacy encoder 1240 or—as illustrated in FIG. 12A—by receiving and decoding encoded data 1250), producing encoded data 1260 (such as encoded enhancement data).

Combiner 1270 receives encoded data 1250 (first portions of encoded data) and encoded data 1260 (second portions of encoded data), and combines them into data stream 115. In a non-limiting embodiment, data stream 115 is organized as an MPEG-2 transport stream. As previously discussed, the second portions of encoded data in data stream 115 can be assigned a different Packet Identifier (PID) than first portions of encoded data in data stream 115.

Figure 12B:
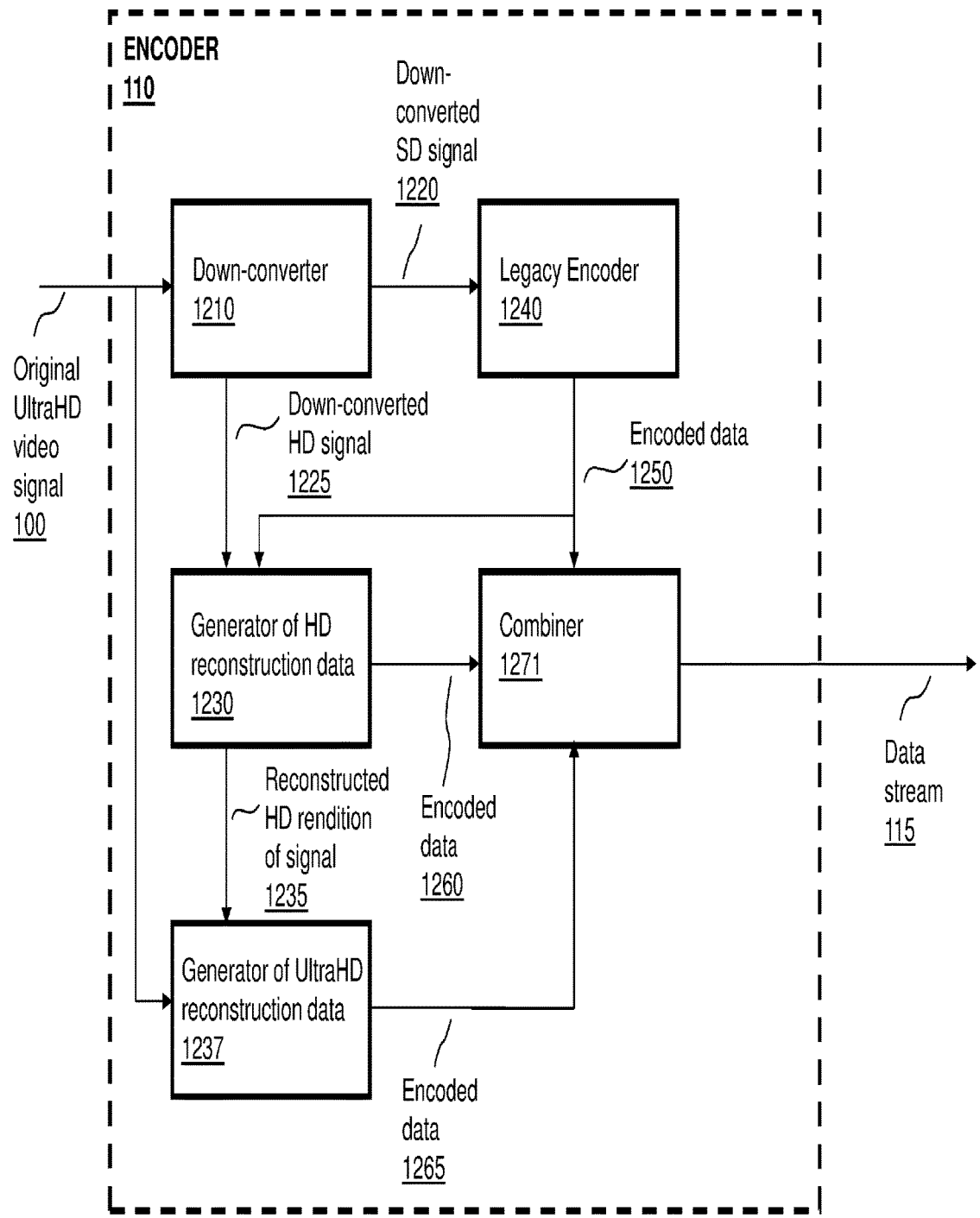

FIG. 12B is an example diagram illustrating encoding according to embodiments herein.

Original video signal 100 (such as an UltraHD video signal) is processed by down-converter 1210 of encoder 110. The down-converter 1210 produces down-converted signal 1220 (such as an SD rendition of the original video signal) and down-converted signal 1225 (such as an HD rendition of the original video signal).

In this example embodiment, Legacy Encoder 1240 processes down-converted signal 1220, producing encoded data 1250. In a non-limiting embodiment, legacy encoder 1240 encodes the down-converted signal according to an MPEG (Motion Picture Expert Group) encoding method.

Generator of HD reconstruction data 1230 processes down-converted HD rendition of signal 1225 and a reconstructed rendition of the signal encoded by legacy encoder 1240 (obtained either by receiving the reconstructed rendition from legacy encoder 1240 or—as illustrated in FIG. 12B—by receiving and decoding encoded data 1250), producing encoded data 1260 (such as encoded HD enhancement data).

Generator of UltraHD reconstruction data 1237 processes the original signal 100 and reconstructed rendition of the HD signal 1235 received from 1230, producing encoded data 1265 (such as encoded UltraHD enhancement data).

Combiner 1271 receives encoded data 1250 (first portions of encoded data), encoded data 1260 (second portions of encoded data) and encoded data 1265 (third portions of encoded data), and combines them into data stream 115. As previously discussed, in a non-limiting embodiment, data stream 115 is organized as an MPEG-2 transport stream, wherein second portions of encoded data and third portions of encoded data are associated to specific Packet Identifiers (PIDs), different from the PID of first portions of encoded data.

Accordingly, embodiments herein include computer processor hardware that: receive a signal 100; implements a first encoder 1240 to produce first portions of encoded data 1250 to reproduce a first rendition of the signal; implements a second encoder (generator of reconstruction data 1230) to produce second portions of encoded data 1260, the second portions of encoded data 1260 indicating how to modify the first rendition of the signal and produce a second rendition of the signal, the second rendition of the signal being of a higher level of quality than the first rendition of the signal. The computer processor hardware (such as combiner 1270 of encoder 110) produces the data stream 115 to include the first portions of encoded data 1250 and the second portions of encoded data 1260. The computer processor hardware transmits the data stream 115 to at least one destination (such as first remote playback resource, a second remote playback resource, etc.).

In one embodiment, the computer processor hardware initiates transmission of the data stream 115 over an MPEG transport stream. In accordance with further embodiments, the computer processor hardware can be configured to produce the first portions of encoded data (1250) in accordance with an MPEG compression protocol. The computer processor hardware can be configured to produce the second portions of encoded data (1260) according to a hierarchical encoding compression protocol. The second portions of encoded data can include compressed residual data as well as specify upsample operations to be applied to modify the first rendition of the signal into the second rendition of the signal.

In accordance with further embodiments, the encoder 110 tags the first portions of encoded data (1250) with a first unique tag indicating that the first portions of encoded data (1250) are to be decoded by a first decoder. The encoder 110 tags the second portions of encoded data (1260) with a second unique tag indicating that the second portions of encoded data are to be decoded by a second decoder.

In yet further embodiments, the computer processor hardware transmits the data stream to a first destination that decodes only the first portions of encoded data (1250) to reproduce and play back the first rendition of the signal. The computer processor hardware transmits the data stream to a second destination that decodes the first portions of encoded data (1250) and the second portions of encoded data (1260). The second destination reproduces the first rendition of the signal based on the decoded first portions of encoded data (1250); the second destination further applies the decoded second portions of encoded data to the first rendition of the signal to produce and play back the second rendition of the signal.

Note again that techniques herein are well suited for encoding and decoding received data. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
via computer processor hardware:
obtaining a first rendition of a signal, the first rendition of the signal being obtained from a first decoding of portions of a received data stream, the first rendition of the signal being at a first level of quality;
obtaining a first set of encoded data and a second set of encoded data from the received data stream;
implementing a first decoding operation to decode the first set of encoded data into a first set of reconstruction data, the first set of reconstruction data specifying how to modify the first rendition of the signal, the first set of reconstruction data comprising a first set of residuals at the first level of quality;
applying the first set of reconstruction data to the first rendition of the signal to produce a second rendition of the signal;
implementing a second decoding operation to decode the second set of encoded data into a second set of reconstruction data, the second set of reconstruction data specifying how to modify the second rendition of the signal, the second set of reconstruction data comprising a second set of residuals at the second level of quality; and
processing the second set of residuals and the second rendition of the signal to output a reconstruction of the signal at the second level of quality,
wherein one or more of the first decoding operation and the second decoding operation comprises:
Huffman decoding the first set of encoded data;
run-length decoding data derived from the Huffman decoding; and
dequantizing data derived from the run-length decoding.

2. The method as in claim 1, wherein the first and second levels of quality respectively represent lower and higher resolutions in a hierarchy.

3. The method as in claim 2, further comprising:
applying upsampling operations to the second rendition of the signal produce the second rendition of the signal at the second level of quality, the upsampling operations converting lower resolution display element settings to higher resolution display element settings, the second rendition of the signal at the second level of quality being combined with the second set of residuals to output the reconstruction of the signal at the second level of quality.

4. The method as in claim 1, wherein the signal is a video signal specifying settings for multiple display elements;
wherein the second rendition of the signal is of a higher level of quality than the first rendition of the signal; and
wherein the second rendition of the signal is of a same display element resolution as the first rendition of the signal.

5. The method as in claim 1, comprising:
identifying upsampling operations as specified by the encoded data; and
applying the upsampling operations to a first version of the second rendition of the signal to produce a second version of the second rendition of the signal at a substantially higher display element resolution than the first version of the second rendition of the signal.

6. The method as in claim 5, wherein the second version of the second rendition of the signal is a preliminary rendition of the signal at the substantially higher display element resolution, wherein the method further comprises:
utilizing the second set of reconstruction data to modify the preliminary rendition of the signal at the substantially higher display element resolution.

7. The method as in claim 1, wherein the first rendition is obtained from a decoding of a legacy video coding format at a first resolution and wherein the first and second decoding operations form part of a decoding of an enhancement video coding format at a second resolution.

8. The method as in claim 1, wherein the first rendition is at a standard resolution and the reconstruction of the signal is at a high definition.

9. The method as in claim 1, wherein the second set of reconstruction data comprises transformed residuals and the method further comprises:
transforming the transformed residuals to produce residuals at the second level of quality.

10. The method as in claim 1, wherein the second decoding operation comprises:
receiving four planes of transformed residuals; and
decoding the four planes of transformed residuals in parallel to output four planes of residuals.

11. The method as in claim 10, wherein the decoding of different ones of the four planes use different dequantization methods and/or parameters.

12. The method as in claim 10, wherein one of the planes of transformed residuals is modified by adding a predicted average that is computed from a preliminary rendition of the signal at the second level of quality.

13. The method as in claim 1, wherein the signal comprises a video signal and the method comprises:
using timing information in the received data stream to determine at least timing associations between data corresponding to frames of the video signal for the first rendition of the video signal and data corresponding to one or more of the two sets of encoded data.

14. A decoding apparatus comprising:
a first decoding component to decode a first set of encoded data to obtain a first set of residuals for a signal at a first level of quality;
a second decoding component to decode a second set of encoded data to obtain a second set of residuals for the signal at a second level of quality;
a first summing component to combine the first set of residuals with a first rendition of the signal at the first level of quality, the first rendition of the signal being derived from an output of a third decoding component that decodes an encoded version of the signal at the first level of quality; and
a second summing component to combine data derived from an output of the first summing component at the second level of quality with the second set of residuals to output a reconstruction of the signal at the second level of quality,
wherein the first decoding component comprises:
a Huffman decoder to receive the first set of encoded data and perform Huffman decoding;
a run-length decoder to receive an output of the Huffman decoder and perform run-length decoding; and
a dequantizer to receive an output of the run-length decoder and perform dequantization to output the first set of residuals.

15. The decoding apparatus as in claim 14, comprising:
an upsampling component to receive upsampling data and the output of the first summing component at the first level of quality and to generate upsampled data at the second level of quality for input to the second summing component.

16. The decoding apparatus as in claim 14, wherein the second decoding component comprises a plurality of decoding pipelines, each decoding pipeline being configured to receive a respective one of a plurality of planes of encoded data, wherein each decoding pipeline comprises:
a Huffman decoder to receive an encoded plane for the second set of encoded data and perform Huffman decoding;
a run-length decoder to receive an output of the Huffman decoder and perform run-length decoding; and
a dequantizer to receive an output of the run-length decoder and perform dequantization to output a plane of transformed residuals that are used to derive part of the second set of residuals.

17. A non-transitory computer-readable medium storing computer program code comprising instructions that, if executed by a computer processor would cause an apparatus to:
obtain a first rendition of a signal at a first level of quality, the first rendition of the signal being obtained by decoding an encoding of the signal at the first level of quality;
obtain a first set of encoded data and a second set of encoded data from the received data stream;
implement a first decoding operation to decode the first set of encoded data into a first set of reconstruction data, the first set of reconstruction data comprising a first set of residuals at the first level of quality;
apply the first set of reconstruction data to the first rendition of the signal to produce a second rendition of the signal;
implement a second decoding operation to decode the second set of encoded data into a second set of reconstruction data, the second set of reconstruction data comprising a second set of residuals at the second level of quality; and
combine the second set of residuals and the second rendition of the signal to output a reconstruction of the signal at the second level of quality,
wherein one or more of the first decoding operation and the second decoding operation comprises:
Huffman decoding the first set of encoded data;
run-length decoding data derived from the Huffman decoding; and
dequantizing data derived from the run-length decoding.

* * * * *